(12) United States Patent
de Jong

(10) Patent No.: US 8,893,303 B2
(45) Date of Patent: *Nov. 18, 2014

(54) EMBEDDED CONTENT REQUESTS IN A RIGHTS LOCKER SYSTEM FOR DIGITAL CONTENT ACCESS CONTROL

(75) Inventor: Eduard K. de Jong, Redland Britol (GB)

(73) Assignee: Oracle America, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,193

(22) Filed: Jul. 13, 2012

(65) Prior Publication Data

US 2012/0284806 A1    Nov. 8, 2012

Related U.S. Application Data

(60) Continuation of application No. 12/931,800, filed on Feb. 9, 2011, now Pat. No. 8,230,518, which is a (Continued)

(51) Int. Cl.
*H04N 7/16* (2011.01)
*H04L 29/06* (2006.01)

(Continued)

(52) U.S. Cl.
CPC ...... *H04L 65/4084* (2013.01); *H04L 29/06027* (2013.01); *H04W 12/00* (2013.01); *H04L 2209/38* (2013.01); *H04L 65/80* (2013.01);

(Continued)

(58) Field of Classification Search
CPC ... G06F 21/10; G06F 21/335; G06F 21/6218; G06F 21/6209; G06F 2221/2137; H04L 2463/101; H04L 2643/102; H04L 63/10; H04L 63/0435; H04L 63/08; H04L 63/123; H04L 63/0428; H04L 63/12; H04L 29/06027; H04L 65/4084; H04L 65/80; H04L 9/00; H04L 9/3268; H04L 9/3297; H04L 2209/603
USPC ............ 726/29, 26, 27, 28, 30; 713/182
See application file for complete search history.

(56) References Cited

U.S. PATENT DOCUMENTS 5,483,596 A    1/1996  Rosenow et al.
5,577,227 A   11/1996  Finnell et al.

(Continued)

FOREIGN PATENT DOCUMENTS

EP    1 089 516    4/2001
EP    1 191 420    3/2002

(Continued)

OTHER PUBLICATIONS

Anderson et al., A New Family of Authentication Protocols, 13 pages, Cambridge University Computer Laboratory, England.

(Continued)

*Primary Examiner* — Eleni Shiferaw
*Assistant Examiner* — Gregory M Elmore
(74) *Attorney, Agent, or Firm* — Meyer IP Law Group

(57) ABSTRACT

Access to digital content may be controlled by determining a digital content specification and associated authenticated rights locker access request, sending the authenticated rights locker access request and the digital content specification, and receiving a new authenticated rights locker access request and a Web page with clickable links in response to the sending, where at least one of the clickable links is associated with an authenticated digital content request. When an indication of a user selection of one of the clickable links is received, an authenticated digital content request associated with the user-selected clickable link is sent to a digital content repository. The digital content is received in response to the sending of the authenticated digital content request.

20 Claims, 63 Drawing Sheets

Related U.S. Application Data division of application No. 10/687,459, filed on Oct. 15, 2003, now Pat. No. 7,913,312, which is a continuation-in-part of application No. 10/243,858, filed on Sep. 13, 2002, now Pat. No. 7,363,651, and a continuation-in-part of application No. 10/243,355, filed on Sep. 13, 2002, now abandoned, and a continuation-in-part of application No. 10/243,218, filed on Sep. 13, 2002, now Pat. No. 7,512,972, and a continuation-in-part of application No. 10/243,474, filed on Sep. 13, 2002, now Pat. No. 7,240,365, and a continuation-in-part of application No. 10/243,287, filed on Sep. 13, 2002, now abandoned.

(51) Int. Cl.
| | |
|---|---|
| *H04W 12/00* | (2009.01) |
| *G06F 21/10* | (2013.01) |
| *H04L 9/32* | (2006.01) |
| *G06F 21/33* | (2013.01) |
| *G06F 21/62* | (2013.01) |
| *H04W 12/02* | (2009.01) |
| *H04W 12/08* | (2009.01) |
| *H04W 12/06* | (2009.01) |

(52) U.S. Cl.
CPC .............. *H04W 12/02* (2013.01); *H04W 12/08* (2013.01); *H04L 63/0435* (2013.01); *H04W 12/06* (2013.01); *H04L 63/123* (2013.01); *H04L 2463/101* (2013.01); *G06F 21/10* (2013.01); *H04L 9/3213* (2013.01); *G06F 21/335* (2013.01); *G06F 21/6218* (2013.01); *H04L 2209/60* (2013.01); *H04L 63/08* (2013.01); *H04L 9/3271* (2013.01); *H04L 63/10* (2013.01)
USPC .................. 726/29; 726/26; 726/27; 726/28; 726/30; 713/182

(56) References Cited

U.S. PATENT DOCUMENTS

| | | | |
|---|---|---|---|
| 5,594,227 | A | 1/1997 | Deo |
| 5,706,427 | A | 1/1998 | Tabuki |
| 5,757,920 | A | 5/1998 | Misra et al. |
| 5,764,910 | A | 6/1998 | Shachar |
| 5,774,670 | A | 6/1998 | Montulli |
| 5,784,464 | A | 7/1998 | Akiyama et al. |
| 5,802,518 | A | 9/1998 | Karaev et al. |
| 5,841,866 | A | 11/1998 | Bruwer et al. |
| 5,841,970 | A | 11/1998 | Tabuki |
| 5,862,325 | A | 1/1999 | Reed et al. |
| 5,905,987 | A | 5/1999 | Shutt et al. |
| 5,930,804 | A | 7/1999 | Yu et al. |
| 5,943,424 | A | 8/1999 | Berger et al. |
| 5,991,878 | A | 11/1999 | McDonough et al. |
| 6,003,039 | A | 12/1999 | Barry et al. |
| 6,018,627 | A | 1/2000 | Iyengar et al. |
| 6,023,698 | A | 2/2000 | Lavey, Jr. et al. |
| 6,041,357 | A | 3/2000 | Kunzelman et al. |
| 6,088,451 | A | 7/2000 | He et al. |
| 6,092,196 | A | 7/2000 | Reiche |
| 6,148,404 | A | 11/2000 | Yatsukawa |
| 6,199,169 | B1 | 3/2001 | Voth |
| 6,201,790 | B1 | 3/2001 | Teboul |
| 6,212,634 | B1 | 4/2001 | Geer, Jr. et al. |
| 6,226,744 | B1 | 5/2001 | Murphy et al. |
| 6,236,981 | B1 | 5/2001 | Hill |
| 6,275,941 | B1 | 8/2001 | Saito et al. |
| 6,286,104 | B1 | 9/2001 | Buhle et al. |
| 6,289,455 | B1 | 9/2001 | Kocher et al. |
| 6,308,274 | B1 | 10/2001 | Swift |
| 6,314,425 | B1 | 11/2001 | Serbinis et al. |
| 6,360,254 | B1 | 3/2002 | Linden et al. |
| 6,393,468 | B1 | 5/2002 | McGee |
| 6,397,329 | B1 | 5/2002 | Aiello et al. |
| 6,438,550 | B1 | 8/2002 | Doyle et al. |
| 6,483,433 | B2 | 11/2002 | Moskowitz et al. |
| 6,510,236 | B1 | 1/2003 | Crane et al. |
| 6,601,173 | B1 | 7/2003 | Mohler |
| 6,658,000 | B1 | 12/2003 | Raciborski et al. |
| 6,697,944 | B1 | 2/2004 | Jones et al. |
| 6,714,921 | B2 | 3/2004 | Pirolli et al. |
| 6,721,748 | B1 | 4/2004 | Knight et al. |
| 6,766,305 | B1 | 7/2004 | Hoover et al. |
| 6,834,351 | B1 | 12/2004 | Kabenjian |
| 6,859,807 | B1 | 2/2005 | Knight et al. |
| 6,892,306 | B1 | 5/2005 | En-Seung et al. |
| 6,898,711 | B1 | 5/2005 | Bauman et al. |
| 6,928,545 | B1 | 8/2005 | Litai et al. |
| 6,947,908 | B1 | 9/2005 | Slater |
| 6,947,910 | B2 | 9/2005 | Hsu et al. |
| 6,961,858 | B2 | 11/2005 | Fransdonk |
| 6,970,904 | B1 | 11/2005 | Rode |
| 6,981,015 | B1 | 12/2005 | Palmer et al. |
| 6,993,137 | B2 | 1/2006 | Fransdonk |
| 7,043,453 | B2 | 5/2006 | Stefik et al. |
| 7,083,095 | B2 | 8/2006 | Hendrick |
| 7,085,840 | B2 | 8/2006 | De Jong et al. |
| 7,136,631 | B1* | 11/2006 | Jiang et al. ............... 455/414.1 |
| 7,155,415 | B2 | 12/2006 | Russell et al. |
| 7,174,512 | B2 | 2/2007 | Martin et al. |
| 7,200,574 | B2 | 4/2007 | Stefik et al. |
| 2001/0000814 | A1 | 5/2001 | Montgomery et al. |
| 2002/0049679 | A1 | 4/2002 | Russell et al. |
| 2002/0059144 | A1 | 5/2002 | Meffert et al. |
| 2002/0067376 | A1 | 6/2002 | Martin et al. |
| 2002/0072413 | A1 | 6/2002 | Arias et al. |
| 2002/0082997 | A1 | 6/2002 | Kobata et al. |
| 2002/0138728 | A1 | 9/2002 | Parfenov et al. |
| 2002/0152163 | A1 | 10/2002 | Bezos et al. |
| 2002/0156905 | A1 | 10/2002 | Weissman |
| 2002/0157002 | A1 | 10/2002 | Messerges et al. |
| 2002/0165986 | A1 | 11/2002 | Tarnoff |
| 2002/0169854 | A1 | 11/2002 | Tarnoff |
| 2002/0169865 | A1 | 11/2002 | Tarnoff |
| 2002/0190876 | A1 | 12/2002 | Lai et al. |
| 2003/0037253 | A1 | 2/2003 | Blank et al. |
| 2003/0046548 | A1 | 3/2003 | Brown et al. |
| 2003/0046578 | A1 | 3/2003 | Brown et al. |
| 2003/0050919 | A1 | 3/2003 | Brown et al. |
| 2003/0061170 | A1 | 3/2003 | Uzo |
| 2003/0063750 | A1 | 4/2003 | Medvinsky et al. |
| 2003/0073440 | A1* | 4/2003 | Mukherjee et al. ........... 455/435 |
| 2003/0097564 | A1 | 5/2003 | Tewari et al. |
| 2003/0105734 | A1 | 6/2003 | Hitchen et al. |
| 2003/0126086 | A1 | 7/2003 | Safadi |
| 2003/0140257 | A1 | 7/2003 | Peterka et al. |
| 2003/0191838 | A1 | 10/2003 | Tsao |
| 2003/0196087 | A1 | 10/2003 | Stringer et al. |
| 2003/0208681 | A1 | 11/2003 | Muntz et al. |
| 2003/0208777 | A1 | 11/2003 | Danker et al. |
| 2003/0226012 | A1 | 12/2003 | Asokan et al. |
| 2003/0233462 | A1 | 12/2003 | Chien |
| 2004/0003270 | A1 | 1/2004 | Bourne et al. |
| 2004/0006693 | A1 | 1/2004 | Vasnani et al. |
| 2004/0010602 | A1 | 1/2004 | Van Vleck et al. |
| 2004/0015703 | A1 | 1/2004 | Madison et al. |
| 2004/0024652 | A1* | 2/2004 | Buhse et al. ............... 705/26 |
| 2004/0039916 | A1 | 2/2004 | Aldis et al. |
| 2004/0044779 | A1 | 3/2004 | Lambert |
| 2004/0054923 | A1 | 3/2004 | Seago et al. |
| 2004/0073903 | A1 | 4/2004 | Melchione et al. |
| 2004/0078341 | A1 | 4/2004 | Steichen |
| 2004/0107167 | A1 | 6/2004 | Maari |
| 2004/0117659 | A1 | 6/2004 | Karaoguz et al. |
| 2004/0205028 | A1 | 10/2004 | Verosub et al. |
| 2005/0004875 | A1 | 1/2005 | Kontio et al. |
| 2005/0086501 | A1 | 4/2005 | Woo et al. |
| 2005/0130585 | A1 | 6/2005 | Gnuschke et al. |
| 2005/0216419 | A1 | 9/2005 | Lee et al. |
| 2005/0246777 | A1 | 11/2005 | Fontijn et al. |
| 2005/0289076 | A1 | 12/2005 | Lambert |

(56) References Cited

U.S. PATENT DOCUMENTS

| | | | |
|---|---|---|---|
| 2008/0189297 | A1 | 8/2008 | Schultz |
| 2008/0260162 | A1 | 10/2008 | Jung et al. |
| 2008/0288515 | A1 | 11/2008 | Kim et al. |
| 2008/0306959 | A1 | 12/2008 | Spivack et al. |
| 2009/0089398 | A1 | 4/2009 | Lambert |

FOREIGN PATENT DOCUMENTS

| | | |
|---|---|---|
| GB | 2 352 850 | 2/2001 |
| WO | 97/08868 | 3/1997 |
| WO | 00/42491 | 7/2000 |
| WO | 02/41101 | 5/2002 |

OTHER PUBLICATIONS

Bhargavan et al., Secure Sessions for Web Services, ACM Transactions on Information and System Security, May 2007, pp. 1-46, vol. 10, No. 2, Article 8, ACM.

Chen, Java Card™ Technology for Smart Cards, Jun. 2000, pp. 11-16, Sun Microsystems.

Cordonnier et al., The Concept of Suspicion: A New Security Model for Identification Management in Smart Cards, http://inforge.unil.ch/isdss97/papers/48.htm, 1997.

Deianov, Authentication—Lamport Hash and Biometrics, printed on Jan. 9, 2002 from http://www.cs.cornell.edu/html/cs513-sp99NL12.html.

De Kerf et al., N-Count Fast, Low-Cost Secure Payments Using Smart Cards, QC Technology, ver. 1.1, Feb. 1997, 8 pages.

Goldreich, The Foundations of Modern Cryptography, May 2, 1998, Department of Computer Science and Applied Mathematics, ver. Nr. 3.1, 41 pages.

Hallam-Baker, Security Assertions Markup Language, May 14, 2001, ver. 0.7, pp. 1-24.

Herzberg et al., Security and Identification Indicators for Browsers Against Spoofing and Phishing Attacks, ACM Transactions on Internet Technology, Sep. 2008, pp. 1-36, vol. 8, No. 4, Article 16, ACM.

Islam et al., A Flexible Security Model for Using Internet Content, IBM Thomas J. Watson Research Center paper, Online!, Jun. 28, 1997.

Naor et al., Universal One-Way Hash Functions and Their Cryptographic Applications, Mar. 13, 1995, 14 pages.

Rivest, The MD4 Message Digest Algorithm, Request for Comments (RFC) 1320, MIT Laboratory for Computer Science and RSA Data Security, Inc., Apr. 1992, pp. 1-20.

Rivest, The MD5 Message-Digest Algorithm, Request for Comments (RFC) 1321, MIT Laboratory for Computer Science and RSA Data Security, Inc., Apr. 1992.

Samar, Single Sign-on Using Cookies for Web Applications, Enabling Technologies: Infrastructure for Collaborative Enterprises, 1999 (Wet Ice '99), Proceedings, IEEE 8th International Workshops on Stanford, CA, USA, Jun. 16-18, 1999, IEEE Comput. Soc., Los Alamitos, CA, USA, pp. 158-163, Jun. 16, 1999 (XPO10358606).

Schneier, Applied Cryptography, Section 8.1, Copyright 1999, pp. 170-175.

Woo et al., Authentication for Distributed Systems, IEEE Computer, pp. 39-52, Jan. 1992.

3rd Generation Partnership Project: Technical Specification, Group Terminals, USIM and IC Card Requirements (Release 4), 3GPP TS 21.111 V4.0.0, 2001.

3rd Generation Partnership Project 2: Removable User Identity Module for Spread Spectrum Systems, 3GPP2 C. S0023-A, Version 1.0, Sep. 13, 2002, pp. 1-1-5-2, A1-A4.

Digital Cellular Telecommunications Systems (Phase 2+), AT Command Set for GSM Mobile Equipment (ME), ETSI TS 100 916 V7.4.0, 1998.

Kerberos: The Network Authentication Protocol, printed on Jan. 9, 2002 from http://web.mit.edu/kerberos/www/.

Secure Hash Standard, Federal Information Processing Standard Publication 180-1, Apr. 17, 1995.

Smart Card Stage I Description, Version 1.1, CDMA Development Group—Smart Card Team Document, May 22, 1996.

Wireless Identity Module Pert: Security, Version 12, Wireless Application Protocol WAP-260-WIM 20010712-a, Jul. 2001.

Feigenbaum et al., Privacy Engineering for Digital Rights Management System, 2002, Springer-Verlag Berlin Gidelberg, pp. 76-99.

Sander, T., Golden Times for Digital Rights Management? 2002, Springer-Verlag Berlin Gidelberg, pp. 64-74.

\* cited by examiner 600 602 604 606 608

Delivery-Scheme://Content-Domain/Content-Directory/Content-Item?Content-Reference-Parameters

FIG. 6A 610 612 614 616 618 620

Delivery-Scheme://Access-Domain/Content-Directory/Content-Item?Token&Delivery-Parameters

FIG. 6B 630 632 634 636 638 640 642

Delivery-Scheme://Access-Domain/Content-Directory/Content-Item?Token=Token&Delivery-Parameters

FIG. 6C 650 652 654 656

Delivery-Scheme://Access-Domain/Token?Delivery-Parameters

FIG. 6D 660 662 664 666 668

Delivery-Scheme://Access-Domain/Token/Content-Item?Delivery-Parameters

FIG. 6E 670 672 674 676 678 670

Delivery-Scheme://Access-Domain/Token/Content-Locker/Content-Item?Delivery-Parameters

Delivery-Scheme://Access-Domain/Servlet/Token?Delivery-Parameters

FIG. 7A

Delivery-Scheme://Access-Domain/Servlet/Token/Content-Item?Delivery-Parameters

FIG. 7B

Delivery-Scheme://Access-Domain/Servlet/Token/Content-Locker/Content-Item?Delivery-Parameters

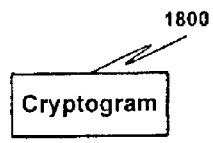
FIG. 18A
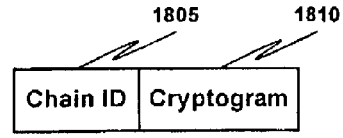
FIG. 18B
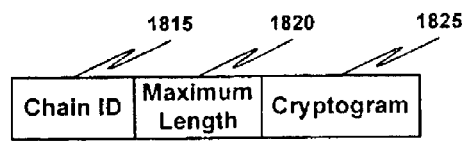
FIG. 18C
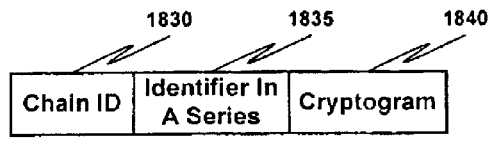
FIG. 18D
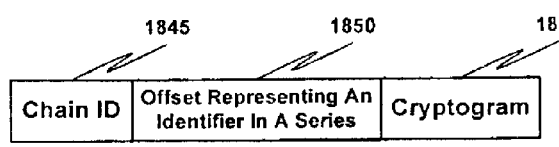
FIG. 18E
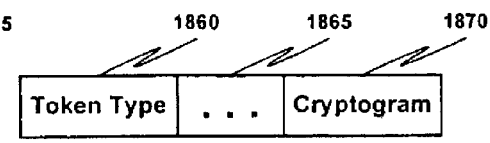
FIG. 18F
FIG. 18

EMBEDDED CONTENT REQUESTS IN A RIGHTS LOCKER SYSTEM FOR DIGITAL CONTENT ACCESS CONTROL

CLAIM OF PRIORITY AND CROSS REFERENCE TO RELATED APPLICATIONS

This application is a continuation of U.S. patent application Ser. No. 12/931,800, filed Feb. 9, 2011, titled "Embedded Content Requests in a Rights Locker System for Digital Content Access Control", which is a divisional of U.S. patent application Ser. No. 10/687,459, filed Oct. 15, 2002, titled "Embedded Content Requests in a Rights Locker System for Digital Content Access Control", which is a continuation in part of:

U.S. patent application Ser. No. 10/243,858, filed Sep. 13, 2002, titled "System for Digital Content Access Control";

U.S. patent application Ser. No. 10/243,355, filed Sep. 13, 2002, titled "Accessing for Digital Content Access Control";

U.S. patent application Ser. No. 10/243,218, filed Sep. 13, 2002, titled "Synchronizing for Digital Content Access Control";

U.S. patent application Ser. No. 10/243,474, filed Sep. 13, 2002, titled "Repositing for Digital Content Access Control"; and U.S. patent application Ser. No. 10/243,287, filed Sep. 13, 2002, titled "Provisioning for Digital Content Access Control", each of which above applications are herein incorporated by reference.

This application is related to the following applications:

U.S. patent application Ser. No. 10/014,893, filed Oct. 29, 2001 in the name of inventors Eduard K. de Jong, Moshe Levy and Albert Leung, entitled "User Access Control to Distributed Resources on a Data Communications Network", commonly assigned herewith.

U.S. patent application Ser. No. 10/040,270, filed Oct. 29, 2001 in the name of inventors Eduard K. de Jong, Moshe Levy and Albert Leung, entitled "Enhanced Privacy Protection in Identification in a Data Communications Network", commonly assigned herewith.

U.S. patent application Ser. No. 10/014,823, filed Oct. 29, 2001 in the name of inventors Eduard K. de Jong, Moshe Levy and Albert Leung, entitled "Enhanced Quality of Identification in a Data Communications Network", commonly assigned herewith.

U.S. patent application Ser. No. 10/014,934, filed Oct. 29, 2001 in the name of inventors Eduard K. de Jong, Moshe Levy and Albert Leung, entitled "Portability and Privacy with Data Communications Network Browsing", commonly assigned herewith.

U.S. patent application Ser. No. 10/033,373, filed Oct. 29, 2001 in the name of inventors Eduard K. de Jong, Moshe Levy and Albert Leung, entitled "Managing Identification in a Data Communications Network", commonly assigned herewith.

U.S. patent application Ser. No. 10/040,293, filed Oct. 29, 2001 in the name of inventors Eduard K. de Jong, Moshe Levy and Albert Leung, entitled "Privacy and Identification in a Data Communications Network", commonly assigned herewith.

U.S. patent application Ser. No. 10/669,160, filed Sep. 22, 2003 in the name of inventor Eduard K. de Jong, entitled "Controlled Delivery of Digital Content in a System for Digital Content Access Control", commonly assigned herewith.

U.S. patent application Ser. No. 10/668,867, filed Sep. 22, 2003 in the name of inventor Eduard K. de Jong, entitled "Accessing for Controlled Delivery of Digital Content in a System for Digital Content Access Control", commonly assigned herewith.

U.S. patent application Ser. No. 10/687,415, filed Oct. 15, 2003 in the name of inventor Eduard K. de Jong, entitled "Rights Locker For Digital Content Access Control", commonly assigned herewith.

U.S. patent application Ser. No. 10/687,217, filed Oct. 15, 2003 in the name of inventor Eduard K. de Jong, entitled "Accessing in a Rights Locker System for Digital Content Access Control", commonly assigned herewith.

U.S. patent application Ser. No. 10/687,488, filed Oct. 15, 2003 in the name of inventor Eduard K. de Jong, entitled "Rights Maintenance in a Rights Locker System for Digital Content Access Control", commonly assigned herewith.

FIELD OF THE INVENTION

The present invention relates to the field of computer science. More particularly, the present invention relates to embedded content requests in a rights locker system for digital content access control.

BACKGROUND OF THE INVENTION

FIG. 1 is a block diagram that illustrates a typical mechanism for digital content access control. A mobile phone operator 100 includes a portal 150 by which one or more mobile phones 125-140 communicate with one or more content producers 105-120 via a network 175 such as the Internet. Mobile phone operator 100 also includes a product catalog 145 that includes a description of digital content 155-170 stored by digital content producers 105-170. A particular digital content producer controls access to digital content stored by the digital content producer. Thus, authenticators 180-195 control access to digital content 155-170, respectively.

A user desiring access to digital content 155-170 stored by a digital content producer 105-120 uses a mobile phone 125-140 to issue an access request to a particular digital content producer 105-120. The digital content producer 105-195 authenticates the user making the request. The authentication typically includes prompting the user for a username and a password if the username and password is not included with the initial access request. Upon successful user authentication, the digital content producer 105-120 may grant access to the digital content 155-170. Alternatively, the digital content producer 105-120 may issue a token that may be presented at a later time and redeemed in exchange for access to the digital content.

Unfortunately, the bandwidth available for communications with digital content producers 105-120 is relatively limited. If the available bandwidth is exceeded, a user may be denied service. This problem is exacerbated as the number of users increases.

Accordingly, a need exists in the prior art for a digital content access control solution that requires relatively less communication with digital content producers. A further need exists for such a solution that is relatively secure. Yet another need exists for such a solution that is relatively scaleable.

SUMMARY OF THE INVENTION

Access to digital content may be controlled by determining a digital content specification and associated authenticated rights locker access request, sending the authenticated rights locker access request and the digital content specification, and receiving a new authenticated rights locker access request and a Web page with clickable links in response to the sending, where at least one of the clickable links is associated with an authenticated digital content request. When an indication of a user selection of one of the clickable links is received, an authenticated digital content request associated with the user-selected clickable link is sent to a digital content repository. The digital content is received in response to the sending of the authenticated digital content request.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 6A is a diagram that illustrates a universal resource locator (URL).

FIG. 6B is a diagram that illustrates a tokenized URL having an appended token in accordance with one embodiment of the present invention.

FIG. 6C is a diagram that illustrates a tokenized URL having an appended parameterized token in accordance with one embodiment of the present invention.

FIG. 6D is a diagram that illustrates a tokenized URL for use in accessing digital content at a content repository having an access domain dedicated to accepting tokenized URLs in accordance with one embodiment of the present invention.

FIG. 6E is a diagram that illustrates a tokenized URL for use in accessing digital content at a content repository having an access domain dedicated to accepting tokenized URLs in accordance with one embodiment of the present invention.

FIG. 6F is a diagram that illustrates a tokenized URL for use in accessing digital content at a particular content locker of a content repository having an access domain dedicated to accepting tokenized URLs in accordance with one embodiment of the present invention.

FIG. 7A is a diagram that illustrates a tokenized URL for use in accessing a content repository having an access domain capable of performing functions in addition to accepting tokenized URLs in accordance with one embodiment of the present invention.

FIG. 7B is a diagram that illustrates a tokenized URL for use in accessing digital content at a content repository having an access domain capable of performing functions in addition to accepting tokenized URLs in accordance with one embodiment of the present invention.

FIG. 7C is a diagram that illustrates a tokenized URL for use in accessing digital content at a particular content locker of a content repository having an access domain capable of performing functions in addition to accepting tokenized URLs in accordance with one embodiment of the present invention.

FIG. 18A is a diagram that illustrates a token in accordance with one embodiment of the present invention.

FIG. 18B is a diagram that illustrates a token that comprises a chain ID in accordance with one embodiment of the present invention.

FIG. 18C is a diagram that illustrates a token that comprises a chain ID and a maximum length in accordance with one embodiment of the present invention.

FIG. 18D is a diagram that illustrates a token that comprises a chain ID and an identifier in a series in accordance with one embodiment of the present invention.

FIG. 18E is a diagram that illustrates a token that comprises a chain ID and an offset representing an identifier in a series in accordance with one embodiment of the present invention.

FIG. 18F is a diagram that illustrates a token that comprises a token type in accordance with one embodiment of the present invention.

DETAILED DESCRIPTION

Figure 1:
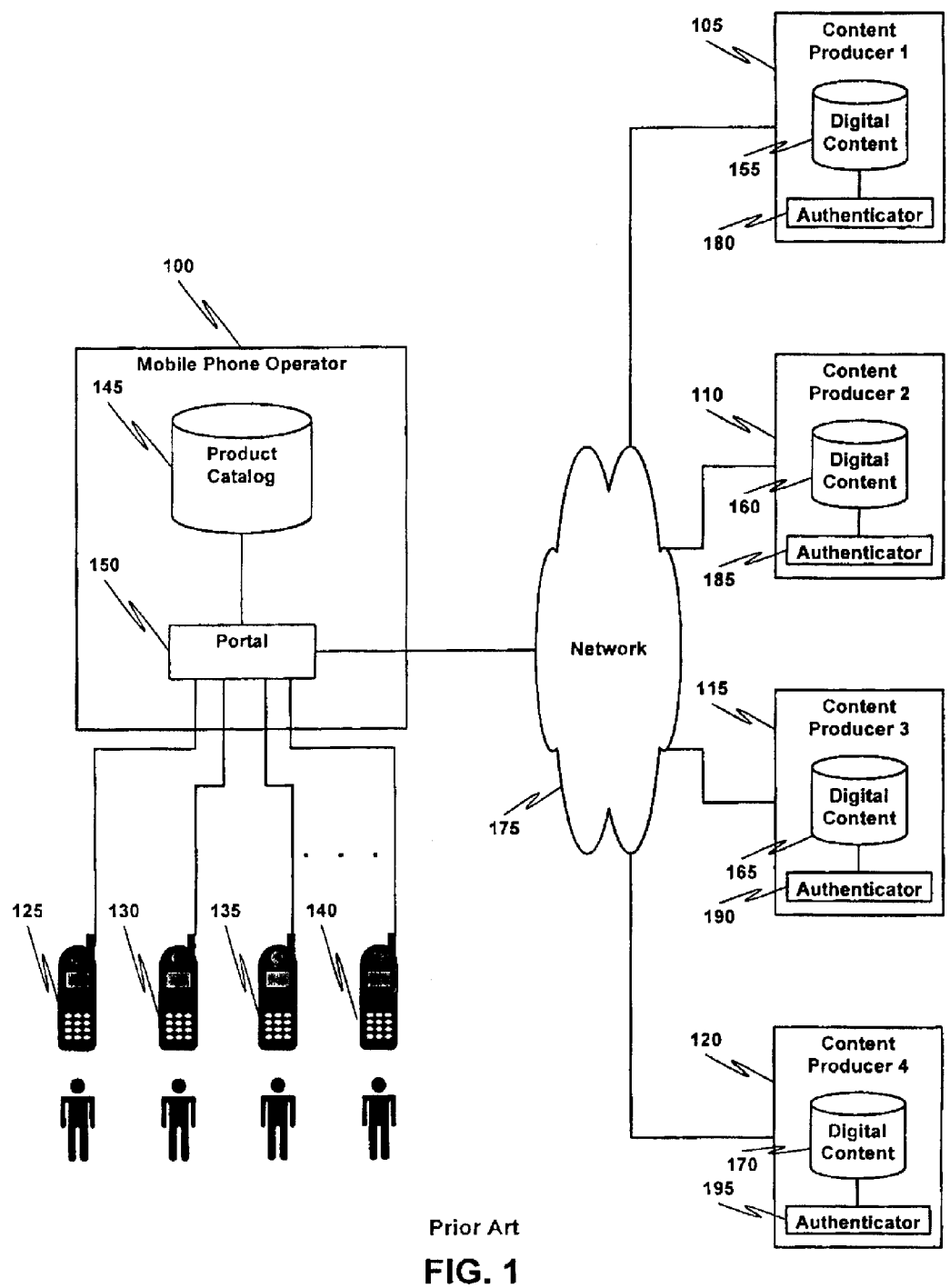
FIG. 1 is a block diagram that illustrates a typical mechanism for digital content access control.

Embodiments of the present invention are described herein in the context of embedded content requests in a rights locker system for digital content access control. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "randomized" describes the result of a random or pseudo-random number generation process. A "randomized process" describes the application of such a result to a process. Methods of generating random and pseudo-random numbers are known by those skilled in the relevant art.

In the context of the present invention, the term "identifier" describes one or more numbers, characters, symbols, or the like. More generally, an "identifier" describes any entity that can be represented by one or more bits.

In the context of the present invention, the term "authenticator" describes an identifier for use in obtaining access to digital content associated with the authenticator.

In the context of the present invention, the term "token" describes an authenticator comprising a cryptogram.

In the context of the present invention, the term "cryptographic one-way function" describes any cryptographic process that produces an output based upon an input, such that it is computationally infeasible to compute the input based upon the output. Exemplary cryptographic one-way functions comprise the MD4 algorithm and the MD5 algorithm. The MD4 algorithm is described in R. Rivest, *The MD4 Message Digest Algorithm*, Request for Comments (RFC) 1320, MIT Laboratory for Computer Science and RSA Data Security, Inc., April 1992. The MD5 algorithm is described in Rivest. R. *The MD5 Message-Digest Algorithm*, Request for Comments (RFC) 1321, MIT Laboratory for Computer Science and RSA Data Security, Inc., April 1992.

In the context of the present invention, the term "rights locker" is defined as an entity that provides (1) a description of a user's access rights for digital content, and (2) controlled access to the description.

In the context of the present invention, the term "Web page" describes a block of data available on a data communications network such as the World-Wide Web (WWW), identified by a Universal Resource Locator (URL). A Web page may comprise a file written in Hypertext Markup Language (HTML) and stored on a Web server. A Web page may also refer to one or more images which appear as part of the page when it is displayed by a Web browser. The server may also generate one or more Web pages dynamically in response to a request, e.g. using a CGI script. An HTML Web page may include one or more hypertext links ("clickable links") that refer to one or more other Web pages or resources. A user viewing the Web page using a browser may access the one or more other Web pages or resources by clicking on or otherwise activating the corresponding hypertext link.

In the context of the present invention, the term "bookmark" describes a link stored in a Web browser for future reference to a Web page or resource.

In the context of the present invention, the term "Web cookie" describes packet of information sent by a Web server to a Web browser and then sent back by the Web browser each time the Web browser accesses that particular Web server.

In the context of the present invention, the term "HTTP Request" describes a Web browser-initiated request for information from a Web server.

In the context of the present invention, the term "HTTP Response" describes a response from a Web server to an HTTP Request.

Figure 2:
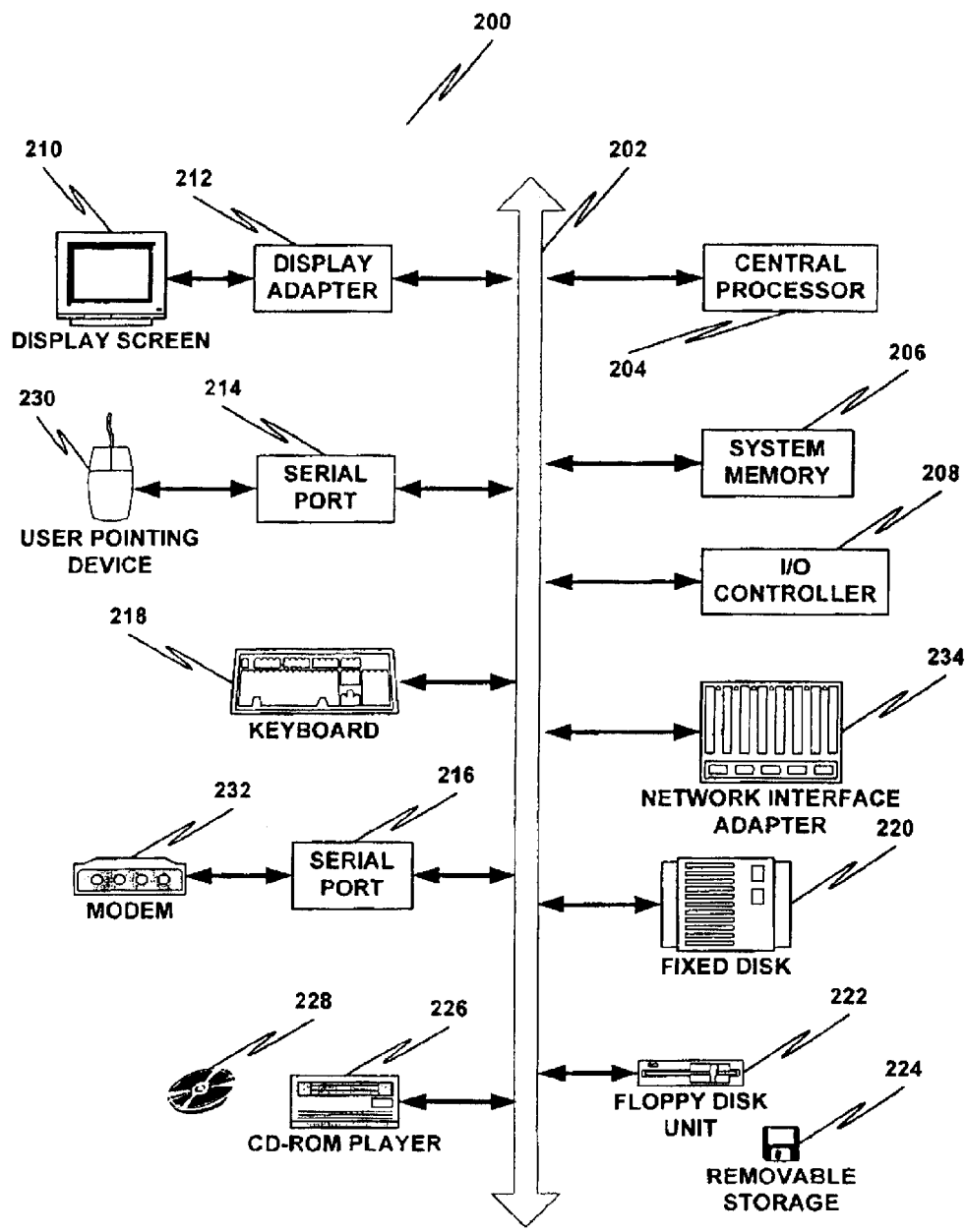
FIG. 2 is a block diagram of a computer system suitable for implementing aspects of the present invention.

FIG. 2 depicts a block diagram of a computer system 200 suitable for implementing aspects of the present invention. As shown in FIG. 2, computer system 200 comprises a bus 202 which interconnects major subsystems such as a central processor 204, a system memory 206 (typically RAM), an input/output (I/O) controller 208, an external device such as a display screen 210 via display adapter 212, serial ports 214 and 216, a keyboard 218, a fixed disk drive 220, a floppy disk drive 222 operative to receive a floppy disk 224, and a CD-ROM player 226 operative to receive a CD-ROM 228. Many other devices can be connected, such as a pointing device 230 (e.g., a mouse) connected via serial port 214 and a modem 232 connected via serial port 216. Modem 232 may provide a direct connection to a server via a telephone link or to the Internet via a POP (point of presence). Alternatively, a network interface adapter 234 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 206 or stored on storage media such as fixed disk 220, floppy disk 224 or CD-ROM 228.

Figure 3:
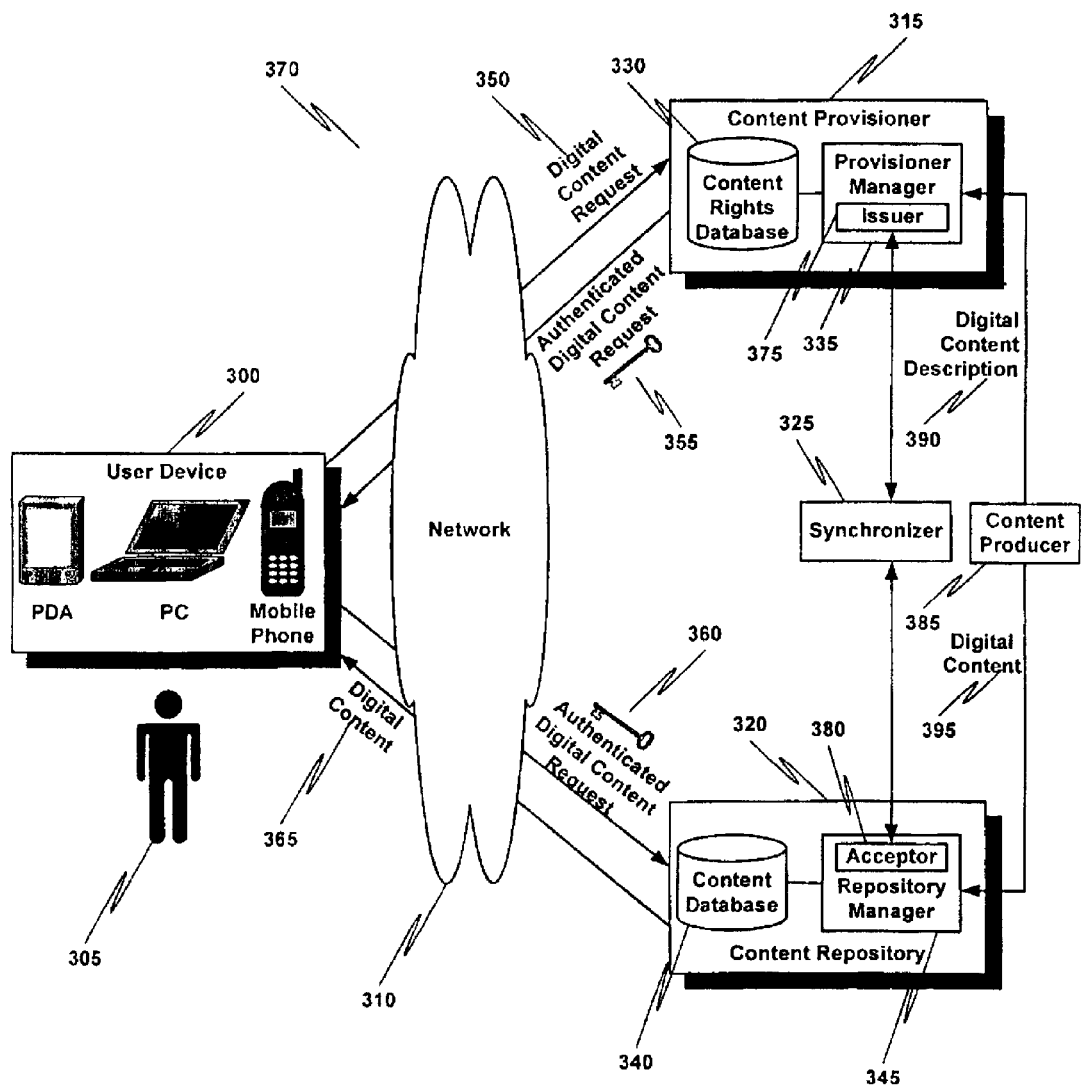
FIG. 3 is a block diagram that illustrates a system for digital content access control in accordance with one embodiment of the present invention.

Turning now to FIG. 3, a block diagram that illustrates a system for digital content access control in accordance with one embodiment of the present invention is presented. System 370 may comprise at least one user device 300, at least one content provisioner 315 and at least one content repository 320 that communicate via a network 310. System 370 may also comprise a synchronizer 325 in communication with the content provisioner 315 and the content repository 320. User device 300 is configured to send a digital content request 350 and receive digital content 365 in response to the digital content request 350.

User device 300 may be any device configured to render digital content to a user 305. By way of example, user device 300 may comprise a personal digital assistant (PDA), a personal computer (PC), a mobile phone, a digital audio player (such as an MP3 player), a game console, a server computer in communication with a user display, or the like. According to another embodiment of the present invention, user device 300 comprises a secure portable device such as a Java Card™ technology-enabled device, or the like. Java Card™ technology is described in Chen, Z. *Java Card™ Technology for Smart Cards—Architecture and Programmer's Guide*, Boston, Addison-Wesley, 2000.

According to one embodiment of the present invention, user device 300 comprises a CDMA technology-enabled smart card. CDMA technology-enabled smart cards are described in *Smart Card Stage I Description*, Version 1.1, CDMA Development Group—Smart Card Team Document (May 22, 1996).

According to another embodiment of the present invention, user device 300 comprises a SIM (Subscriber Identity Module card) card. The term "SIM card" describes the smart card used in GSM (Global System for Mobile Communications) mobile telephones. The SIM comprises the subscriber's personal cryptographic identity key and other information such as the current location of the phone and an address book of frequently called numbers. The SIM is described in *Digital cellular telecommunications system (phase 2+); Specification of the Subscriber Identity Module-Mobile Equipment (SIM-ME) interface*, ETSI, GSM 11.11 version 7.4.0, Release 1998.

According to another embodiment of the present invention, user device 300 comprises a WIM (Wireless Interface Module). A WIM is a smart card in a WAP (Wireless Application Protocol) phone. It is described in *Wireless Identity Module Part: Security*, WAP-260-WIM-20010712-a, Wireless Application Protocol Forum, Jul. 12, 2001.

According to another embodiment of the present invention, user device 300 comprises a USIM (Universal Subscriber Identity Module). A USIM is a smart card for a 3GPP ($3^{rd}$ Generation Partnership Project) mobile phone. It is described in 3*rd Generation Partnership Project; Technical Specification Terminals; USIM and IC card requirements*, Release 4, 3GPP TS 21.111 V4.0.0 (2001-03).

According to another embodiment of the present invention, user device 300 comprises a UIM (User Identity Module). A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries. The R-UIM is described in a specification issued by the 3rd Generation Partnership Project 2 (3GPP2) and entitled 3rd Generation Partnership Project 2; Removable User Identity Module (R-UIM) for cdma2000 Spread Spectrum Systems, 3GPP2 C.S0023-0, Jun. 9, 2000.

The above description regarding various mobile phone technologies is not intended to be limiting in any way. Those of ordinary skill in the art will recognize that other user devices may be used.

Referring again to FIG. 3, content provisioner 315 is configured to receive a digital content request 350 and return an authenticated digital content request 355 in response to the received digital content request 350. Content provisioner 315 may comprise a content rights database 330 to store an association between one or more users and a description of the digital content that the one or more users are authorized to access. Content provisioner 315 may also comprise a provisioner manager 335 in communication with the content rights database 330. Provisioner manager 335 is configured to receive a digital content request 350 and communicate with content rights database 330 to determine whether the user 305 that made the request 350 is authorized to access the digital content associated with the request 350. Provisioner manager 335 may comprise an issuer 375 to issue a token for use in creating an authenticated digital content request 355. Alternatively, content provisioner 315 may comprise an issuer external to and in communication with a provisioner manager. Provisioner manager 335 is also configured to communicate with user device 300 to obtain user authentication data such as a password, PIN, biometric data or the like. If the user device 300 comprises a mobile phone, the user authentication data may also comprise a mobile phone subscriber ID, or the like. According to one embodiment of the present invention, the authenticated digital content request 355 comprises a cryptogram based at least in part on an identifier that describes the location of the digital content for which access is authorized. According to another embodiment of the present invention, the cryptogram comprises at least one token from a token pool associated with the location of the digital content for which access is authorized.

Content repository 320 is configured to receive an authenticated digital content request 360 and return digital content 365 corresponding to the authenticated digital content request 360. Content repository 320 may comprise a content database 340 to store digital content corresponding to at least one digital content description stored by at least one content provisioner 315. Content repository 320 also may comprise a repository manager 345 in communication with the content database 340. Repository manager 345 is configured to receive an authenticated digital content request 360, communicate with the content database 340 to determine whether the authenticated digital content request 360 is valid and return the digital content associated with the authenticated digital content request when the authenticated digital content request is valid. Repository manager 345 may also comprise an acceptor 380 to accept a token and determine whether the access to the digital content associated with the authenticated digital content request is authorized based at least in part on the token. Alternatively, content repository 320 may comprise an acceptor external to and in communication with a repository manager 345.

Synchronizer 325 is configured to synchronize the information used by the content provisioner 315 to create authenticated digital content requests with the information used by content repository 320 to validate digital content requests. The authenticated digital content request information may comprise, by way of example, a token pool, information for use in generating a token pool, and the number of tokens released by the content provisioner 315. According to one embodiment of the present invention, the content provisioner 315 triggers the synchronization. According to another embodiment of the present invention, the content repository 320 triggers the synchronization. According to another embodiment of the present invention, the synchronization is triggered by the synchronizer, based at least in part on a predetermined schedule.

According to one embodiment of the present invention, a content provisioner comprises a synchronizer (not shown in FIG. 3). According to another embodiment of the present invention, a content repository comprises a synchronizer (not shown in FIG. 3).

In operation, user device 300 sends a digital content request 350 to content provisioner 315. According to one embodiment of the present invention, the digital content request 350 may be based at least in part on information received from content provisioner 315. This information may comprise, by way of example, an indication of one or more services available to user 305. Provisioner manager 335 in content provisioner 315 receives the digital content request 350 and communicates with content rights database 330 to determine whether the user 305 that made the request 350 is authorized to access the digital content associated with the request 350. Provisioner manager 335 may also communicate with user device 300 to obtain user authentication data such as a password, PIN, biometric data or the like. If the user device 300 comprises a mobile phone, the user authentication data may also comprise a mobile phone subscriber ID, or the like. If the user 305 that made the request 350 is authorized to access the digital content 365 associated with the digital content request 350, issuer 335 issues a token and provisioner manager 335 sends an authenticated digital content request 355 based at least in part on the token to user device 300. User device 300 receives the authenticated digital content request 355 and then sends the authenticated digital content request 360 to a content repository 320. Repository manager 345 in content repository 320 receives the authenticated digital content request 320 and communicates with acceptor 380 and content database 340 to determine whether the authenticated digital content request 360 is valid. If the authenticated digital content request 360 is valid, repository manager 345 returns the digital content 365 associated with the authenticated digital content request 360. User device 300 receives the digital content 365 for use by user 305.

Figure 4:
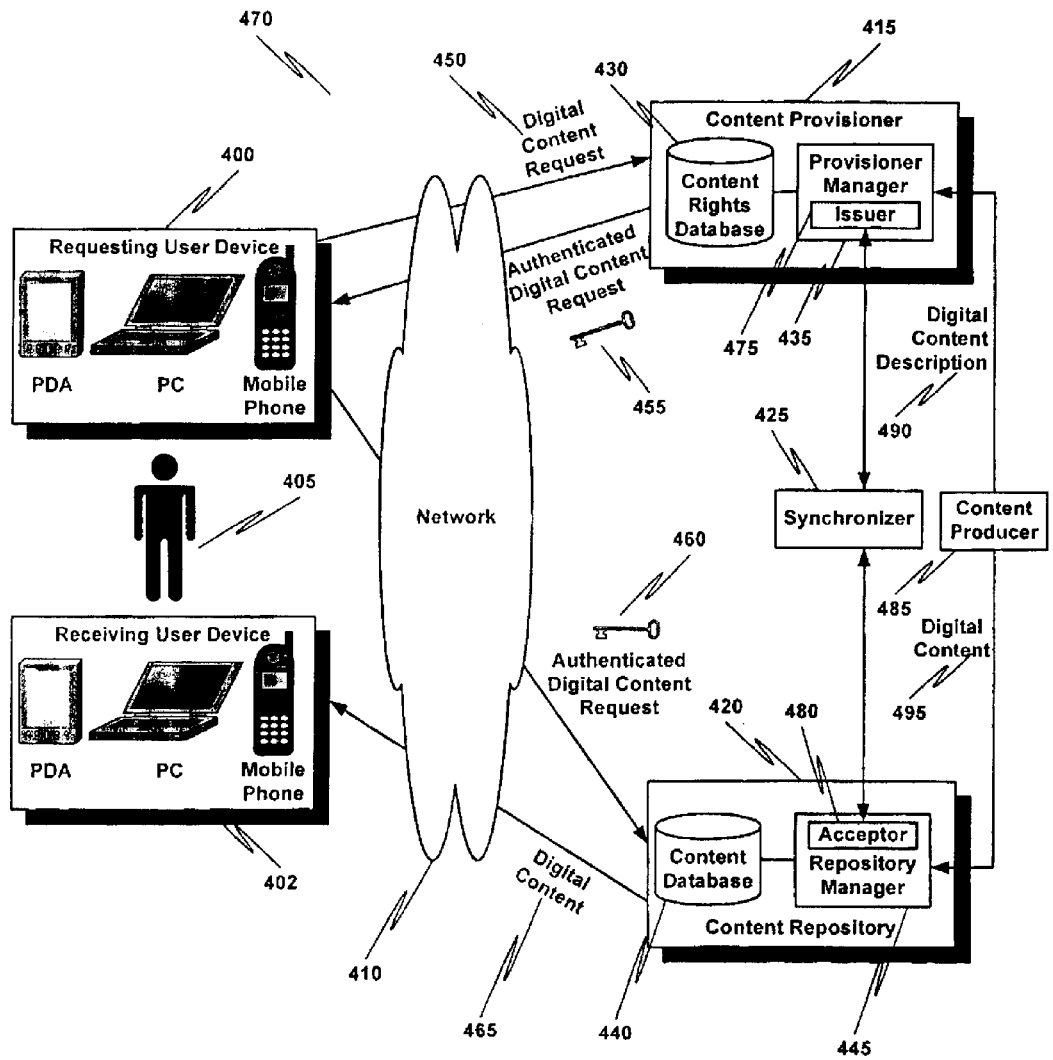
FIG. 4 is a block diagram that illustrates a system for digital content access control with a requesting user device and a receiving user device in accordance with one embodiment of the present invention.

Turning now to FIG. 4, a block diagram that illustrates a system for digital content access control with a requesting user device and a receiving user device in accordance with one embodiment of the present invention is presented. FIG. 4 is similar to FIG. 3, except that FIG. 4 illustrates both a requesting user device 400 and a receiving user device 402.

Requesting user device 400 may be any device configured to accept user input and communicate over a communications network 410. Receiving user device 402 may be any device configured to render digital content to a user 405. By way of example, user device 402 may comprise a PDA, a PC, a mobile phone, a digital audio player (such as an MP3 player), a game console, a server computer in communication with a user display, or the like.

In operation, requesting user device 400 communicates with content provisioner 415 to obtain an authenticated digital content request 455. The authenticated digital content request 455 may comprise one or more delivery parameters that indicate a receiving user device to receive digital content associated with the authenticated digital content request 455. Alternatively, the authenticated digital content request 455 may be used to obtain delivery information. Requesting user device 400 sends the authenticated digital content request 460 to a content repository 420. Repository manager 445 in content repository 420 receives the authenticated digital content request 420 and communicates with acceptor 480 and content database 440 to determine whether the authenticated digital content request 460 is valid. If the authenticated digital content request 460 is valid, repository manager 445 sends the digital content 465 associated with the authenticated digital content request 460 to receiving device 402.

According to one embodiment of the present invention, requesting user device 400 comprises a user device having a relatively rich user interface such as a mobile phone or the like and receiving user device 402 comprises a user device having a relatively limited user interface such as an MP3 (MPEG Audio Layer-3) player or the like.

Figure 5:
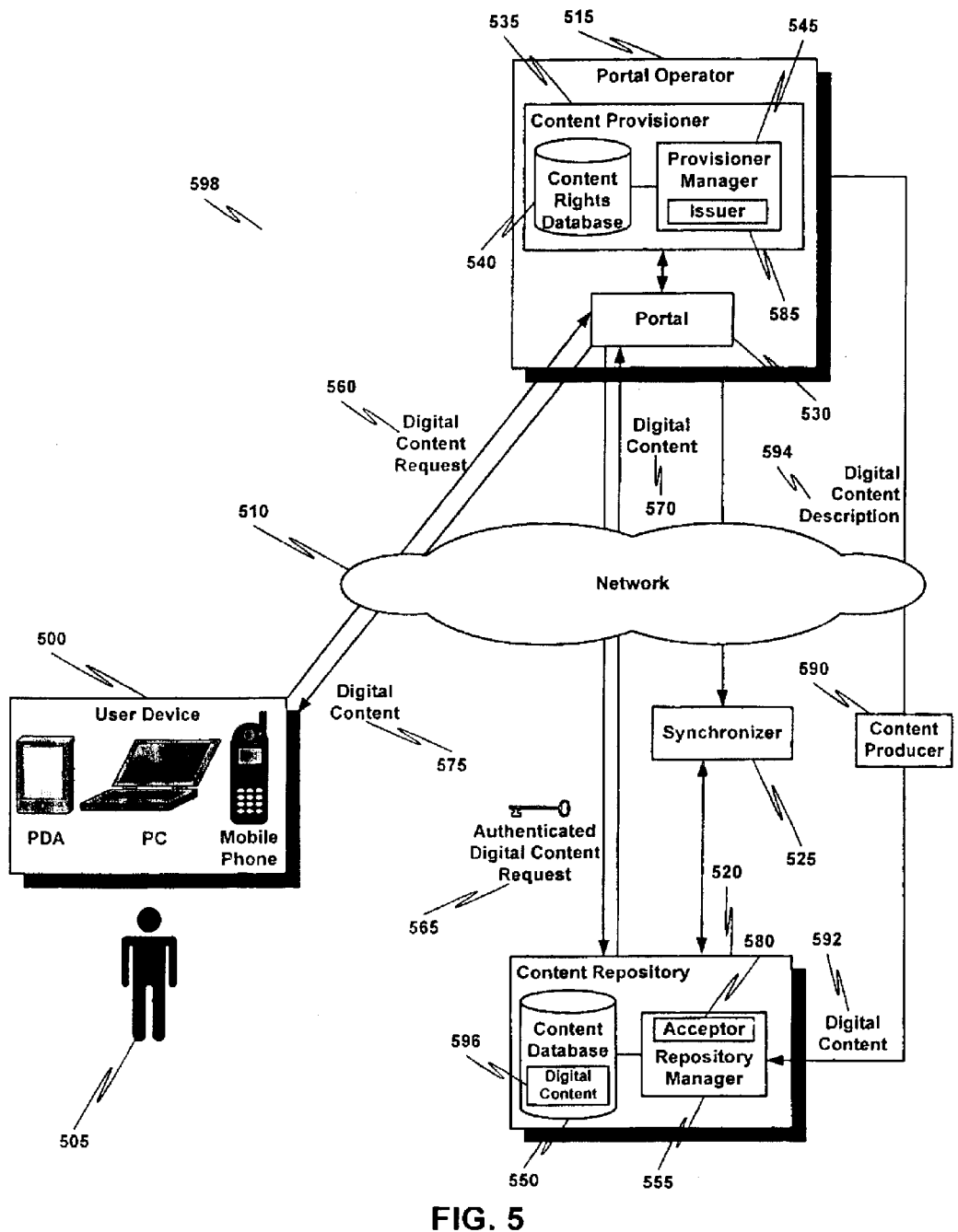
FIG. 5 is a block diagram that illustrates a system for digital content access control using a portal in accordance with one embodiment of the present invention.

Turning now to FIG. 5, a block diagram that illustrates a system for digital content access control using a portal in accordance with one embodiment of the present invention is presented. FIG. 5 is similar to FIG. 3, except that in FIG. 5, user device 500 communicates with content repository 520 via a portal operator 515 that comprises at least one content provisioner 535. Whereas in FIG. 3, user device 300 communicates with content repository 320 directly via network 310.

In operation, user device 500 sends a digital content request 560 to portal 530 operated by portal operator 515. Portal 530 receives the digital content request 560 and communicates with provisioner manager 545 in content provisioner 535. Portal 530 may also communicate with user device 500 to obtain user authentication data such as a password, PIN, biometric data or the like. If the user device 500 comprises a mobile phone, the user authentication data may also comprise a mobile phone subscriber ID, or the like. Provisioner manager 545 receives the digital content request 560 and communicates with content rights database 540 to determine whether the user 505 that made the request 560 is authorized to access the digital content associated with the request 560. If the user 505 that made the request 560 is authorized to access the digital content associated with the request 560, issuer 585 issues an authenticator such as a token or the like and provisioner manager 545 sends an authenticated digital content request 565 based at least in part on the authenticator to content repository 520. Repository manager 555 in content repository 520 receives the authenticated digital content request 565 and communicates with acceptor 580 and content database 550 to determine whether the authenticated digital content request 565 is valid. The authenticated digital content request 565 is valid if the digital content specified by the authenticated digital content request is associated with the authenticator portion of the authenticated digital content request. If the authenticated digital content request 565 is valid, repository manager 555 returns the digital content 570 associated with the authenticated digital content request 565. Portal operator 515 receives the digital content 570 and sends the digital content 575 to user device 500. User device 500 receives the digital content 575 for use by user 505. Alternatively, repository manager 555 may return the digital content 570 directly to user device 500 instead of routing the digital content through the portal operator 515. The delivery method may be based at least in part on information from the authenticated digital content request.

According to embodiments of the present invention, a token authenticates a specification (such as a URL) of protected digital content. Validation of a token comprises determining whether the token authenticates a specification of digital content for which access is requested. These concepts are described in more detail below with reference to FIGS. 6A-6F and FIGS. 7A-7C.

FIG. 6A is a diagram that illustrates a URL. Content domain indicator 602 specifies the host name of a Web server. Content directory indicator 604 specifies a directory at content domain 602 and accessed via delivery scheme 600 where the digital content specified by content item indicator 606 is stored. Exemplary delivery schemes comprise HTTP (Hypertext Transfer Protocol) and FTP (File Transfer Protocol).

FIGS. 6B-6F and 7A-7C are diagrams that illustrate tokenized URLs for use in accessing digital content stored at a content repository in accordance with embodiments of the present invention. FIG. 6B illustrates a tokenized URL having an appended token. FIG. 6C illustrates a tokenized URL having an appended parameterized token. FIG. 6D illustrates using a tokenized URL to provide relatively fine-grained access control for digital content stored by a content repository having an access domain dedicated to accepting tokenized URLs, while FIG. 6F illustrates using a tokenized URL to provide relatively coarse-grained access control for digital content stored by a content repository having an access domain dedicated to accepting tokenized URLs. Similarly, FIG. 7A illustrates using a tokenized URL to provide relatively fine-grained access control for digital content stored by a content repository having an access domain capable of performing functions in addition to accepting tokenized URLs, while FIG. 7C illustrates using a tokenized URL to provide relatively coarse-grained access control for digital content stored by a content repository having an access domain capable of performing functions in addition to accepting tokenized URLs. FIGS. 6B-6F and 7A-7C are discussed in more detail below.

FIG. 6B is a diagram that illustrates a tokenized URL having an appended token in accordance with one embodiment of the present invention. Access domain indicator 612 in combination with delivery scheme indicator 610 specifies the URL of a content repository. Content directory indicator 614 specifies the pathname of a directory for at least one digital content item. Content item indicator 616 specifies a pathname for digital content located within content directory 614 at access domain 612 for which access is requested and controlled by the token 618. Token indicator 618 specifies a token to use to access digital content within a context associated with the token. In this case, the context associated with the token comprises content item 616 within content directory 614 located at access domain 612. The token specifies a collection of digital content items made accessible by the token. Presenting token 618 entitles the presenter access to digital content 616 within content directory 614 at access domain 612.

FIG. 6C is a diagram that illustrates a tokenized URL having an appended parameterized token in accordance with one embodiment of the present invention. FIG. 6C is similar to FIG. 6B except that a "Token=" named parameter or keyword 638 is used to delimit a token 640 in FIG. 6C.

FIG. 6D is a diagram that illustrates a tokenized URL for use in accessing digital content at a content repository having an access domain dedicated to accepting tokenized URLs in accordance with one embodiment of the present invention. Access domain indicator 632 in combination with delivery scheme 650 specifies the URL of a content repository and token indicator 654 specifies a token to use to access digital content for a specific item located at access domain 632. The token specifies a single digital content item made accessible by the token, thus providing relatively fine-grained access control. Presenting token 654 entitles the presenter access to digital content at access domain 632. According to one embodiment of the present invention, delivery parameter indicator 656 is derived from a rights database (such as content rights database 540 of FIG. 5). Delivery parameter indicator 656 may indicate, by way of example, a cryptographic protection protocol, a destination address, a process to perform on the digital content before delivery, or any combination thereof. Delivery parameter indicator 656 may also comprise one or more content reference parameters. According to another embodiment of the present invention, delivery scheme indicator 650 specifies a specialized protocol that is private to a user device and particular digital content. By way of example, delivery scheme indicator 650 may indicate a special protocol for streaming media content.

FIG. 6E is a diagram that illustrates a tokenized URL for use in accessing digital content at a content repository having an access domain dedicated to accepting tokenized URLs in accordance with one embodiment of the present invention. Access domain indicator 662 in combination with delivery scheme indicator 660 specifies the URL of a content repository. Content item indicator 666 specifies a pathname for digital content located at access domain 662 and for which access is requested and controlled by the token 664. Token indicator 664 specifies a token to use to access digital content within a context associated with the token. In this case, the context associated with the token comprises content item 666 located at access domain 662. The token 664 specifies a collection of digital content items made accessible by the token 664. Additional non-token information from content item 666 is required to completely specify the digital content accessed, thus providing relatively coarse-grained access control with respect to the URL illustrated in FIG. 6D. Presenting token 664 entitles the presenter access to digital content 666 at access domain 662.

FIG. 6F is a diagram that illustrates a tokenized URL for use in accessing digital content at a particular directory or content locker of a content repository having an access domain dedicated to accepting tokenized URLs in accordance with one embodiment of the present invention. Access domain indicator 672 in combination with delivery scheme indicator 670 specifies the URL of a content repository. Content locker indicator 676 specifies the pathname of a container for at least one digital content item. Content item indicator 678 specifies a pathname for digital content located within content locker 676 at access domain 672 for which access is requested and controlled by the token 674. Token indicator 674 specifies a token to use to access digital content within a context associated with the token. In this case, the context associated with the token comprises content item 678 within content locker 676 located at access domain 672. The token specifies a collection of digital content items made accessible by the token. Additional non-token information from content locker indicator 676 and content item 678 are required to completely specify the digital content accessed, thus providing relatively coarse-grained access control with respect to the URLs illustrated in FIGS. 6D and 6E. Presenting token 674 entitles the presenter access to digital content 678 within content locker 676 at access domain 672.

In the context of the present invention, the term "servlet" comprises a program that resides and executes on a server to provide functionality to the server or processing of data on the server. By way of example, a servlet may comprise a CGI (Common Gateway Interface) script or program, ASP (Active Server Pages), a Java™ Servlet, or the like. Java™ Servlet technology is described in "Java™ Servlet Specification", version 2.3, Sep. 17, 2001, available from Sun Microsystems, Santa Clara, Calif. According to embodiments of the present invention, a specialized servlet is specified in an authenticated digital content request such as a URL. The specialized servlet handles the provisioning of digital content protected by authenticated digital content requests.

FIGS. 7A-7C are similar to FIGS. 6D-6F, respectively, except that the URLs in FIGS. 7A-7C additionally specify the pathname of a servlet (704, 714, 734) to process an authenticated digital content request.

Figure 8:
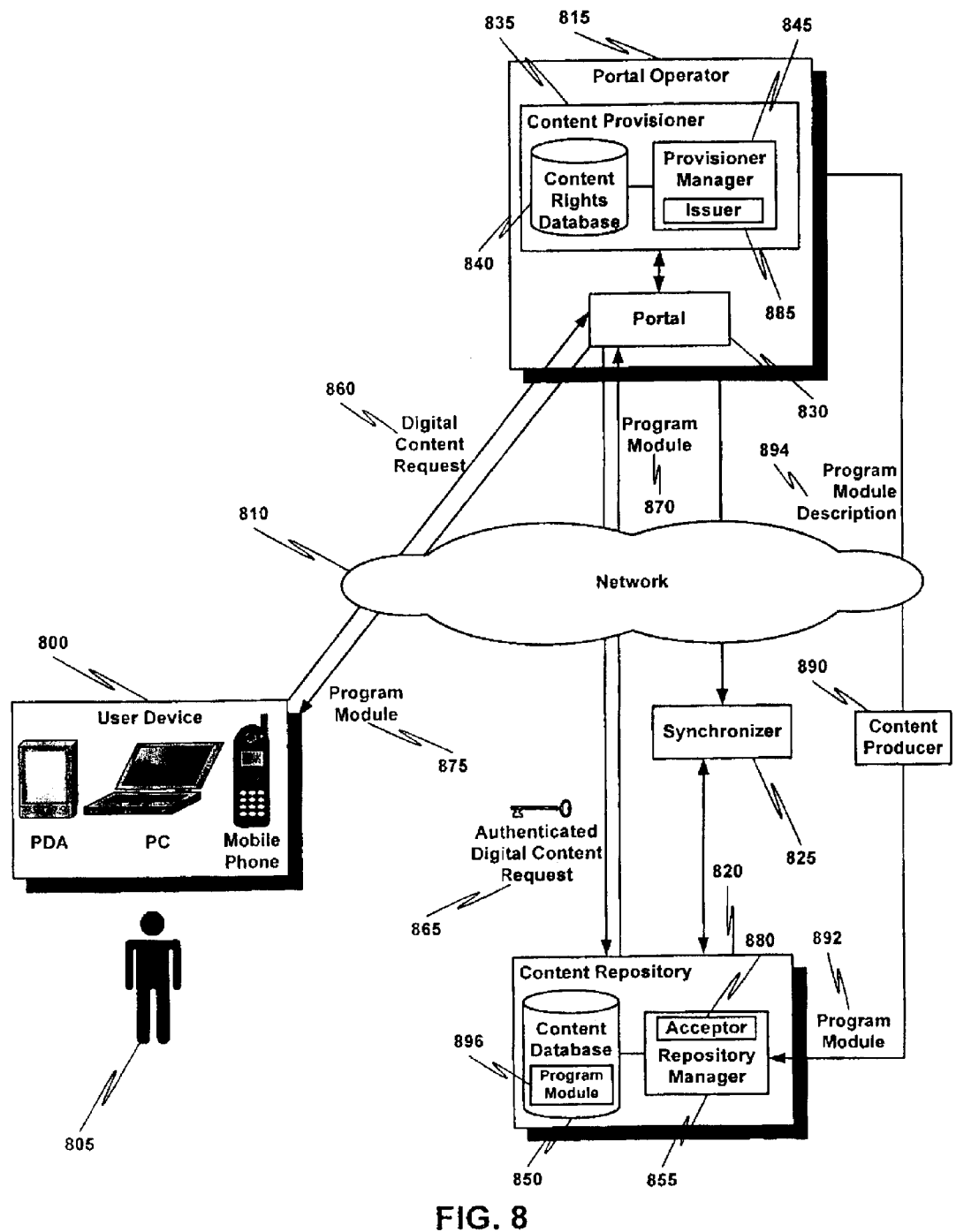
FIG. 8 is a block diagram that illustrates a system for program code module access control in accordance with one embodiment of the present invention.
Figure 9:
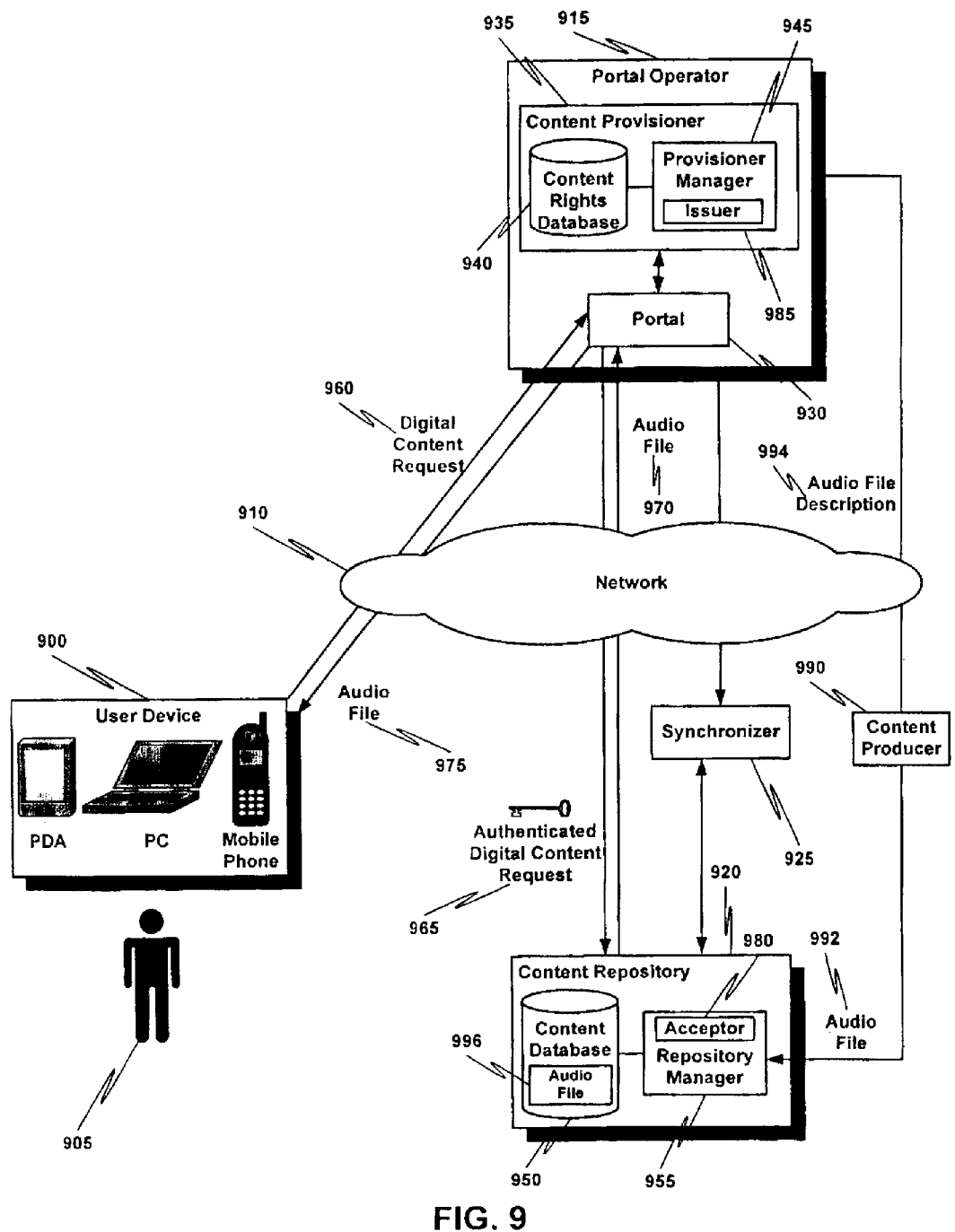
FIG. 9 is a block diagram that illustrates a system for audio file access control in accordance with one embodiment of the present invention.
Figure 10:
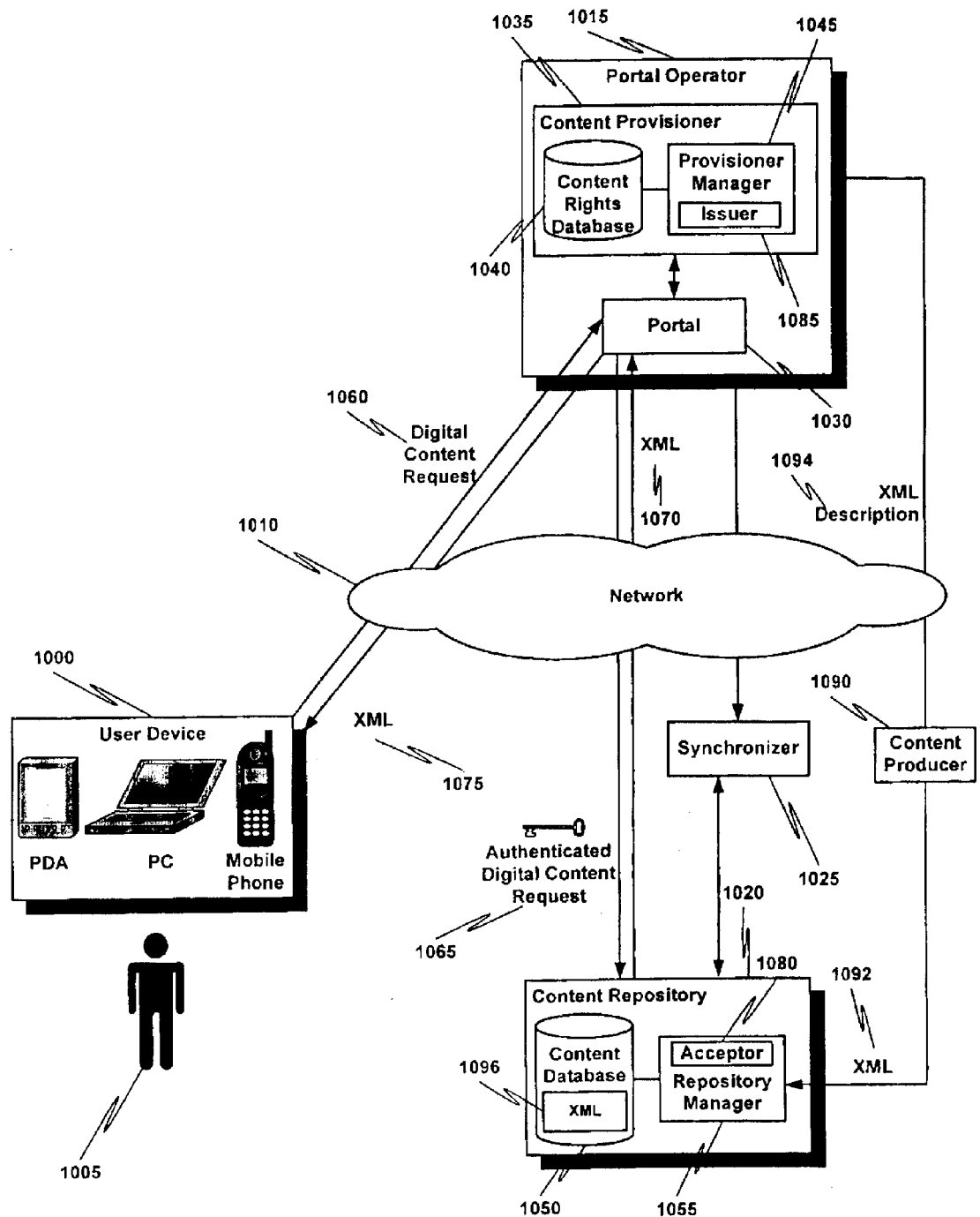
FIG. 10 is a block diagram that illustrates a system for XML (Extensible Markup Language) document access control in accordance with one embodiment of the present invention.
Figure 11:
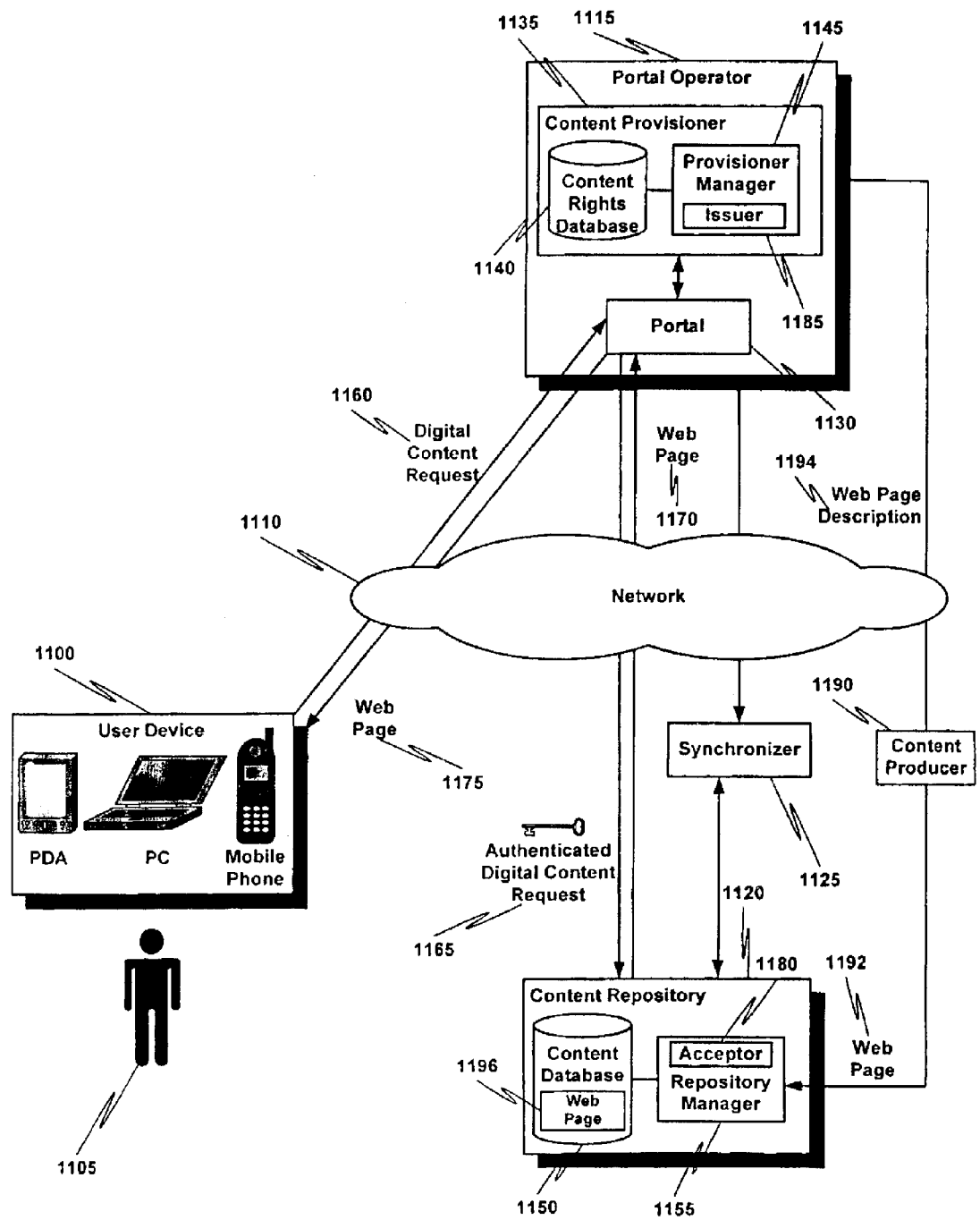
FIG. 11 is a block diagram that illustrates a system for Web page access control in accordance with one embodiment of the present invention.

FIGS. 8-11 illustrate various apparatus for digital content access control in accordance with embodiments of the present invention. FIG. 8 illustrates a system for controlling access to program code modules such as MIDlets or the like. A MIDlet is an application that conforms to the MIDP (Mobile Information Device Profile) standard (Mobile Information Device Profile (JSR-37), JCP Specification, Java 2 Platform, Micro Edition, 1.0a, available from Sun Microsystems, Santa Clara Calif.). FIG. 9 illustrates a system for controlling access to audio files such as MP3 files or the like. FIG. 10 illustrates a system for controlling access to XML (Extensible Markup Language) documents. FIG. 11 illustrates a system for controlling access to Web pages.

According to embodiments of the present invention, user devices illustrated in FIGS. 8-11 (reference numeral 800 of FIG. 8, reference numeral 900 of FIG. 9, reference numeral 1000 of FIG. 10 and reference numeral 1100 of FIG. 11) comprise a CDMA technology-enabled smart card, a SIM card, a WIM, a USIM, a UIM, a R-UIM or the like.

FIGS. 8-11 are intended for purposes of illustration and are not intended to be limiting in any way. Those of ordinary skill in the art will recognize the invention may be applied to any digital content regardless of digital content format or intended use.

Figure 12:
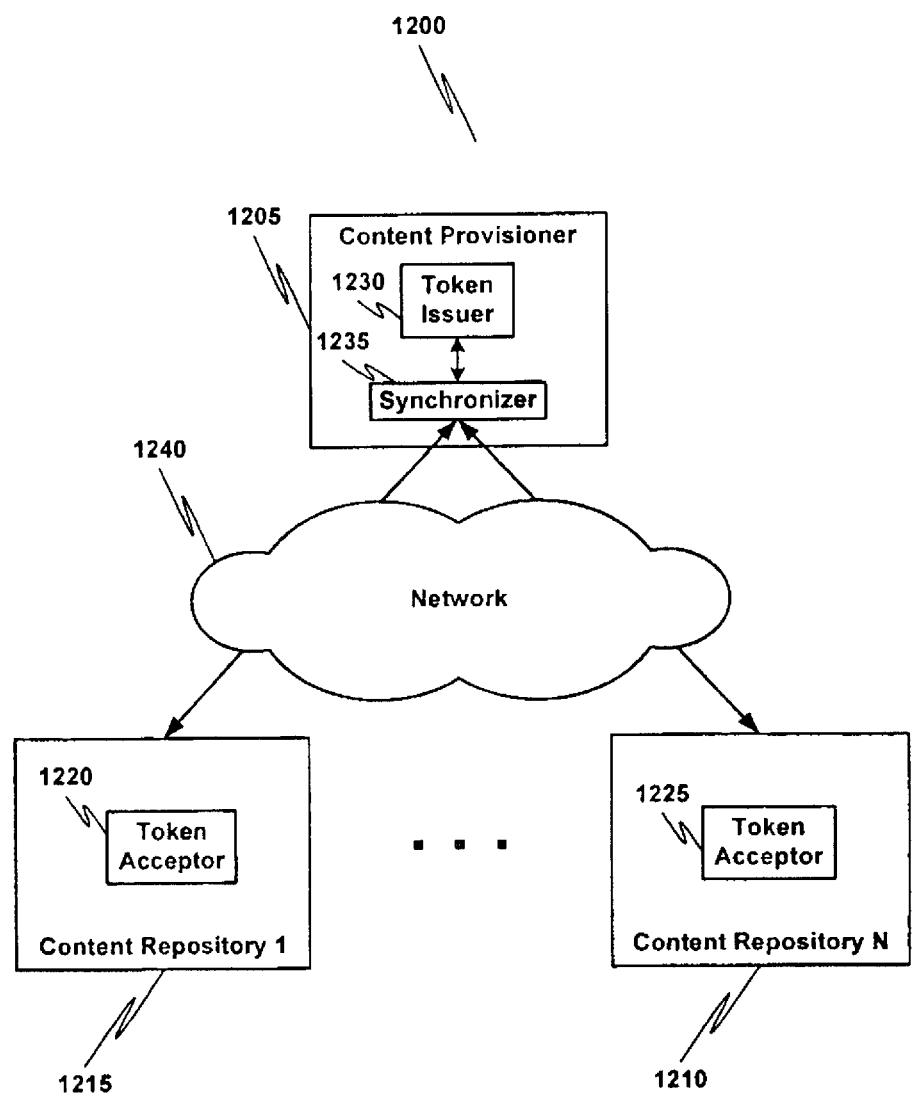
FIG. 12 is a block diagram that illustrates a system for digital content access control having one or more content repositories associated with a content provisioner in accordance with one embodiment of the present invention.
Figure 13:
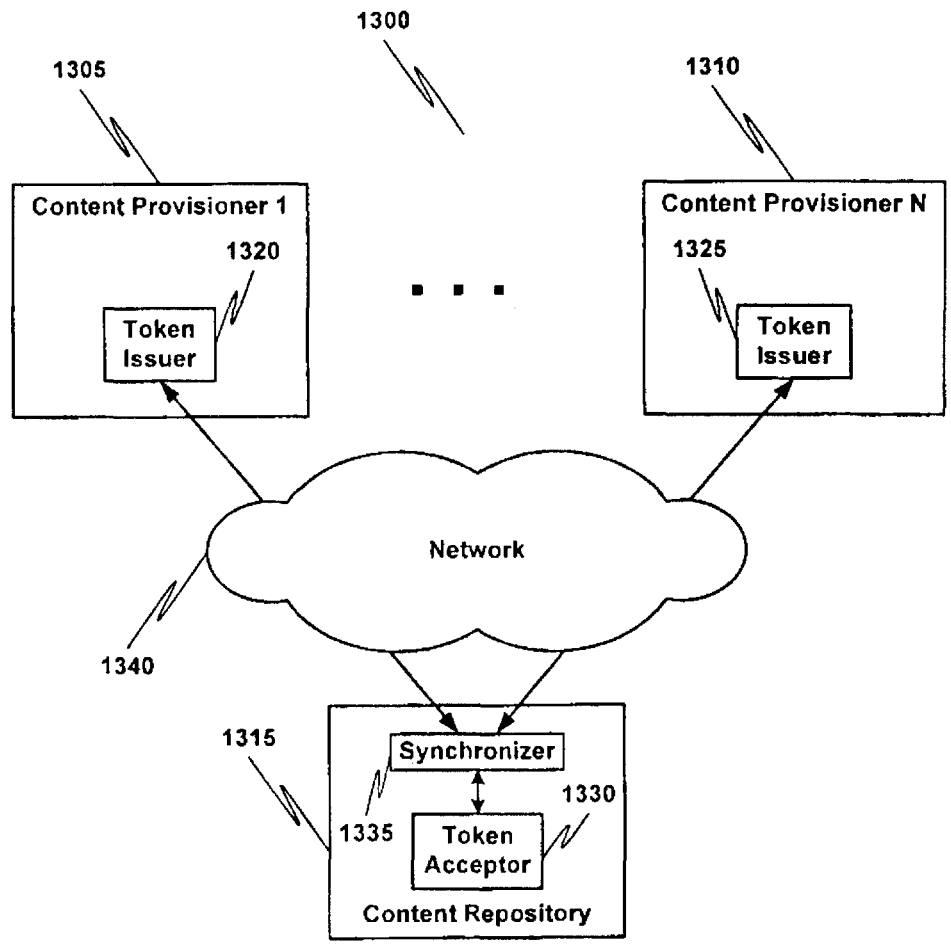
FIG. 13 is a block diagram that illustrates a system for digital content access control having one or more content provisioners associated with a content repository in accordance with one embodiment of the present invention.
Figure 14:
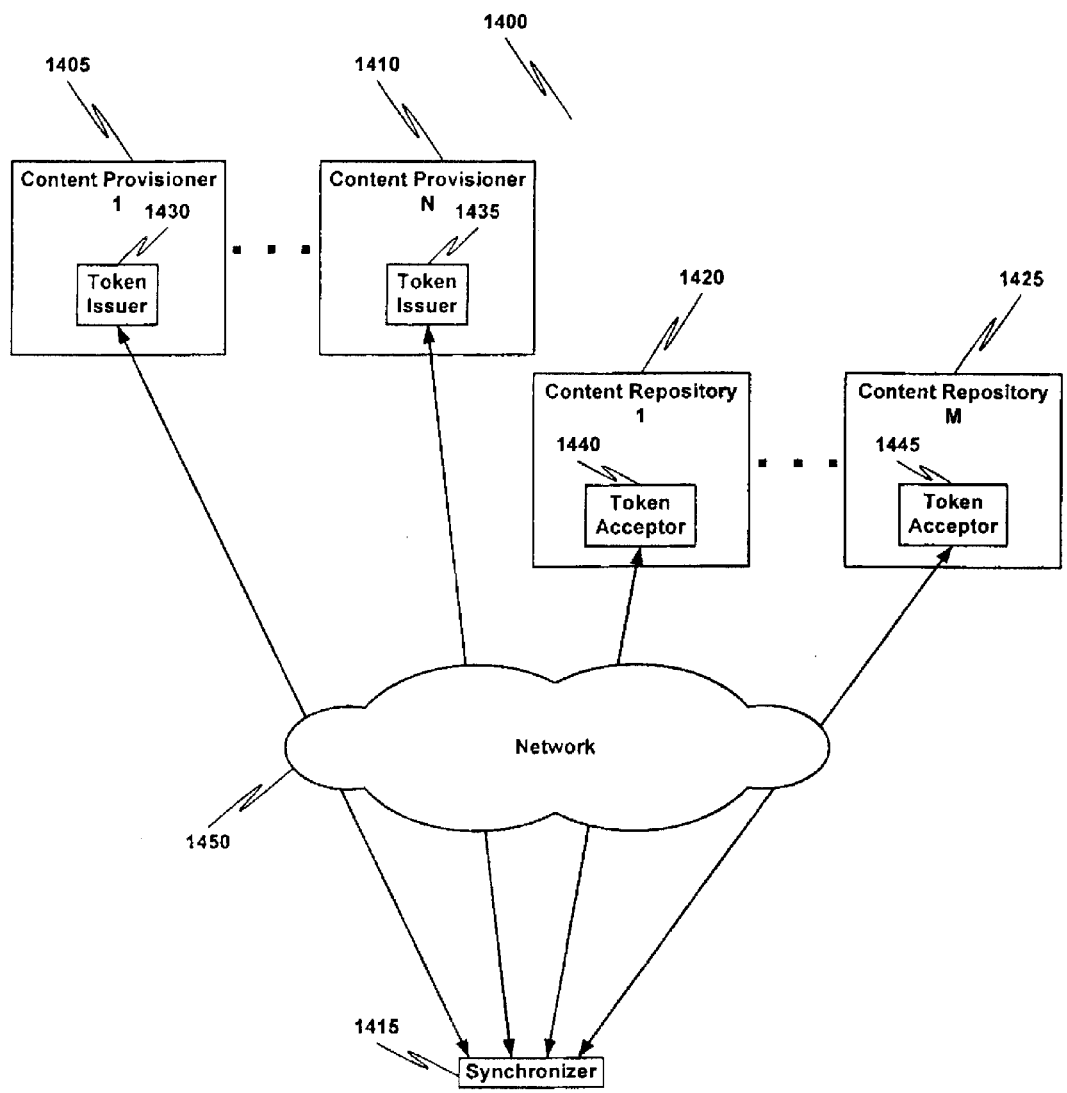
FIG. 14 is a block diagram that illustrates a system for digital content access control having one or more content provisioners and content repositories associated with a synchronizer in accordance with one embodiment of the present invention.

FIGS. 12-14 illustrate systems for digital content access control having alternative configurations. A user device is not shown in FIGS. 12-14 and a content producer is not shown in FIGS. 12-15 to avoid obfuscation of the present invention.

Turning now to FIG. 12, a block diagram that illustrates a system for digital content access control having one or more content repositories associated with a content provisioner in accordance with one embodiment of the present invention is presented. System 1200 comprises a content provisioner 1205 in communication with one or more content repositories (1210, 1215) via network 1240. Content repositories 1210 and 1215 comprise token acceptors 1225 and 1220, respectively. Content provisioner 1205 comprises a token issuer 1230 and a synchronizer 1235. Synchronizer 1235 maintains consistency in token pool information used by token issuer 1235 and token acceptors 1225 and 1220.

Turning now to FIG. 13, a block diagram that illustrates a system for digital content access control having one or more content provisioners associated with a content repository in accordance with one embodiment of the present invention is presented. System 1300 comprises a content repository 1315 in communication with one or more content provisioners (1305, 1310) via network 1340. Content provisioners 1305 and 1310 comprise token issuers 1320 and 1325, respectively. Content repository 1315 comprises a token acceptor 1330 and a synchronizer 1335. Synchronizer 1335 maintains consistency in token pool information used by token acceptor 1330 and token issuers 1305 and 1310.

Turning now to FIG. 14, a block diagram that illustrates a system for digital content access control having one or more content provisioners and content repositories associated with a synchronizer in accordance with one embodiment of the present invention is presented. System 1400 comprises one or more content provisioners (1405, 1410), one or more content repositories (1420, 1425) and a synchronizer 1415 in communication via network 1450. Content provisioners 1405 and 1410 comprise token issuers 1430 and 1435, respectively.

Content repositories 1420 and 1425 comprise token acceptors 1440 and 1445, respectively. Synchronizer 1415 maintains consistency in token pool information used by token issuers 1430 and 1435, token acceptors 1440 and 1445 and synchronizer 1415. Synchronizer 1415 may be operated by a trusted third party such as a financial services provider or bank.

Figure 15:
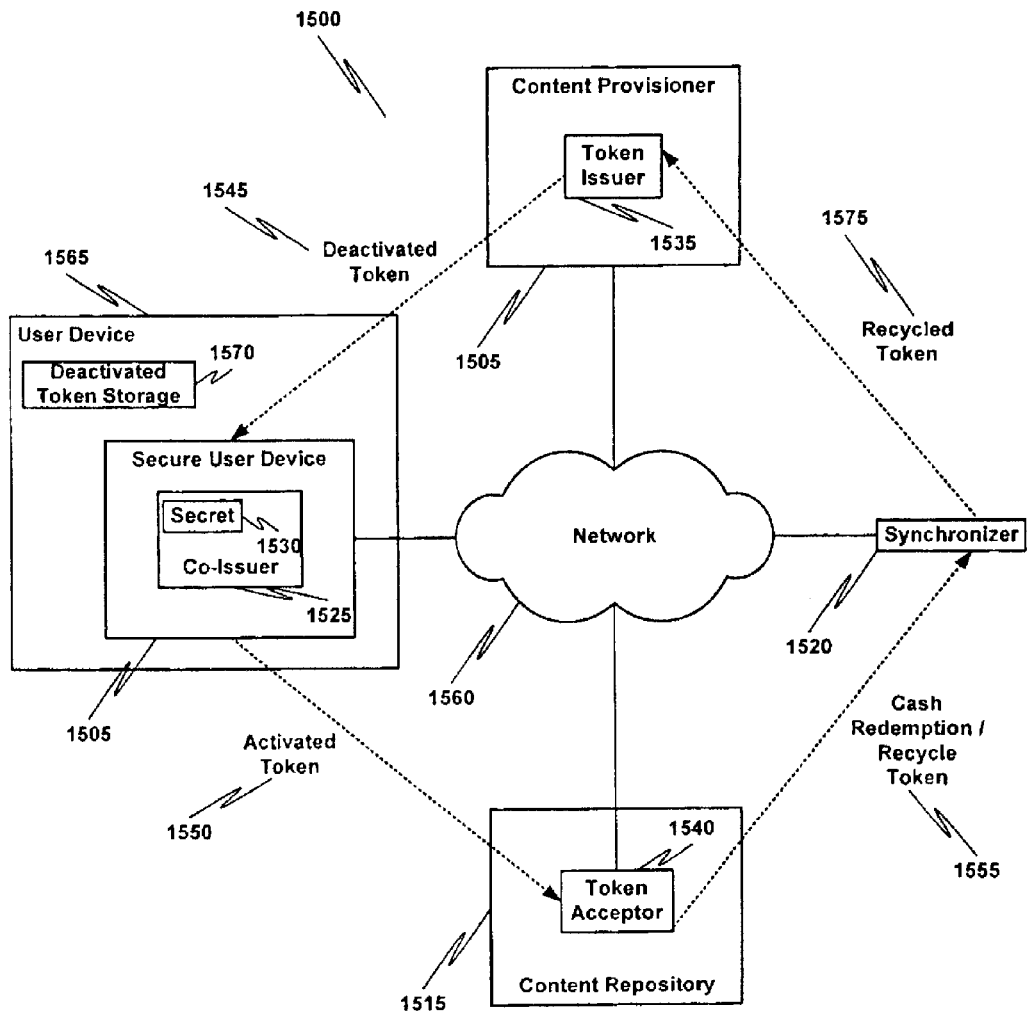
FIG. 15 is a block diagram that illustrates a system for digital content access control where a secure user device activates deactivated tokens issued by a content provisioner and uses the activated tokens to access digital content stored by a content repository in accordance with one embodiment of the present invention.

Turning now to FIG. 15, a block diagram that illustrates a system for digital content access control where a secure user device activates deactivated tokens issued by a content provisioner and uses the activated tokens to access digital content stored by a content repository in accordance with one embodiment of the present invention is presented. System 1500 comprises a content provisioner 1505, a content repository 1515, a user device 1565 and a synchronizer 1520 in communication via network 1560. Content provisioner 1505 comprises a token issuer 1535 and content repository 1515 comprises a token acceptor 1540. User device 1565 comprises storage for deactivated tokens (1570). User device 1565 also comprises a secure user device 1505 that comprises a co-issuer 1525. The co-issuer 1525 comprises a secret 1530 for activating deactivated tokens.

In operation, user device 1565 communicates with content provisioner 1505 to obtain one or more deactivated tokens and stores them in deactivated token storage 1570. The one or more deactivated tokens 1545 are tied to particular digital content. Co-issuer 1525 activates the one or more deactivated tokens 1545 based at least in part on secret 1530. Secure user device 1505 presents one or more activated tokens 1550 to content repository 1515 to receive access to the digital content associated with the one or more activated tokens 1550. Content repository 1515 presents synchronizer 1555 with accepted tokens 1555. The synchronizer 1520 may recycle the previously accepted tokens 1555 to make them available for future token allocations. Synchronizer 1520 may also facilitate payment for delivery of digital content and receive payment in return for the accepted tokens. Synchronizer 1520 presents tokens to be recycled 1575 to content provisioner 1505 for subsequent reuse.

According to one embodiment of the present invention, user device 1565 comprises a mobile phone and secure user device 1505 comprises a SIM card or the like.

According to one embodiment of the present invention, co-issuer 1525 activates one or more deactivated tokens 1545 upon receipt by secure user device 1505 and stores the activated tokens in secure user device 1505 until the activated tokens are redeemed for access to digital content associated with the tokens. According to another embodiment of the present invention, secure user device 1505 stores one or more deactivated tokens until access to digital content associated with the deactivated tokens is desired. At that point, co-issuer 1525 activates the deactivated tokens and presents the activated tokens 1550 to content repository 1515 for access to digital content associated with the activated tokens.

Figure 16:
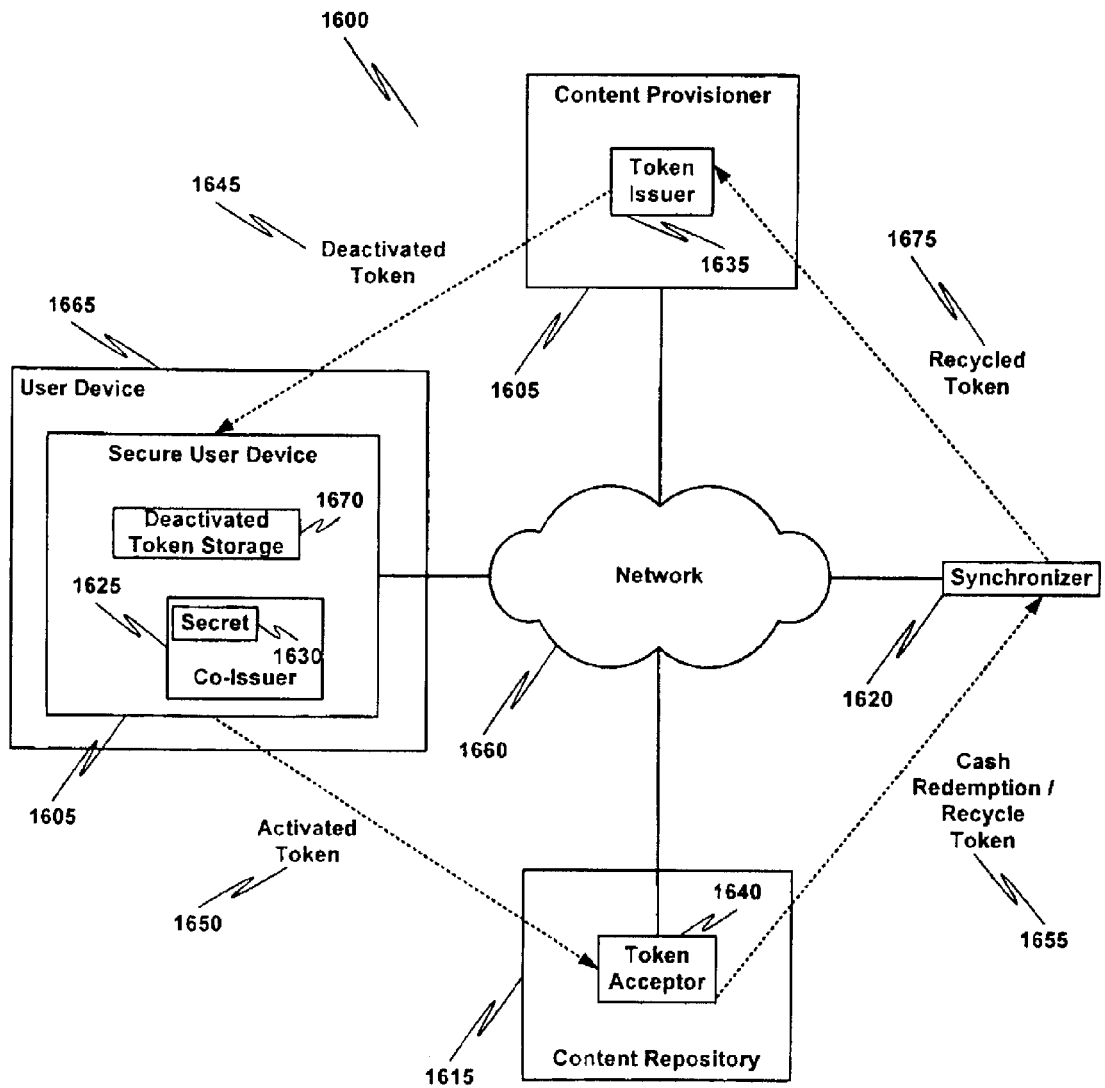
FIG. 16 is a block diagram that illustrates a system for digital content access control where a secure user device activates deactivated tokens issued by a content provisioner and uses the activated tokens to access digital content stored by a content repository in accordance with one embodiment of the present invention.

Turning now to FIG. 16, a block diagram that illustrates a system for digital content access control where a secure user device activates deactivated tokens issued by a content provisioner and uses the activated tokens to access digital content stored by a content repository in accordance with one embodiment of the present invention is presented. FIG. 16 is similar to FIG. 15 except that secure user device 1605 in FIG. 16 comprises deactivated token storage 1670. In operation, user device 1665 communicates with content provisioner 1605 to obtain one or more deactivated tokens and stores them in deactivated token storage 1670. The one or more deactivated tokens 1645 are tied to particular digital content. Co-issuer 1625 activates the one or more deactivated tokens 1645 based at least in part on secret 1630. Secure user device 1605 presents one or more activated tokens 1650 to content repository 1615 to receive access to the digital content associated with the one or more activated tokens 1650. Content repository 1615 presents synchronizer 1620 with accepted tokens 1655. The synchronizer 1620 may recycle the previously accepted tokens 1655 to make them available for future token allocations. Synchronizer 1620 may also facilitate payment for delivery of digital content and receive payment in return for the accepted tokens. Synchronizer 1620 presents tokens to be recycled 1675 to content provisioner 1605 for subsequent reuse.

Figure 17:
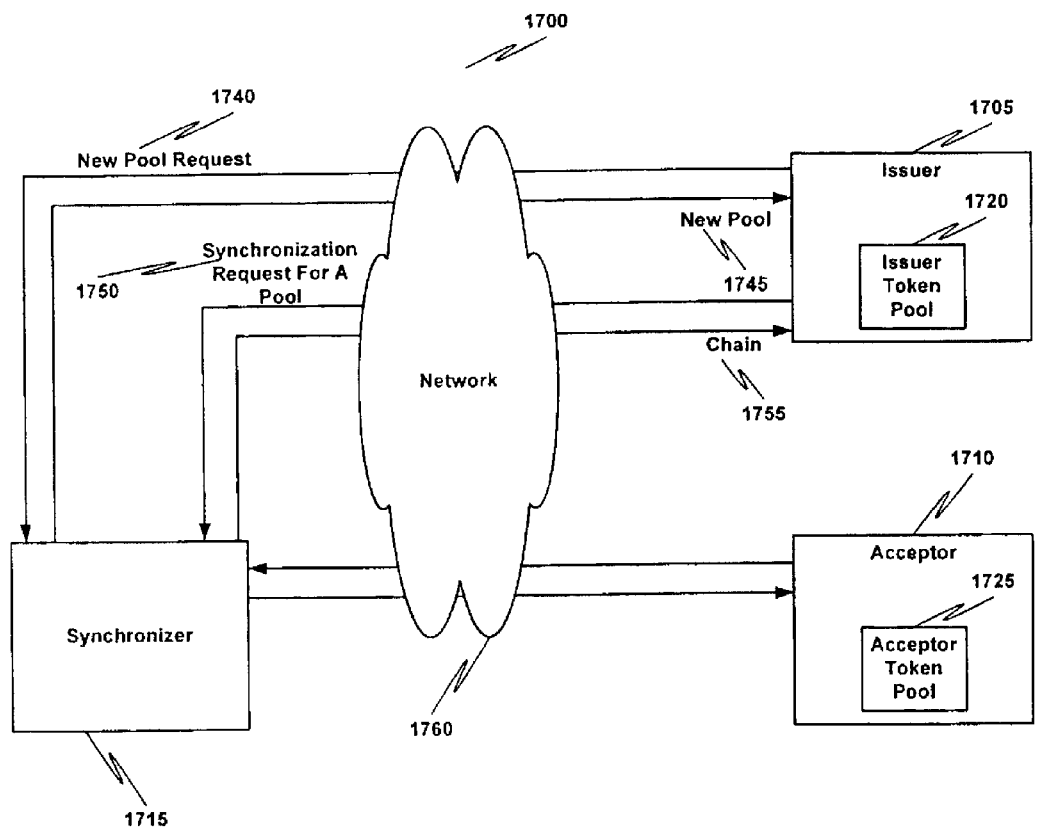
FIG. 17 is a block diagram that illustrates token pool allocation and synchronization in a system for digital content access control in accordance with one embodiment of the present invention.

Turning now to FIG. 17, a block diagram that illustrates token pool allocation and synchronization in a system for digital content access control in accordance with one embodiment of the present invention is presented. According to embodiments of the present invention, a collection of one or more tokens tied to or associated with particular digital content is referred to as a token pool. A token issuer 1705 is associated with one or more issuer token pools 1720. The token issuer 1705 accounts for issued and available tokens. A token acceptor 1710 is associated with one or more acceptor token pools 1725. The token acceptor 1710 accounts for unredeemed tokens and tokens that have been partially and fully redeemed for access to digital content associated with the token pool 1725. A token is fully redeemed if it has been redeemed a predetermined number of times. A token is not fully redeemed if it has been redeemed less than the predetermined number of times. A token is partially redeemed if it has been redeemed a number of times that is greater than zero but less than the predetermined number of times. Issuer token pool 1720 and acceptor token pool 1725 are associated with the same digital content. Synchronizer 1715 synchronizes the token pool information for issuer token pool 1720 and acceptor token pool 1725. When issuer 1705 needs to provision tokens for digital content that the issuer 1705 does not currently manage, issuer 1705 issues a new pool request 1740. Synchronizer receives the request 1740 and provides the issuer 1710 and the acceptor 1710 with at least one new token pool 1745 associated with the new digital content.

Still referring to FIG. 17, issuer 1705 or acceptor 1710 may request additional tokens when a requirement for more is determined. The issuer may make this determination based at least in part on factors such as the number of unissued tokens remaining in a particular issuer token pool or the amount of time since new tokens were received, by way of example. The acceptor may determine that more tokens are required based at least in part on factors such the number of unredeemed and partially redeemed tokens remaining in a particular acceptor token pool or the amount of time since new tokens were received, by way of example. The synchronizer 1715 may also determine that more tokens are required based at least in part on factors such as the amount of time since a token pool was replenished. When a requirement for more tokens is determined, synchronizer 1715 provides issuer 1705 and acceptor 1710 with one or more additional tokens.

Still referring to FIG. 17, various transport mechanisms may be used to communicate information such as token pool information between the synchronizer 1715, issuer 1705 and acceptor 1710 entities. The transport mechanism may be based at least in part on the level of trust between the entities. If there is a relatively high level of trust between the entities, synchronizer 1715 may provide issuer 1705 and acceptor 1710 with the tokens for a token pool. If there is a relatively low level of trust between the entities, synchronizer 1715 may provide issuer 1705 and acceptor 1710 with a cryptogram or sealed message that comprises tokens or information for use in generating the tokens.

According to another embodiment of the present invention, token pool information is communicated from a content provisioner to a content repository using SSL (Secure Sockets Layer) or the like. Those of ordinary skill in the art will recognize that token pool information may be communicated securely from a content provisioner to a content repository using other mechanisms.

FIGS. 18A-18F illustrate tokens in accordance with embodiments of the present invention. A token may comprise a cryptogram as illustrated in FIG. 18A. Cryptogram 1800 may be based at least in part on the digital content associated with the token, or on a reference to the digital content. In other words, cryptogram 1800 may authenticate the protected digital content or a reference to the protected digital content. In FIG. 18B, the token comprises a cryptogram 1810 and a chain ID 1805. Chain ID 1805 may be used to associate the token with a token pool or token chain within a token pool. According to one embodiment of the present invention, Chain ID 1805 is based at least in part on a token chain key. According to another embodiment of the present invention, chain ID 1805 comprises a pool ID and chain ID corresponding to a token chain within the token pool associated with the pool ID. In FIG. 18C, the token comprises a cryptogram 1825, a chain ID 1815 and a maximum chain length 1820. In FIG. 18D, the token comprises a cryptogram 1840, a chain ID 1830 and an offset or identifier in a series 1835. Offset 1835 may be used to identify the position within a token pool or token chain where the cryptogram 1840 is located. In other words, offset 1835 may be used to identify the location of a cryptogram 1840 in a token pool or token chain. In FIG. 18E, the token comprises a cryptogram 1855, a chain ID 1845 and an offset representing an identifier in a series 1850. In FIG. 18F, the token comprises a cryptogram 1870 and a token type indicator 1860. Token type indicator 1860 specifies the format of the token (i.e. what to expect in token fields 1865 and 1870). Reference numeral 1865 represents one or more token fields. By way of example, reference numeral 1865 may comprise one or more of the fields illustrated in FIGS. 18A-18E, and token type indicator 1860 may specify the format of token fields 1865 and 1870.

The token formats illustrated in FIGS. 18A-18F are for purposes of illustration and are not intended to be limiting in any way. A token may also comprise an Extensible Markup Language (XML)-formatted Hypertext Markup Language (HTML)-encoded message with fields as illustrated in FIGS. 18A-18E. Additionally, a cryptogram may comprise other fields and other combinations of fields illustrated in FIGS. 18A-18F.

Figure 19:
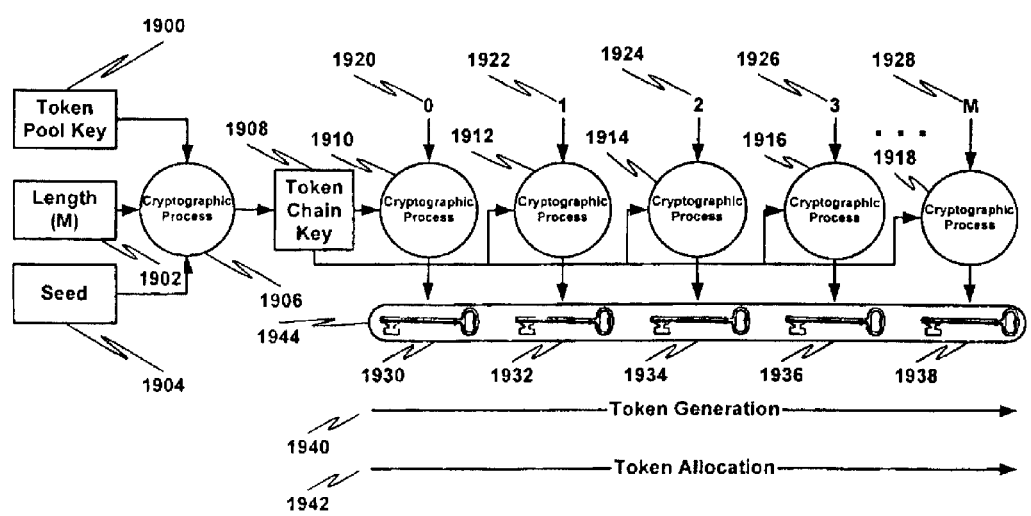
FIG. 19 is a block diagram that illustrates creating a token chain by applying a cryptographic process to one or more identifiers in a series together with a token chain key in accordance with one embodiment of the present invention.
Figure 20:
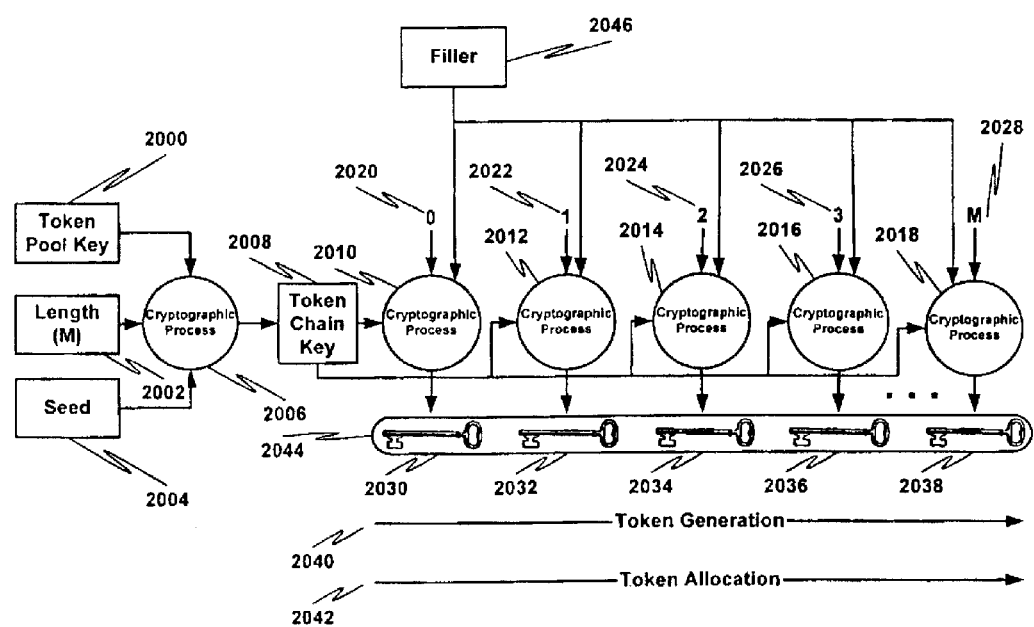
FIG. 20 is a block diagram that illustrates creating a token chain by applying a cryptographic process to a filler and one or more identifiers in a series together with a token chain key in accordance with one embodiment of the present invention.
Figure 21:
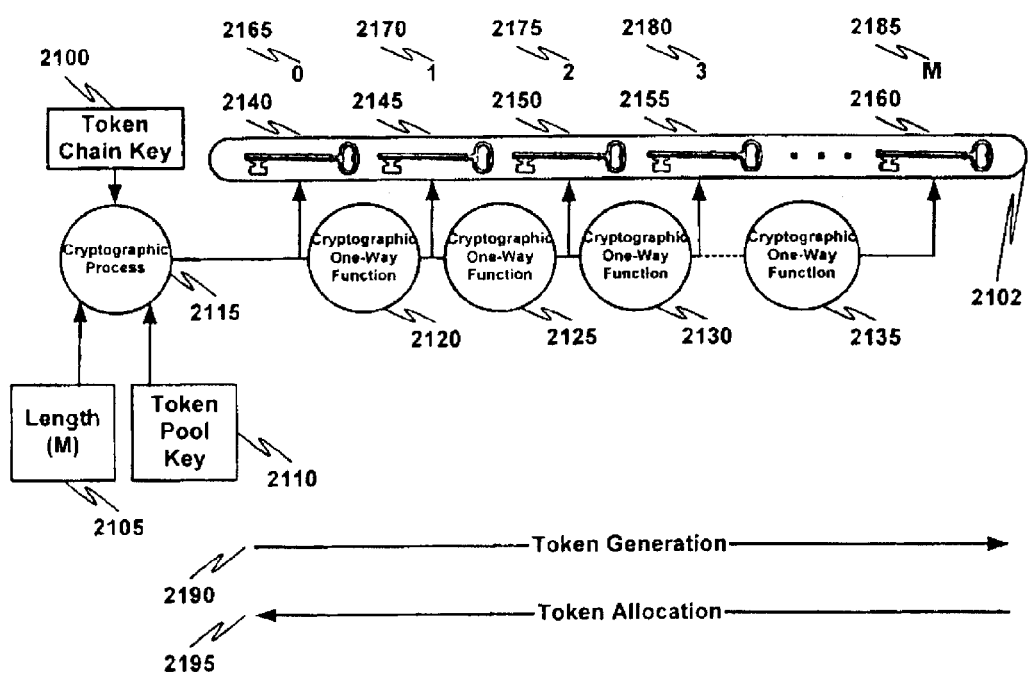
FIG. 21 is a block diagram that illustrates creating a token chain using cryptographic one-way functions in accordance with one embodiment of the present invention.

According to embodiments of the present invention, a token pool comprises one or more token chains that comprise one or more tokens. FIGS. 19, 20 and 21 illustrate creating tokens for subsequent use in creating a tokenized URL. FIG. 19 illustrates creating a token chain by applying a cryptographic process to one or more identifiers in a series together with a token chain key, FIG. 20 illustrates creating a token chain by applying a cryptographic process to a filler and one or more identifiers in a series together with a token chain key, and FIG. 21 illustrates creating a token chain using cryptographic one-way functions.

Turning now to FIG. 19, a block diagram that illustrates creating a token chain by applying a cryptographic process to one or more identifiers in a series together with a token chain key with in accordance with one embodiment of the present invention is presented. Token chain 1944 comprises a plurality of tokens 1930-1938. Seed 1904 may be based at least in part on a portion of a URL, where the URL defines digital content that may be accessed using a token from a token pool based at least in part on the seed 1904. According to one embodiment of the present invention, a cryptographic process (1906) is applied to seed 1904 to create a token chain key 1908. According to one embodiment of the present invention, the cryptographic process (1906) comprises a hashing function. According to another embodiment of the present invention, the token chain key 1908 is created by applying a cryptographic process (1906) to the seed 1904 together with a token pool key 1900. According to another embodiment of the present invention, the token chain key 1908 is created by applying a cryptographic process (1906) to the seed 1904 and the maximum length of the token chain 1902. Tokens 1930-1938 are created by applying a cryptographic process to (1910-1918) identifiers 1920-1928, respectively, together with the token chain key 1908.

Turning now to FIG. 20, a block diagram that illustrates creating a token chain by applying a cryptographic process to a filler and one or more identifiers in a series together with a token chain key in accordance with one embodiment of the present invention is presented. Tokens 2030-2038 are created by replacing a predefined set of bits of a filler 2046 with the one or more bits expressing an identifier in a series (2020-2028) and applying a cryptographic process (2010-2018) to the modified filler 2046 together with the token chain key 2008. According to one embodiment of the present invention, tokens are allocated in order of token creation. Tokens may be pre-generated. Alternatively, the last identifier used to generate a token is stored and this stored value is used to generate tokens one-at-a-time as needed.

Turning now to FIG. 21, a block diagram that illustrates creating a token chain using cryptographic one-way functions in accordance with one embodiment of the present invention is presented. Token chain key 2100 is used to create the first token 2140 and tokens 2145-2155 are based at least in part on tokens 2140-2150, respectively. Token 2160 is based at least in part on the token that precedes it (the token corresponding to position M (2185) minus one). According to one embodiment of the present invention, the token allocation order is the reverse of the token generation order. Using FIG. 21 as an example, the last-generated token 2160 is also the first-allocated token. Similarly, the first-generated token 2140 is also the last-allocated token.

According to one embodiment of the present invention, the first token 2140 is created by applying a cryptographic process (2115) to a length value 2105 that indicates the number of tokens in the corresponding token chain 2102, together with a token chain key 2100. According to one embodiment of the present invention, the cryptographic process (2115) comprises a hashing function. According to another embodiment of the present invention, the first token 2140 is created by applying a cryptographic process (2115) to the token chain key 2100 together with a token pool key 2110 that is shared by token chains within a token pool. According to another embodiment of the present invention, the first token 2140 is created by applying a cryptographic process (2115) to a length value 2105 and the token chain key 2100 together with a token pool key 2110.

The data used to create the first token 2140 determines how token validation is performed. By way of example, length value 2105 may be fixed for a particular token pool and known to both token issuer and token acceptor. In this case, both the issuer and the acceptor may generate tokens in a token chain associated with token chain key 2100 independent of whether a synchronizer provides a length value with a token chain key 2100. However, if the length field 2105 is not known to both issuer and token acceptor and if the length value is used to create the first token 2140, a synchronizer may provide the length value 2105 with the associated token chain key 2100. Alternatively, a token may comprise a length value as illustrated above with respect to reference numeral 1820 of FIG. 18.

Figure 22:
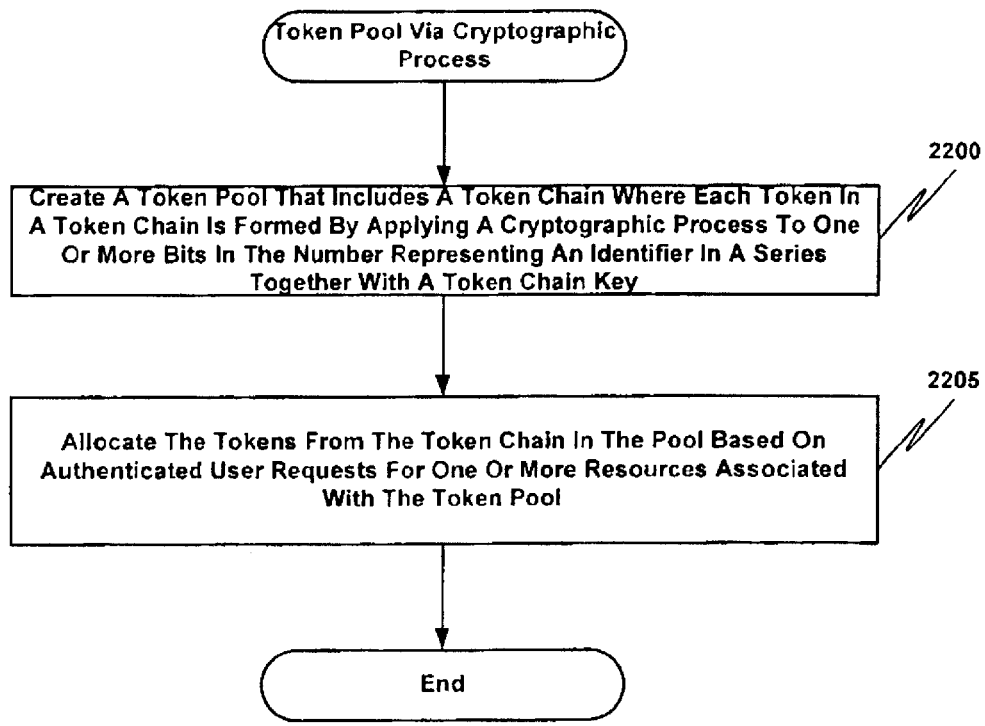
FIG. 22 is a flow diagram that illustrates a method for creating and using a token pool formed by applying a cryptographic process to an identifier in a series together with a token chain key in accordance with one embodiment of the present invention.

Turning now to FIG. 22, a flow diagram that illustrates a method for creating and using a token pool formed by applying a cryptographic process to an identifier in a series together with a token chain key in accordance with one embodiment of the present invention is presented. FIG. 22 corresponds to FIG. 19. At 2200, a token pool that comprises a token chain where each token in a token chain is formed by applying a cryptographic process to one or more bits expressing an identifier in a series together with a token chain key is created. At 2205, the tokens in the token chain are allocated based on authenticated user requests for one or more resources associated with the token pool. According to one embodiment of the present invention, token allocation is ordered according to the token creation order such that the first-allocated token comprises the first-created token and the last-allocated token comprises the last-created token. According to another embodiment of the present invention, a randomized process is used to select an unallocated token within the token chain.

The process corresponding to FIG. 20 is similar to the flow diagram illustrated in FIG. 22, except that at reference numeral 2200, each token in a token chain is formed by replacing a predefined set of bits of a filler with the one or more bits expressing an identifier in a series and applying a cryptographic process to the modified filler together with a token chain key.

Figure 23:
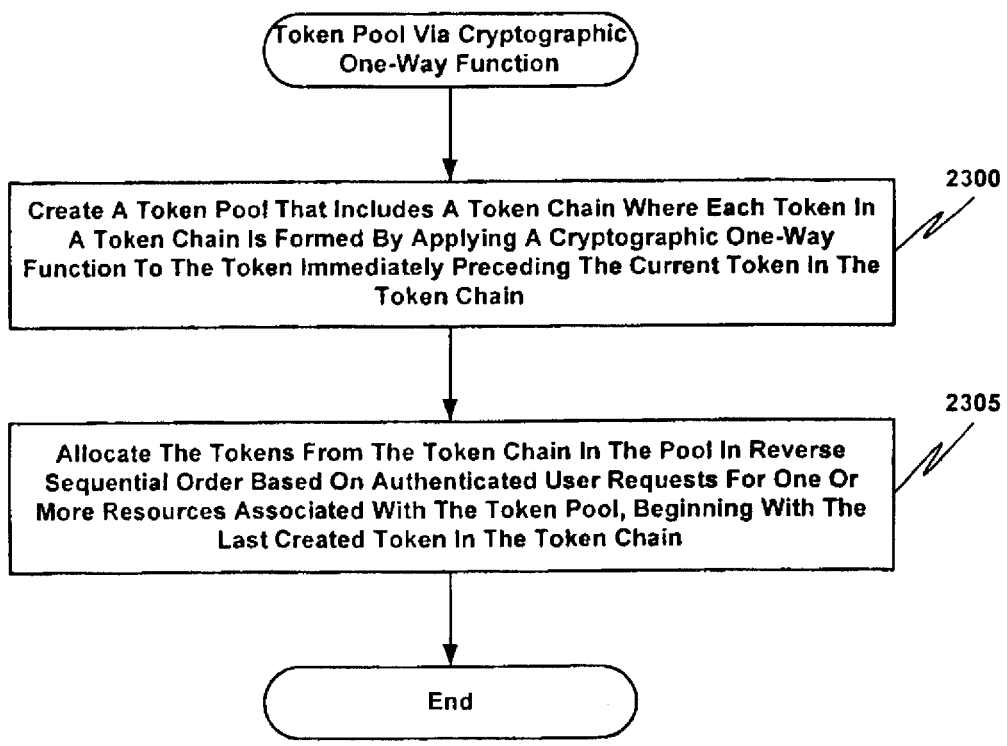
FIG. 23 is a flow diagram that illustrates a method for creating and using a token pool formed by successive applications of a cryptographic one-way function in accordance with one embodiment of the present invention.

Turning now to FIG. 23, a flow diagram that illustrates a method for creating and using a token pool formed by successive applications of a cryptographic one-way function in accordance with one embodiment of the present invention is presented. FIG. 23 corresponds to FIG. 21. At 2300, a token pool that comprises a token chain where each token in a token chain is formed by applying a cryptographic one-way function to the token immediately preceding the current token in the token chain is created. At 2305, the tokens in the token chain are allocated in reverse sequential order based on authenticated user requests for one or more resources associated with the token pool, beginning with the last-created token in the token chain.

As mentioned with reference to FIG. 17, a synchronizer communicates token validation information to a content repository that allows the content repository to validate received tokens. The token validation information may comprise one or more token pools or information used to generate the pools. The synchronizer may transfer the token validation information using a secure protocol such as SSL or the like. Alternatively, the synchronizer may transfer encrypted token validation information. This encrypted token validation information may also be transferred using a further secure protocol such as SSL or the like.

According to one embodiment of the present invention, the token validation information transferred by a synchronizer comprises a token pool. In response to a token synchronization event (such as when a requesting entity requests an additional token pool), a synchronizer generates a token pool comprising tokens and sends the tokens to the requesting entity and optionally to one or more non-requesting entities. The requesting entity and the non-requesting entities may comprise a content repository or a content provisioner. If the requesting entity is a content repository, content repository receives the token pool and uses it to validate authenticated digital content requests. If the requesting entity is a content provisioner, the content provisioner receives the token pool and uses it to generate authenticated digital content requests.

According to another embodiment of the present invention, a token comprises a chain ID as illustrated in FIGS. 18B-18E. In this case, the synchronizer transfers token pool keys. Upon receiving an authenticated digital content request, the content repository uses the chain ID of the received token to determine which token chain to check. If the content repository is configured to pre-compute token pools, the token chain associated with the received chain ID is checked for the cryptogram associated with the received token. If the content repository is not configured to pre-compute token pools, the chain ID is used in the computation to check the cryptogram associated with the received token, which comprises generating all or part of the token chain. Upon the occurrence of a synchronization event, such as when the amount of tokens available for redemption falls below a predetermined threshold, the synchronizer sends one or more token pool keys.

Figure 24:
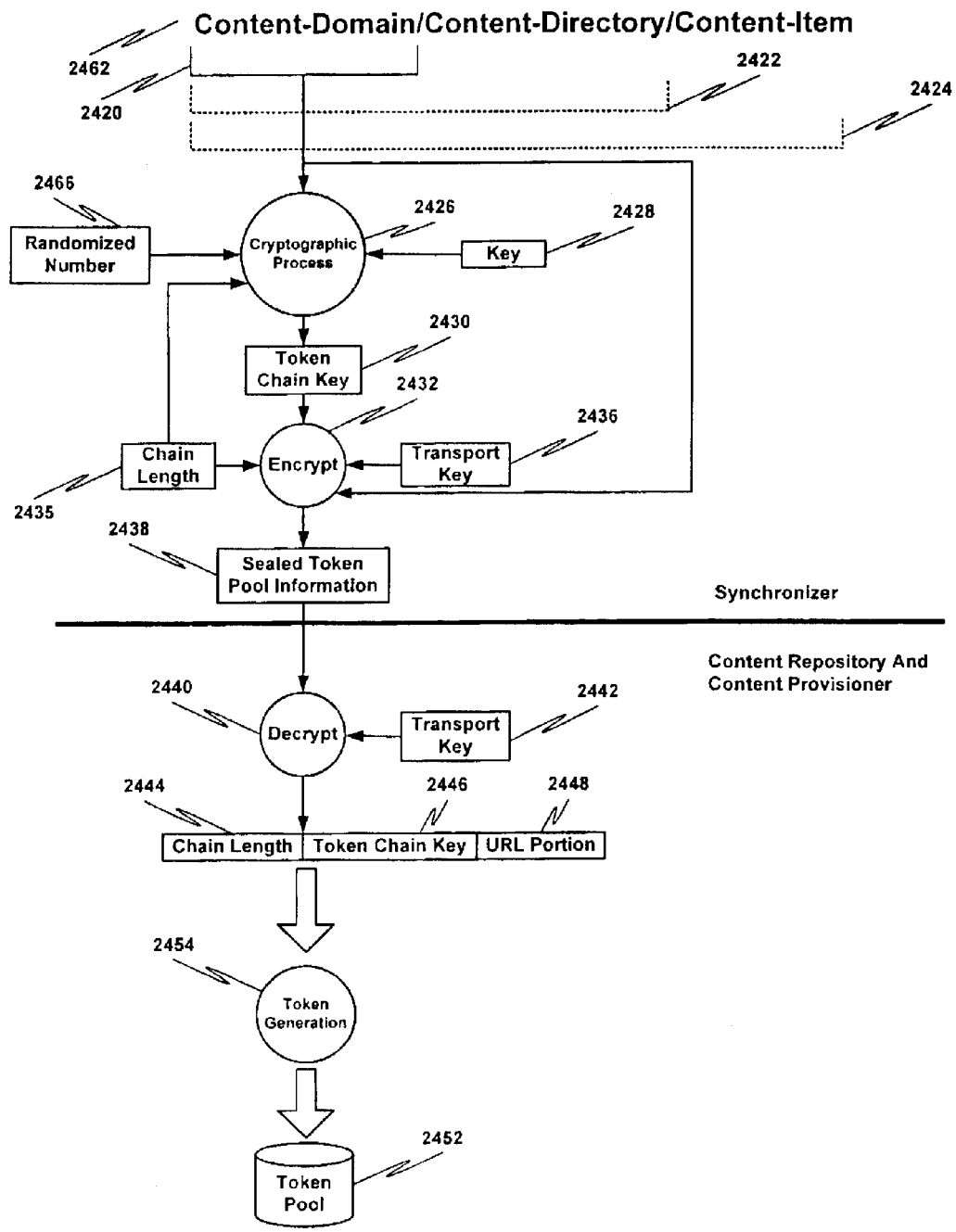
FIG. 24 is a data flow diagram that illustrates communicating token pool information from a synchronizer in accordance with one embodiment of the present invention.

FIG. 24 illustrates transferring one or more token chain keys and possibly additional information from a synchronizer. A cryptographic process 2426 is applied to a portion (2420, 2422, 2424) of a URL 2462, together with a key 2428. The URL 2462 identifies the protected digital content. According to one embodiment of the present invention, the URL comprises a content domain indicator (2420). According to another embodiment of the present invention, the URL comprises a content domain indicator and a content directory indicator (2422). According to another embodiment of the present invention, the URL comprises a content domain indicator, a content directory indicator and a content item indicator (2424). The cryptographic process may additionally be applied to a randomized number 2466 or a chain length 2435. According to one embodiment of the present invention, the cryptographic process comprises encryption. According to another embodiment of the present invention, the cryptographic process comprises a hashing function. The result of the cryptographic process is a token chain key 2430. The token chain key 2430 is encrypted with a transport key 2436, creating sealed token pool information 2438. A chain length, a portion of a URL 2462, or both may also be encrypted at 2432.

Still referring to FIG. 24, the decision regarding whether to encrypt the chain length or the URL at 2432 may be based on factors such as a level of trust with the receiving entity, and whether cryptographic process 2426 is reversible. If cryptographic process 2426 is irreversible and if the receiving entity requires additional information such as the chain length and the URL, the additional information is included in the data encrypted at 2432. The sealed token pool information 2438 may be communicated to a content provisioner for use in issuing authenticated digital content requests. The sealed token pool information may also be communicated to a content repository for use in validating authenticated digital content requests.

According to one embodiment of the present invention, cryptographic process 2426 corresponds to cryptographic process 1906 in FIG. 19. According to another embodiment of the present invention, cryptographic process 2426 corresponds to cryptographic process 2006 in FIG. 20. According to one embodiment of the present invention, cryptographic process 2426 corresponds to cryptographic process 2115 in FIG. 21. Those of ordinary skill in the art will recognize that other cryptographic processes may be used.

Still referring to FIG. 24, at 2440 a receiving entity such as a content repository or a content provisioner receives the sealed token pool information 2438 and decrypts it using a transport key 2442 agreed with the synchronizer. The contents of the unsealed token pool information depend upon what was input to the encryption process at 2432. As shown in FIG. 24, the unsealed token pool information comprises a token chain key 2446, a chain length 2444 and a portion of a URL 2448. A token generation process 2454 uses the unsealed token pool information to generate a token pool 2452. If the receiving entity is a content provisioner, the tokens in the token pool are used to create authenticated digital content requests. If the receiving entity is a content repository, the tokens in the token pool are used to validate authenticated digital content requests.

The mechanisms used to communicate token pool information as shown and described with respect to FIG. 24 are for illustrative purposes only and are not intended to be limiting in any way. Other cryptographic methods and sealed data may be used.

Figure 25:
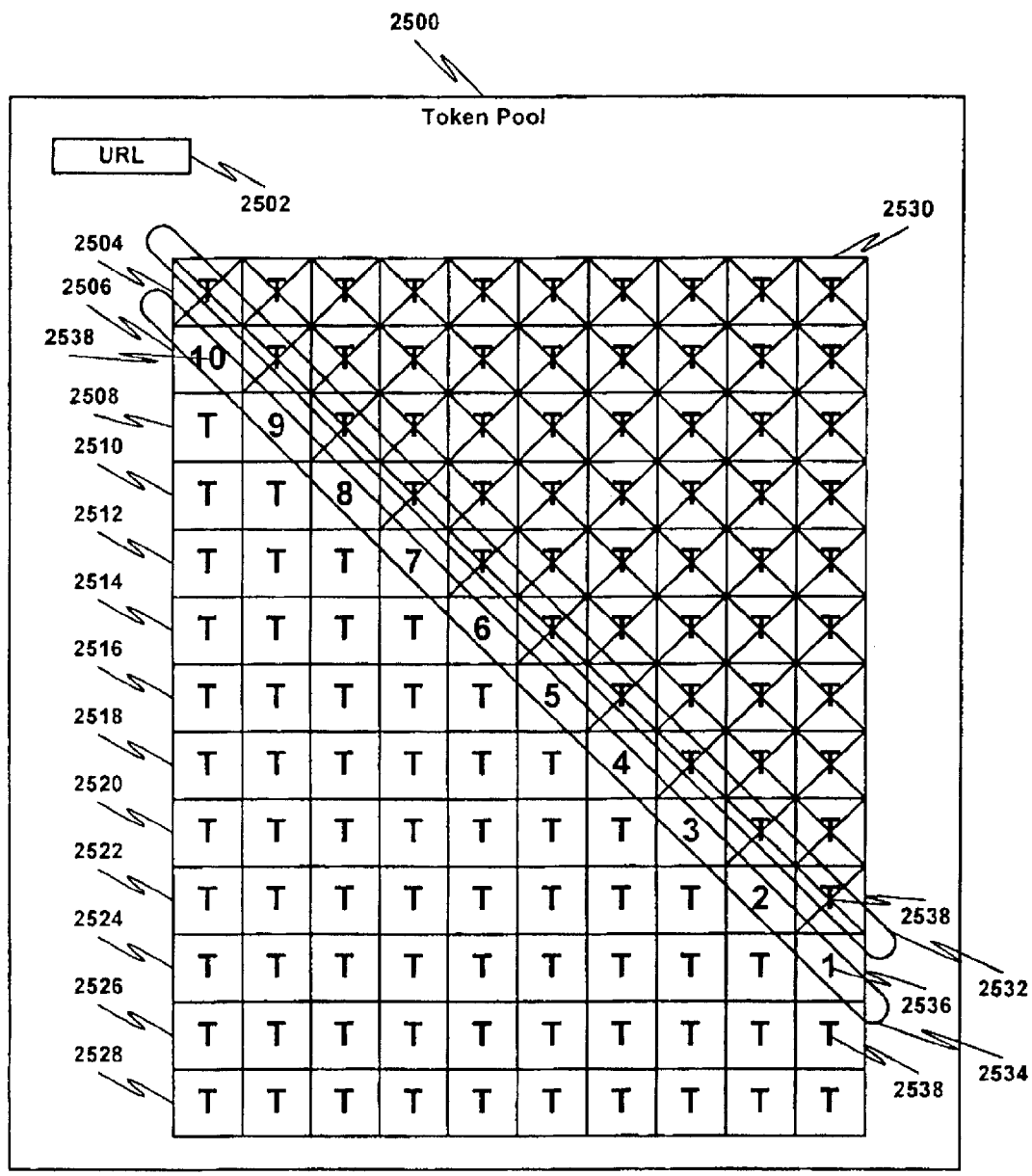
FIG. 25 is a block diagram that illustrates allocating tokens from a token pool comprising one or more token chains created using a cryptographic one-way function in accordance with one embodiment of the present invention.
Figure 26:
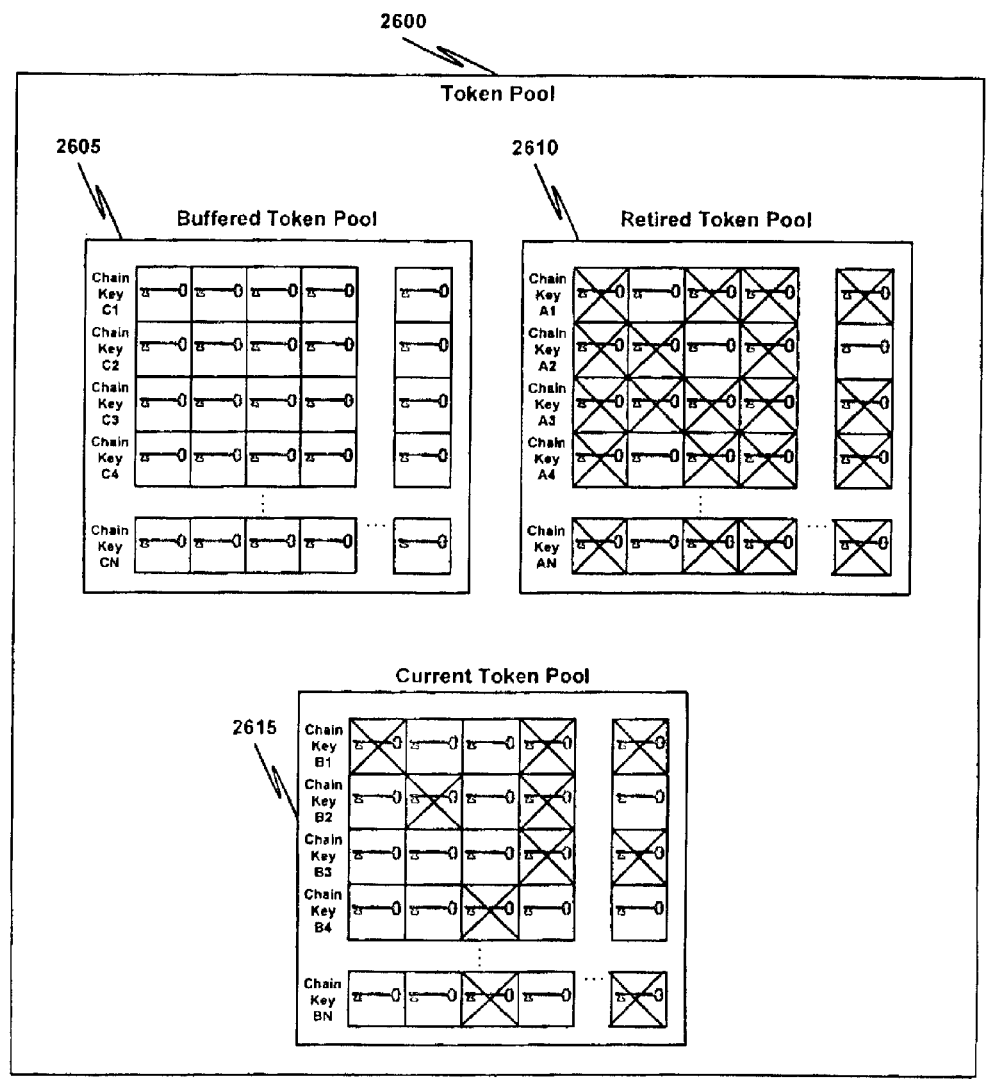
FIG. 26 is a block diagram that illustrates a token pool having a current token pool for current token redemptions, a retired token pool for tokens that have been available for redemption for a predetermined time and a buffered token pool for future token redemptions in accordance with one embodiment of the present invention.

FIGS. 25 and 26 illustrate token pools comprising one or more token chains that comprise one or more tokens in accordance with embodiments of the present invention. FIG. 25 illustrates a single token pool that comprises one or more token chains created using cryptographic one-way functions, and FIG. 26 illustrates a single token pool that comprises one or more smaller token pools that may be organized as described with respect to FIG. 25.

As mentioned above, the term "cryptographic one-way function" describes any cryptographic process that produces an output based upon an input, such that it is computationally infeasible to compute the input based upon the output. However, it is less difficult to compute a later-generated token when an earlier-generated token is known. Therefore, it may be possible to receive an earlier-generated token and compute a later-generated token that has been issued but has not been redeemed. This computed token may then be used to obtain unauthorized access to digital content and consequently prevent the authorized recipient of the token from using the token to obtain access to digital content. According to one embodiment of the present invention, a token pool comprises one or more token chains created using cryptographic one-way functions. Tokens are issued from alternating chains, decreasing the per-token-chain number of tokens that have been issued but have not been redeemed, and thus decreasing the likelihood that a valid but unauthorized token may be computed based upon a previously generated token. This is explained in more detail below with reference to FIG. 25.

Turning now to FIG. 25, a block diagram that illustrates allocating tokens from a token pool comprising one or more token chains created using a cryptographic one-way function in accordance with one embodiment of the present invention is presented. Token pool 2500 comprises token chains 2504-2528. Token chains 2504-2528 comprise a predetermined number of tokens. According to one embodiment of the present invention, a token in a token chain is formed by applying a cryptographic one-way function to the previous token as illustrated with respect to FIGS. 21 and 23.

According to one embodiment of the present invention, tokens in a token pool as illustrated in FIG. 25 are allocated with each successive token allocation originating from a token chain that is different than the last. Where tokens in a token pool are based upon encrypting a number in a series as illustrated with respect to FIGS. 19, 20 and 22, a randomized selection process may be used to select an unallocated token from a particular token chain.

According to another embodiment of the present invention, tokens in a token pool as illustrated in FIG. 25 are allocated beginning with the last-generated token 2530 in the first token chain 2504 and continuing in a diagonal pattern. Cryptographic one-way functions are used to create the tokens in the token chains. Since the per-chain token allocation order is the reverse of the token generation order, allocation of the first-generated token indicates the token chain has been fully allocated. Accordingly, one or more additional token chains are requested upon allocating the first-generated token in what is currently the last token chain. This obviates the need for a more complex mechanism for determining whether another token chain should be requested, such as counting the number of tokens allocated and requesting an additional chain at predetermined intervals.

FIG. 25 shows the state of token pool 2500 after several tokens have been allocated. As shown in FIG. 25, all tokens in token chain 2504 have been allocated, token chains 2506-2522 are partially allocated and token chains 2524-2528 are unallocated. Diagonal 2532 indicates the last-allocated tokens and diagonal 2534 indicates the tokens to be allocated next, beginning with token 2536 and ending with token 2538. According to one embodiment of the present invention, a determination regarding whether to request additional token chains is made upon allocating the last token in a token chain. Using FIG. 25 as an example, the previous determination regarding whether to request additional token chains was made upon allocating token 2538, the current determination is made upon allocating token 2536 and the next determination will be made upon allocating token 2538. The determination may be based at least in part on one or more factors such as the number of tokens per chain and the token allocation rate.

The number of token chains and the number of tokens in each token chain as shown in FIG. 25 are not intended to be limiting in any way. Those of ordinary skill in the art will recognize that the number of tokens in each token chain and the number of token chains in a token pool may vary. Additionally, the number of tokens in each token chain need not be uniform with respect to one or more token chains within a token pool.

According to embodiments of the present invention, a token pool comprises a plurality of smaller token pools. This is described below in detail with reference to FIG. 26.

Turning now to FIG. 26, a block diagram that illustrates a token pool having a current token pool for current token redemptions, a retired token pool for tokens that have been available for redemption for a predetermined time and a buffered token pool for future token redemptions in accordance with one embodiment of the present invention is presented. In operation, a content repository satisfies token redemption requests from a current token pool 2615 and a retired token pool 2610. An indication is made when a token is redeemed so that a token is redeemed a predetermined number of times. According to one embodiment of the present invention, this predetermined number of times is one. When the decision is made to start satisfying token redemption requests from a new token pool, the retired token pool 2610 is discarded, the current token pool 2615 becomes the retired token pool 2610, the buffered token pool 2605 becomes the current token pool 2615 and a new buffered token pool 2605 is received.

According to one embodiment of the present invention, the decision to start satisfying token redemption requests from a new token pool is based at least in part on the number of unredeemed tokens remaining in the current token pool 2615. By way of example, a content repository may be configured such that redemption requests begin to be satisfied from a new token pool when the number of tokens not fully redeemed remaining in the current token pool falls below ten.

According to another embodiment of the present invention, the decision to start satisfying token redemption requests from a new token pool is based at least in part on the amount of time that the current token pool has been available for satisfying token redemption requests. By way of example, a content repository may be configured such that redemption requests begin to be satisfied from a new token chain when a current token chain has been available for satisfying token redemption requests for ten or more minutes.

According to another embodiment of the present invention, the decision to start satisfying token redemption requests from a new token pool is based at least in part on instructions provided by an external source, such as a content provisioner. By way of example, a content repository may be configured begin satisfying token redemption requests from a new token pool when instructed to do so by a digital content provisioner.

FIGS. 27-33 illustrate initialization of a system for digital content access control in accordance with embodiments of the present invention. FIGS. 34-51 illustrate operation of a system for digital content access control in accordance with embodiments of the present invention.

Figure 27:
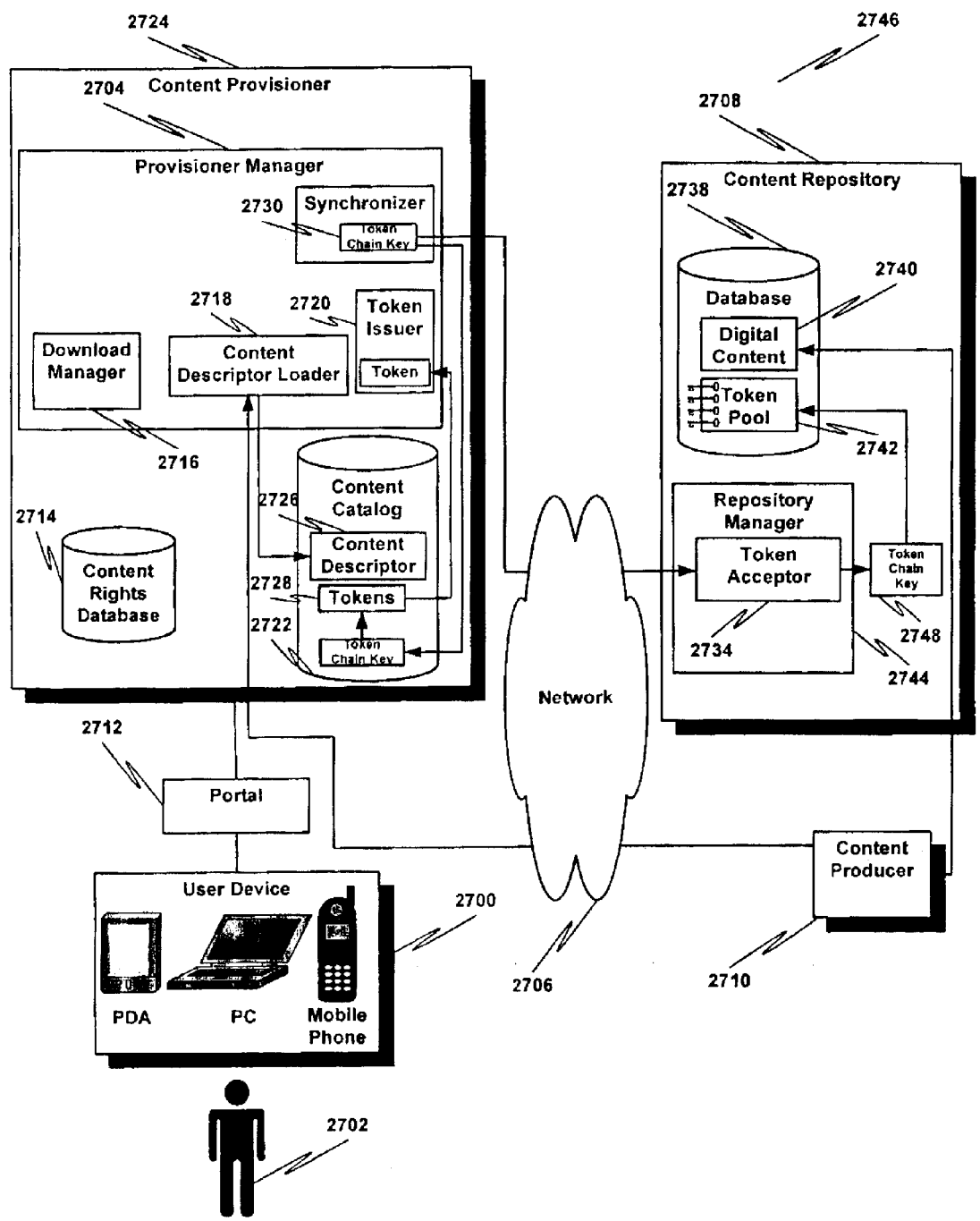
FIG. 27 is a detailed block diagram that illustrates initialization of a system for digital content access control in accordance with one embodiment of the present invention.

Turning now to FIG. 27, a detailed block diagram that illustrates initialization of a system for digital content access control in accordance with one embodiment of the present invention is presented. System 2746 comprises at least one user device 2700, at least one content provisioner 2734, at least one content repository 2708 and at least one content producer 2710 that communicate via network 2706. User device 2700 is configured to send a digital content request and receive digital content in response to the digital content request. User device 2700 may be any device configured to render digital content to a user 2702.

According to embodiments of the present invention, user device 2700 comprises a CDMA technology-enabled smart card, a SIM card, a WIM, a USIM, a UIM, a R-UIM or the like.

Content provisioner 2724 is configured to receive a digital content request and return an authenticated digital content request in response to the received digital content request. Content provisioner 2724 comprises a provisioner manager 2704, a content rights database 2714 and a content catalog 2722. Content rights database 2714 is configured to store an association between one or more users 2702 and a description of the digital content that the one or more users are authorized to access. Content catalog 2722 comprises a description of digital content stored by one or more digital content repositories 2708.

Still referring to FIG. 27, provisioner manager 2704 comprises a token issuer 2720, a download manager 2716, a content descriptor loader 2718 and a synchronizer 2730. Content descriptor loader 2718 is configured to load one or more content descriptors provided by one or more content producers 2710. Download manager 2716 is configured to receive a digital content request such as a portion of a URL or the like and communicate with content rights database 2722 to determine whether the user is authorized to access the digital content. Download manager 2716 is also configured to send a token request if access is authorized, receive the requested token and create an authenticated digital content request based at least in part on the token and the digital content request. Synchronizer 2730 is configured to synchronize token information between content provisioner 2724 and content repository 2708. According to one embodiment of the present invention, an authenticated digital content request comprises a tokenized URL.

Still referring to FIG. 27, download manager 2716 is also configured to send the authenticated digital content request. Token issuer 2720 is configured to receive a token request, generate a token associated with the digital content for which access is requested, and return the token.

Content repository 2708 is configured to receive an authenticated digital content request and return digital content corresponding to the authenticated digital content request. Content repository 2708 comprises a repository manager 2744 and a database 2738. Database 2738 comprises digital content 2740 and a token pool 2742 associated with the digital content 2740.

Still referring to FIG. 27, repository manager 2744 comprises a token acceptor 2734. Token acceptor 2734 is configured to accept digital content request information. The authenticated digital content request information may comprise, by way of example, a token pool, information for use in generating a token pool, and the number of tokens released by the content provisioner. The information may also comprise one or more token chain keys and corresponding token chain lengths. Token acceptor 2734 is also configured to accept a token and communicate with token pool 2742 to determine whether the token is valid for the digital content requested.

Content producer 2710 is configured to provide digital content to content repository 2708. Content producer 2710 is also configured to provide at least one digital content description corresponding to the digital content stored by at least one content repository 2708.

During initialization of system 2746, at least one content producer 2710 provides digital content to at least one content repository 2708. Content repository 2708 stores the digital content in database 2738. Content producer 2710 also provides a description of the same content to at least one content provisioner 2724. Content descriptor loader 2718 receives the content description and sends it to content catalog 2722 in content provisioner 2724.

Figure 28:
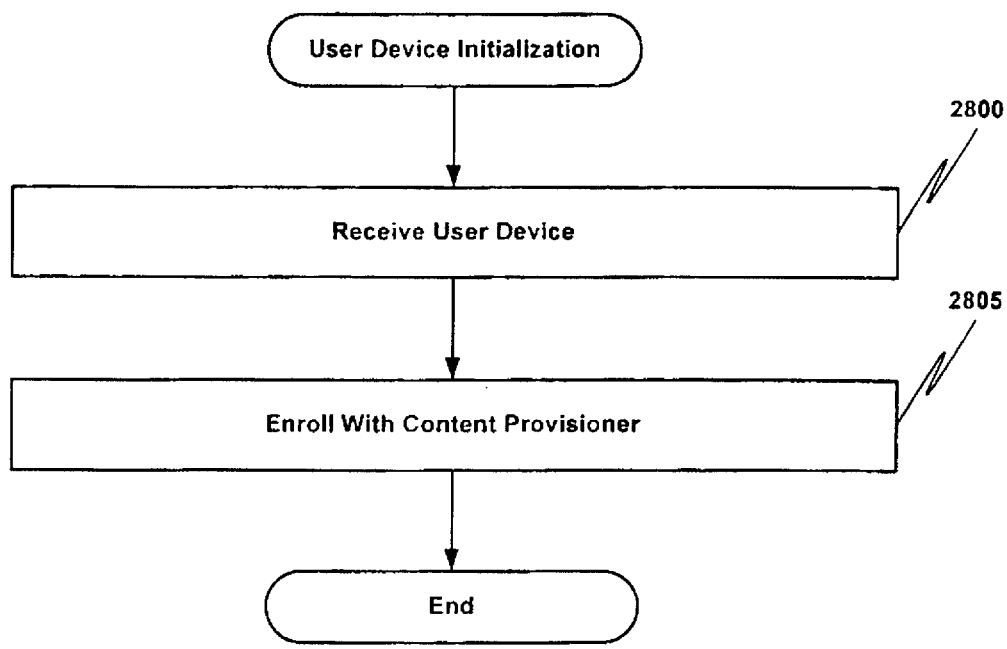
FIG. 28 is a flow diagram that illustrates a method for digital content access control from the perspective of a user device in accordance with one embodiment of the present invention.

Turning now to FIG. 28, a flow diagram that illustrates a method for digital content access control from the perspective of a user device in accordance with one embodiment of the present invention is presented. At 2800, a user device is received. At 2805, a user uses the user device to enroll with a content provisioner. During the enrollment process, the user authenticates himself or herself to the content provisioner and may provide payment information such as authorization to charge a credit card or authorization to debit a debit card or checking account for digital content made accessible by tokens issued to the user.

Figure 29:
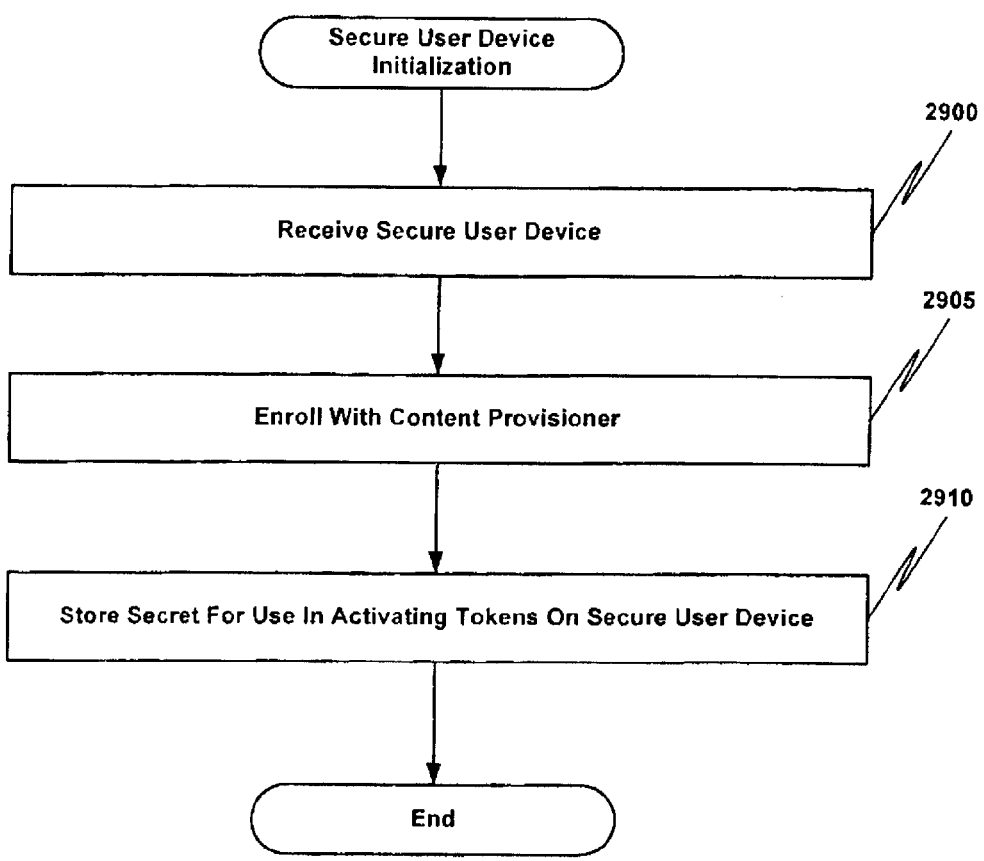
FIG. 29 is a flow diagram that illustrates a method for digital content access control from the perspective of a secure user device in accordance with one embodiment of the present invention.

Turning now to FIG. 29, a flow diagram that illustrates a method for digital content access control from the perspective of a secure user device in accordance with one embodiment of the present invention is presented. FIG. 29 corresponds with FIGS. 15 and 16. At 2900, a user device is received. At 2905, the user uses the user device to enroll with a content provisioner. At 2910, the secret is stored for use in activating tokens on a secure user device.

According to another embodiment of the present invention, enrolling with a content provisioner (2805, 2905) and receiving a secure user device (2800, 2900) is combined into one cryptographic process, such that a user receives a secure user device enabled to receive digital content upon successfully enrolling with the content provisioner.

Figure 30:
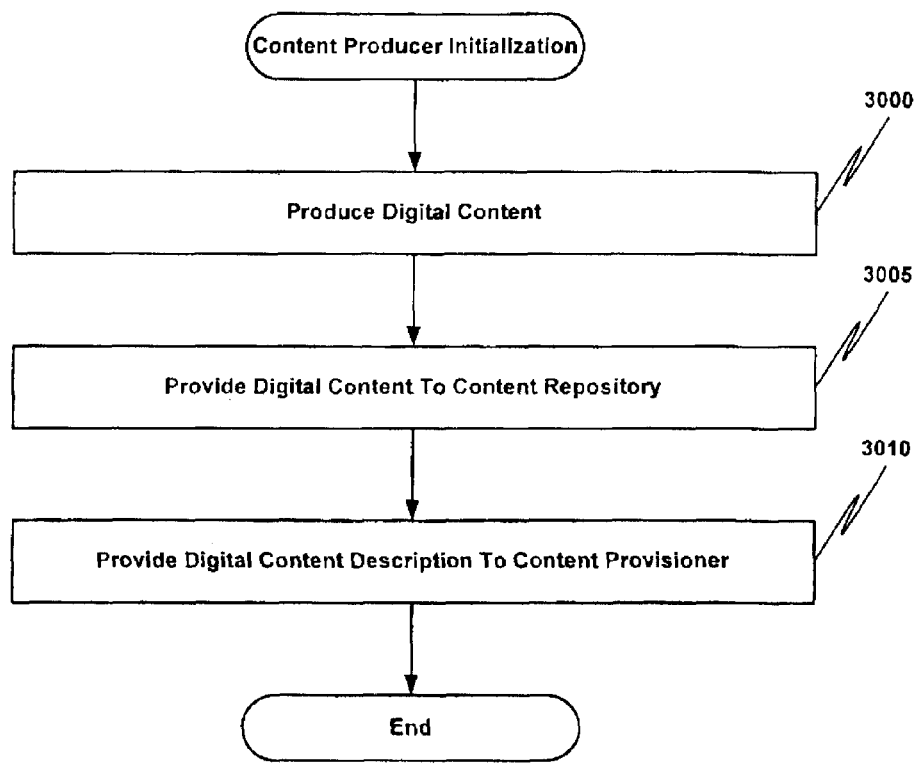
FIG. 30 is a flow diagram that illustrates a method for initializing a digital content producer in accordance with one embodiment of the present invention.

Turning now to FIG. 30, a flow diagram that illustrates a method for initializing a digital content producer in accordance with one embodiment of the present invention is presented. At 3000, digital content is produced. By way of example, a digital music producer creates digital files (such as MP3 files) that store musical content. At 3005, the content producer provides the digital content to a content repository. At 3010, the content producer provides a description of the digital content to a content provisioner. Using the above example, the digital content producer provides musical content such as digital musical tracks to the content repository.

The content producer also provides a description of the digital content (such as the artist and title of the musical tracks) to a content provisioner.

According to another embodiment of the present invention, a content producer provides digital content and a description of the digital content to a synchronizer. The synchronizer generates token pool information associated with the digital content, sends the digital content and token pool information to a content repository and sends the digital content description and token pool information to a content provisioner.

Figure 31:
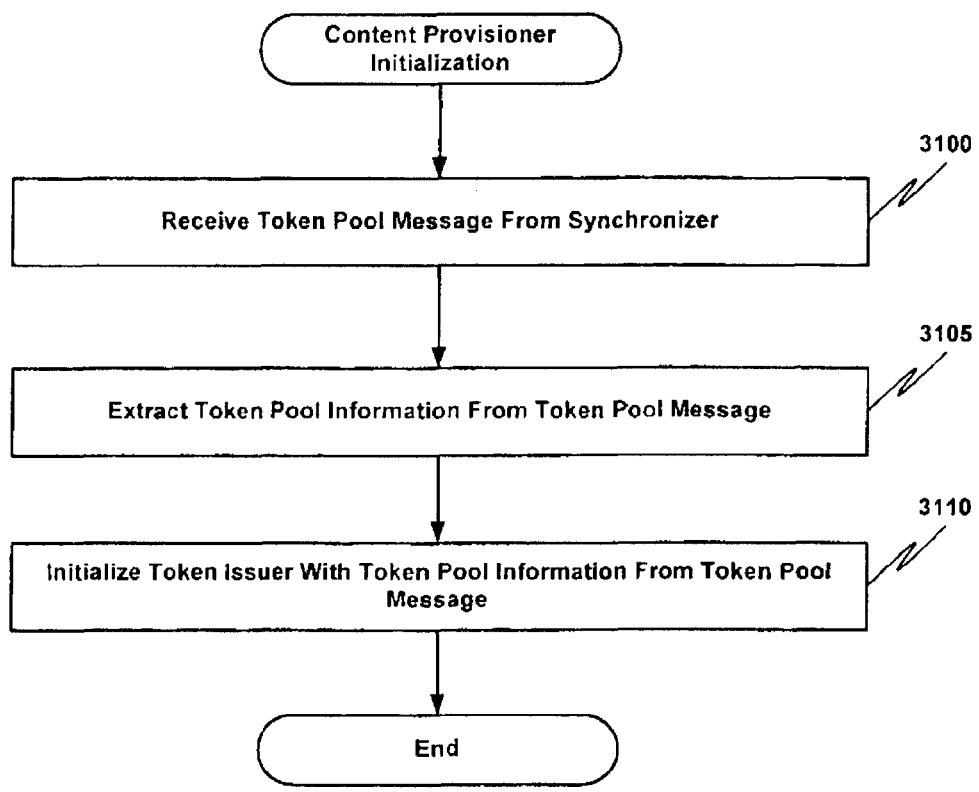
FIG. 31 is a flow diagram that illustrates a method for initializing a digital content provisioner in accordance with one embodiment of the present invention.

Turning now to FIG. 31, a flow diagram that illustrates a method for initializing a digital content provisioner in accordance with one embodiment of the present invention is presented. At 3100, a token pool message is received from a synchronizer. The message may be encrypted. At 3105, token pool information is extracted from the pool message. At 3110, the token issuer is initialized with token pool information from the token pool message.

Figure 32:
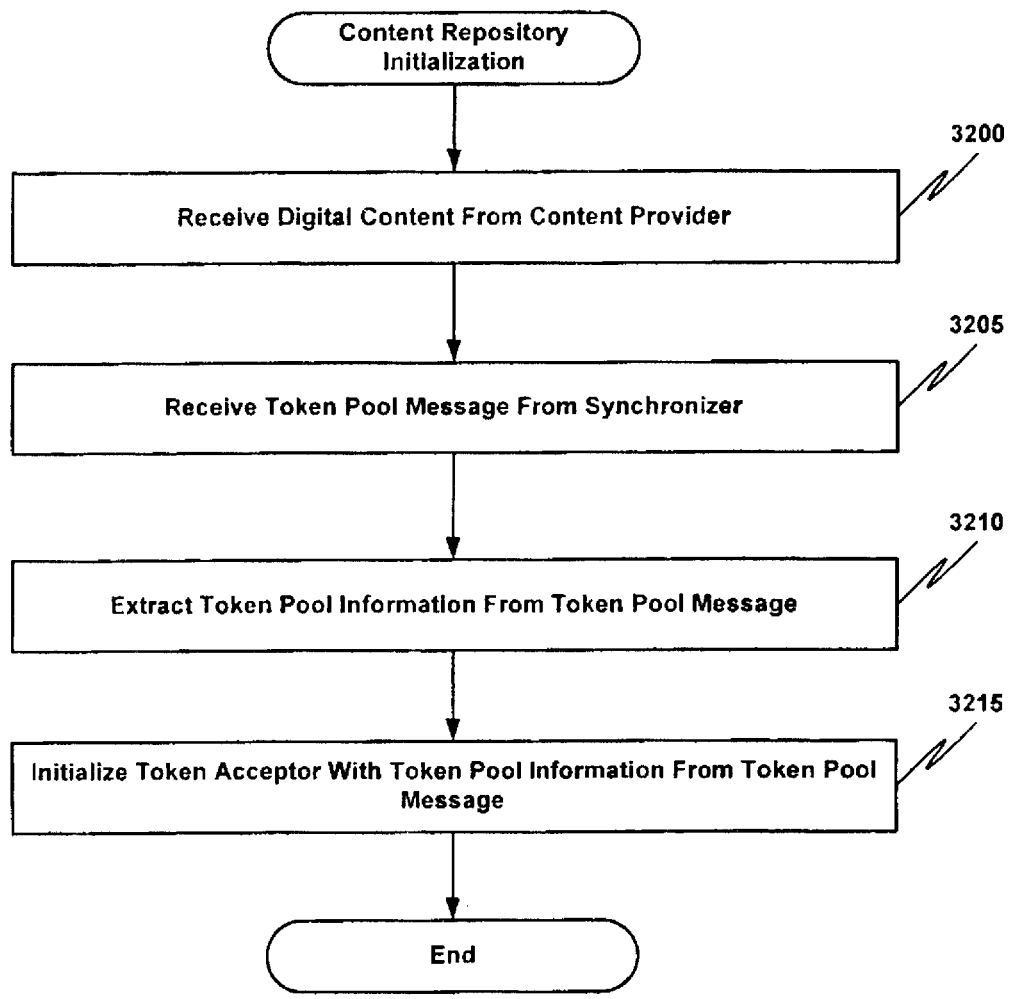
FIG. 32 is a flow diagram that illustrates a method for content repository initialization in accordance with one embodiment of the present invention.

Turning now to FIG. 32, a flow diagram that illustrates a method for content repository initialization in accordance with one embodiment of the present invention is presented. At 3200, digital content from a content provider is received. At 3208, a token pool message from a synchronizer is received. The message may be encrypted. At 3210, token pool information is extracted from the token pool message. At 3215, a token acceptor is initialized with the token pool information from the token pool message.

Figure 33:
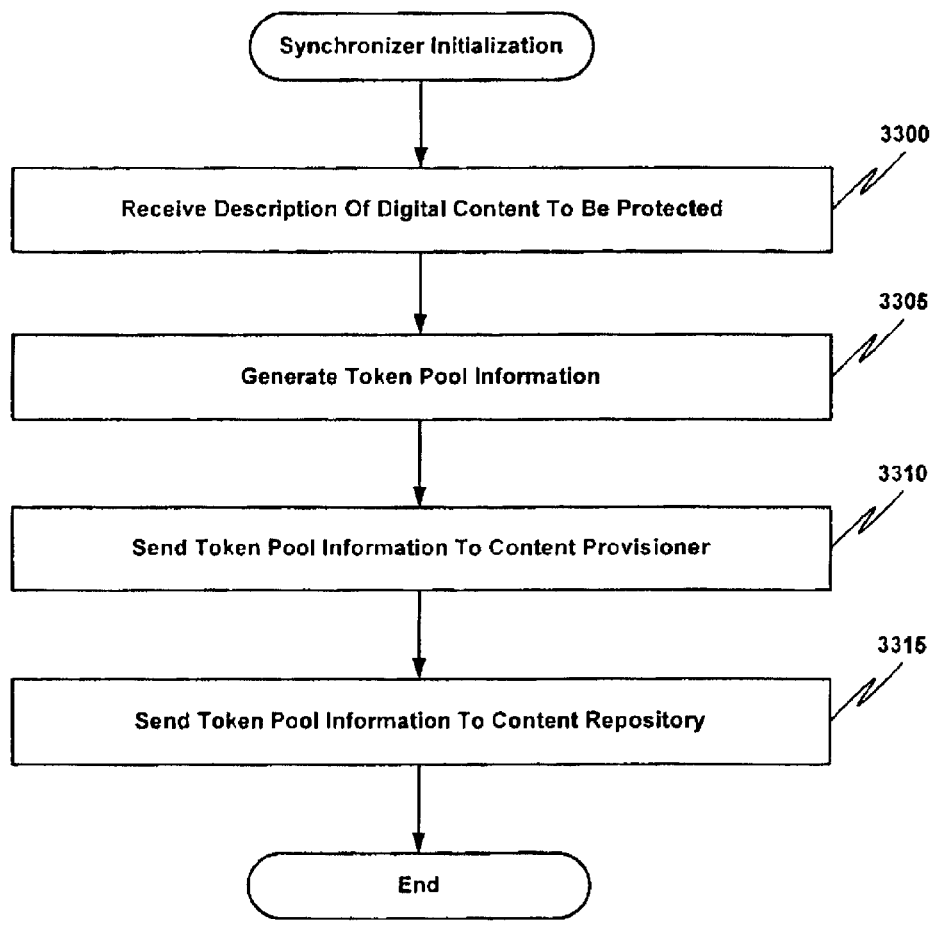
FIG. 33 is a flow diagram that illustrates a method for synchronizer initialization in accordance with one embodiment of the present invention.

Turning now to FIG. 33, a flow diagram that illustrates a method for synchronizer initialization in accordance with one embodiment of the present invention is presented. At 3300, a description of the digital content to be protected is received. The description may comprise, by way of example, a URL, part of a URL, a summary of the digital content, a hash of the digital content, or the like. At 3300, token pool information is generated. At 3305, the token pool information is sent to one or more content provisioners. At 3310, the token pool information is sent to one or more content repositories.

Figure 34:
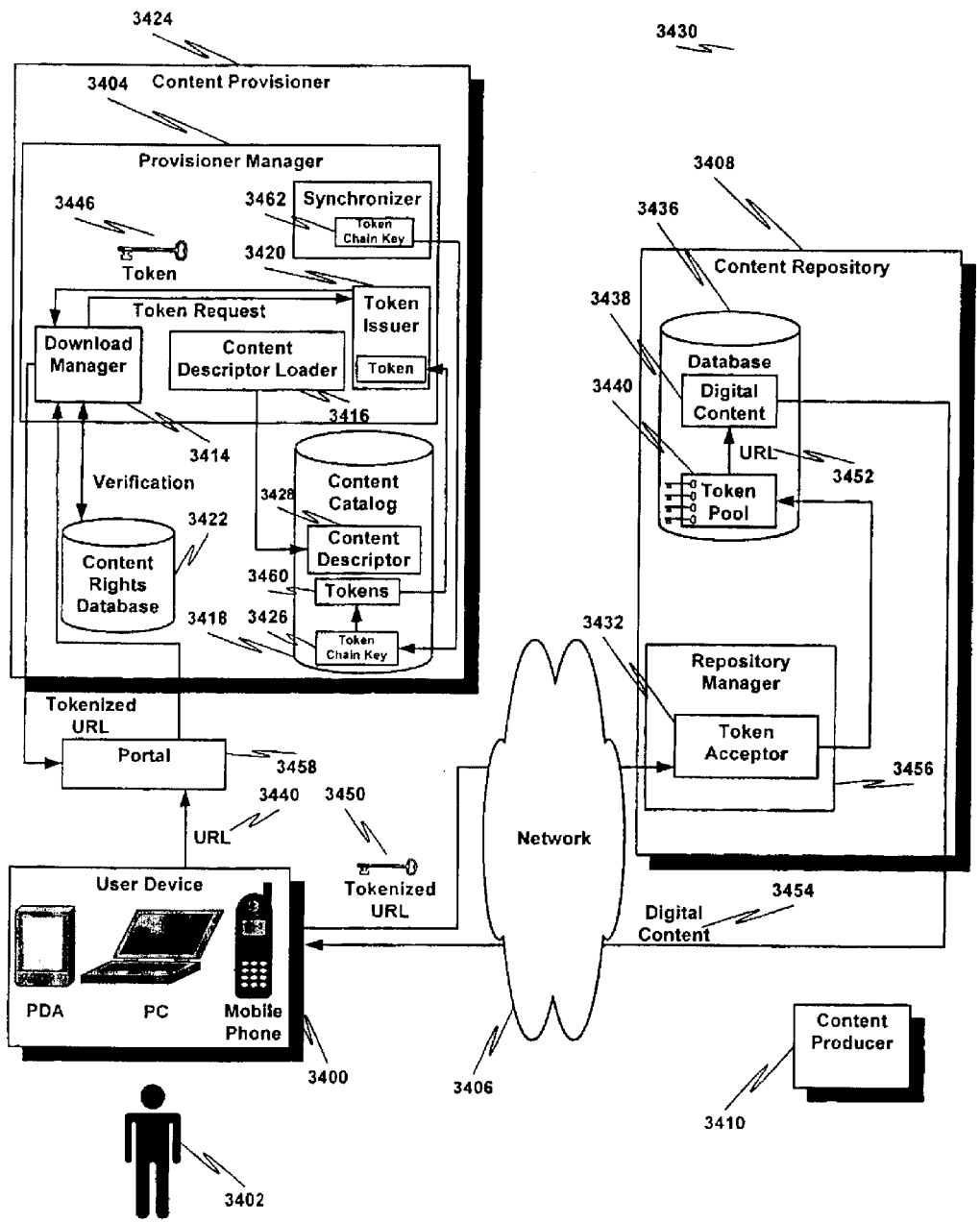
FIG. 34 is a detailed block diagram that illustrates a system for digital content access control in accordance with one embodiment of the present invention.

Turning now to FIG. 34, a detailed block diagram that illustrates a system for digital content access control in accordance with one embodiment of the present invention is presented. FIG. 34 illustrates using tokens to access digital content once the system has been initialized as described with respect to FIGS. 27-33. In operation, user device 3400 sends a digital content request in the form of a URL to content provisioner 3404 via portal 3458. Download manager 3414 in provisioner manager 3424 receives the URL and communicates with content rights database 3422 to verify whether the user 3402 is authorized to access the digital content associated with the URL. If the user 3402 is authorized to access the digital content associated with the URL, download manager 3414 sends a token request 3444 to token issuer 3420. Token issuer 3420 receives the token request 3444 and communicates with content catalog 3418 to obtain a token associated with the digital content referenced by the URL. Token issuer 3420 sends the token 3446 to download manager 3414. Download manager creates a tokenized URL 3448 based at least in part on the URL 3440 and the token 3446 and sends the tokenized URL 3448 to user device 3400 via portal 3458. User device 3400 sends the tokenized URL 3450 to content repository 3408 via network 3406. Token acceptor 3432 in repository manager 3456 receives the tokenized URL 3450 and communicates with token pool 3440 in database 3436 to determine whether the tokenized URL 3450 is valid. If the tokenized URL 3450 is valid, the digital content associated with the tokenized URL 3450 is obtained from digital content storage 3438 and sent to user device 3400 via network 3406.

Figure 35:
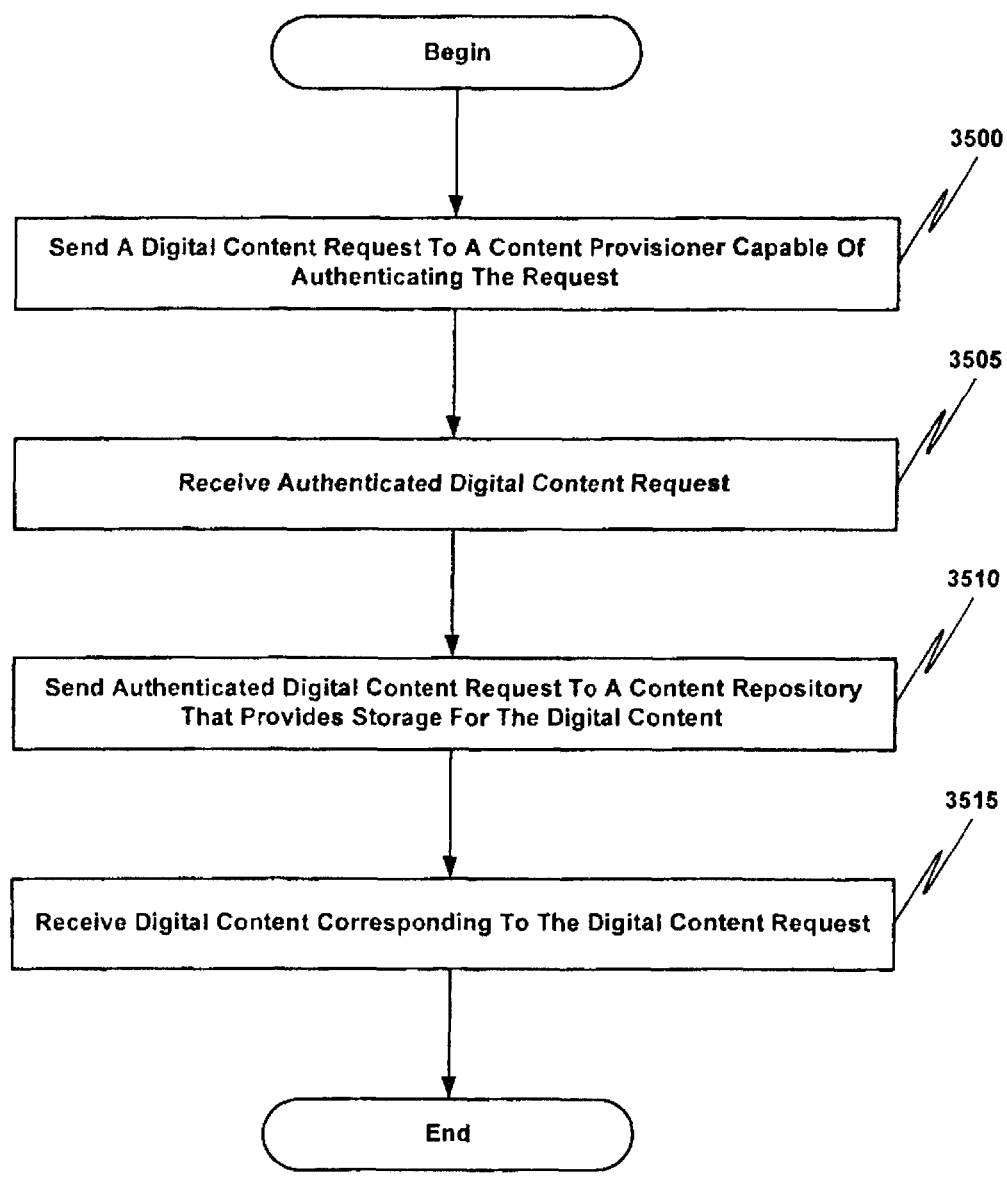
FIG. 35 is a flow diagram that illustrates a method for digital content access control from the perspective of a user device in accordance with one embodiment of the present invention.

Turning now to FIG. 35, a flow diagram that illustrates a method for digital content access control from the perspective of a user device in accordance with one embodiment of the present invention is presented. FIG. 35 illustrates operation of a user device in a system such as system 370 in FIG. 3, where a content provisioner does not communicate directly with a content repository to obtain digital content associated with a digital content request. At 3500, a digital content request is sent to a content provisioner capable of authenticating the request. At 3505, an authenticated digital content request is received in response to sending the digital content request. At 3510, the authenticated digital content request is sent to a content repository that provides storage for the digital content. At 3515, digital content corresponding to the authenticated digital content request is received in response to the authenticated digital content request.

As mentioned above with respect to FIG. 4, according to one embodiment of the present invention, a requesting user device issues a digital content request and a receiving user device receives digital content in response to the digital content request. In more detail with reference to FIG. 35, the requesting user device (reference numeral 400 of FIG. 4) sends a digital content request (3500) to a content provisioner, receives an authenticated digital content request (3505) and sends the authenticated digital content request to a content repository that provides storage for the digital content (3510). The authenticated digital content request may comprise delivery information, or may be used to obtain delivery information. The delivery information may indicate a receiving device that is different from the requesting device. The receiving user device (reference numeral 402 of FIG. 4) receives digital content corresponding to the digital content request (3515).

Figure 36:
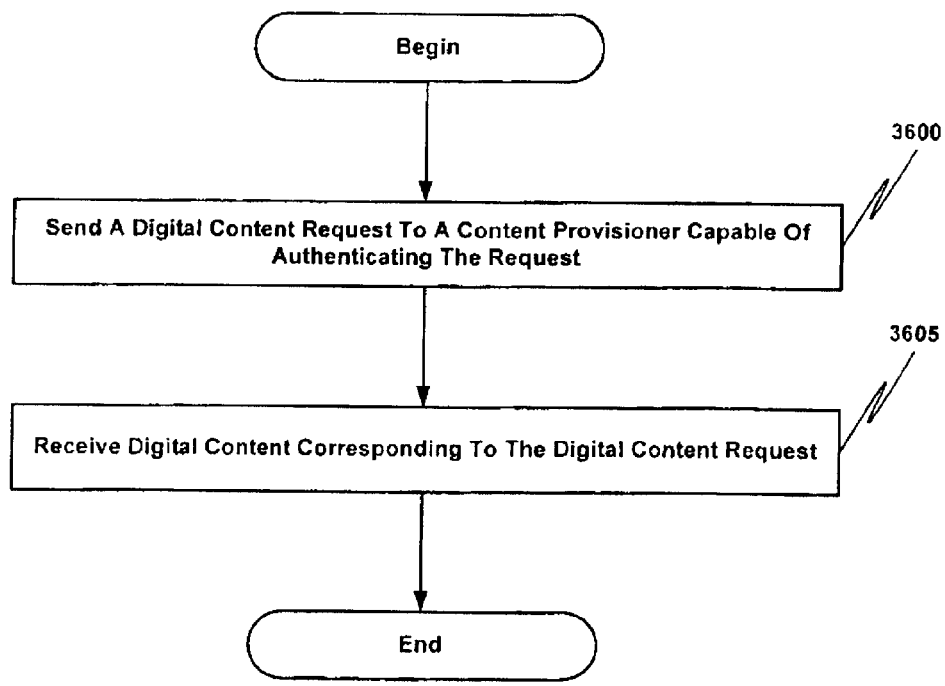
FIG. 36 is a flow diagram that illustrates a method for digital content access control from the perspective of a user device in accordance with one embodiment of the present invention.

Turning now to FIG. 36, a flow diagram that illustrates a method for digital content access control from the perspective of a user device in accordance with one embodiment of the present invention is presented. FIG. 36 illustrates operation of a user device in a system such as system 598 in FIG. 5, where a portal handles communication between a content provisioner and a content repository to obtain digital content associated with a digital content request entered by a user. According to one embodiment of the present invention, the portal that handles communications between a user device and a content provisioner also handles communications between the content provisioner and the content repository. At 3600, a digital content request is sent to a content provisioner capable of authenticating the request. At 3605, digital content corresponding to the digital content is received in response to the digital content request.

Figure 37:
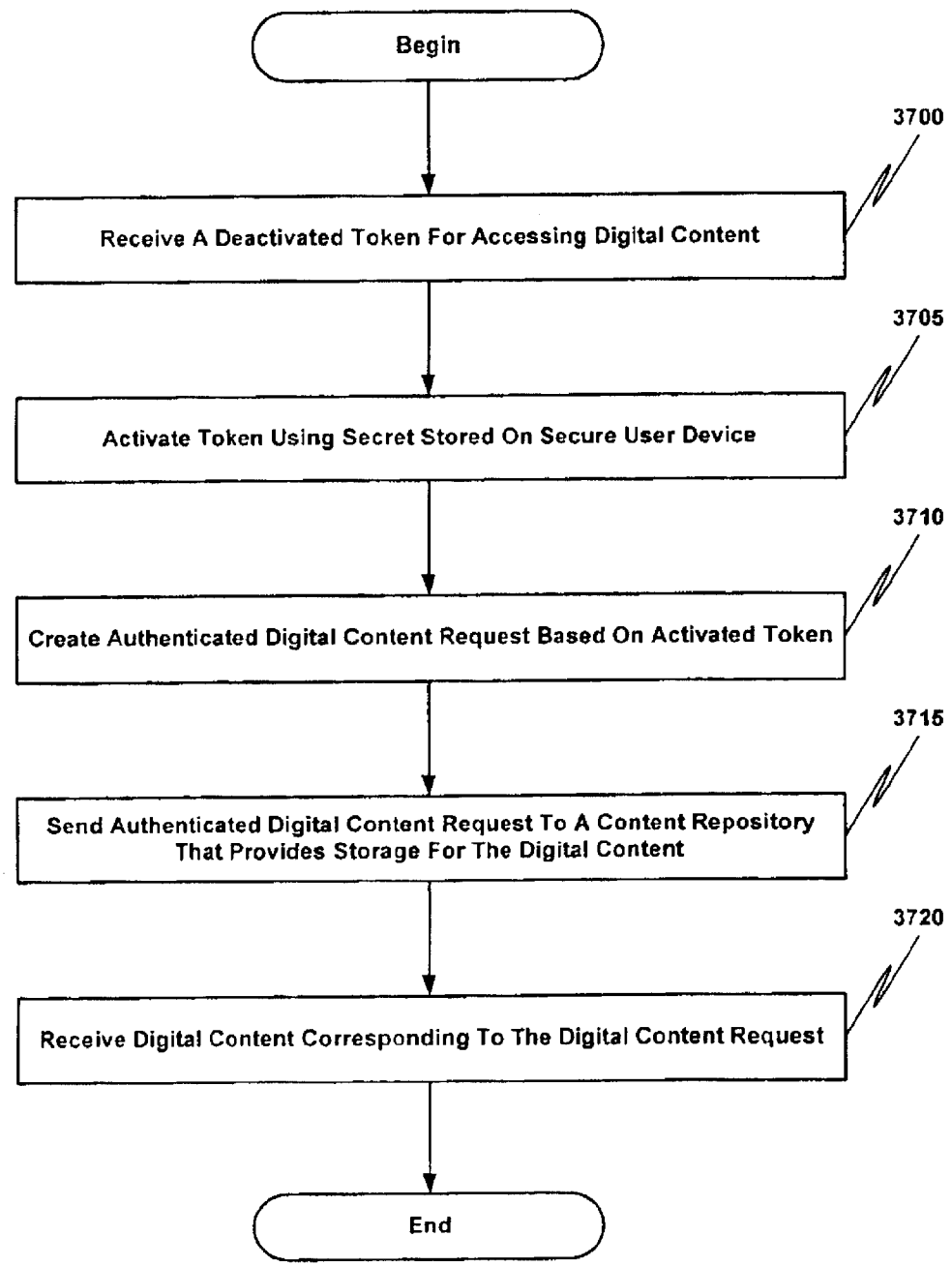
FIG. 37 is a flow diagram that illustrates a method for digital content access control from the perspective of a secure user device in accordance with one embodiment of the present invention.

Turning now to FIG. 37, a flow diagram that illustrates a method for digital content access control from the perspective of a secure user device in accordance with one embodiment of the present invention is presented. FIG. 37 corresponds with FIGS. 15 and 16. At 3700, a deactivated token for accessing digital content is received. At 3705, the deactivated token is activated using a secret stored on the secure user device. At 3710, an authenticated digital content request is created based at least in part on the activated token. At 3715, the authenticated digital content request is sent to a content repository that provides storage for the digital content. At 3720, digital content corresponding to the digital content request is received.

Figure 38:
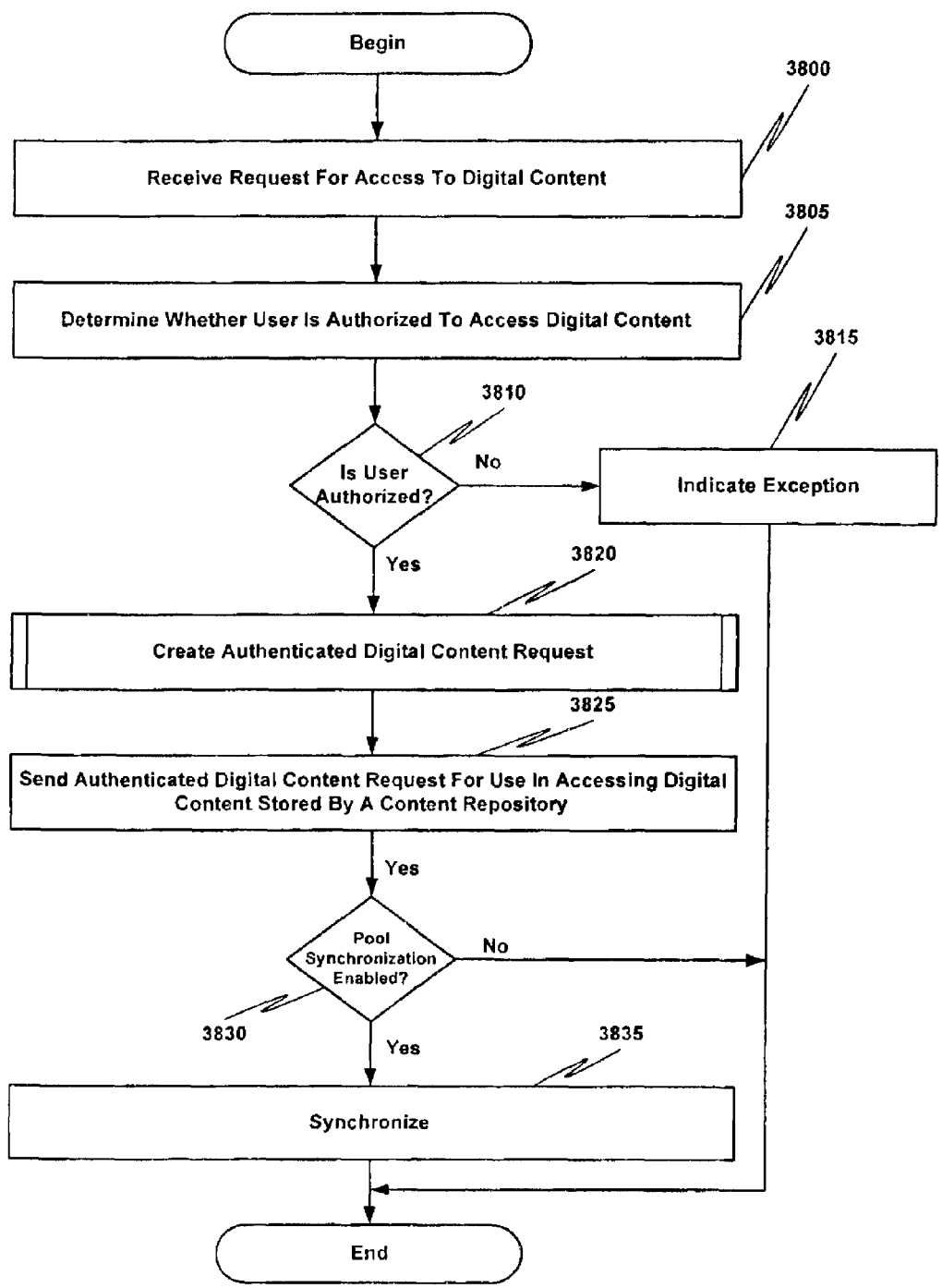
FIG. 38 is a flow diagram that illustrates a method for digital content access control from the perspective of a digital content provisioner in accordance with one embodiment of the present invention.

Turning now to FIG. 38, a flow diagram that illustrates a method for digital content access control from the perspective of a digital content provisioner in accordance with one embodiment of the present invention is presented. At 3800, a request for access to digital content is received. At 3805, a determination is made regarding whether the user that issued the request is authorized to access the digital content. The result of this determination is checked at 3810. If the requested access is unauthorized, an exception is indicated at 3815. If the requested access is authorized, an authenticated digital content request is created at 3820 and at 3825, the authenticated digital content request is sent for use in accessing the digital content from a content repository. At 3830, a determination is made regarding whether pool synchronization is enabled. Pool synchronization comprises determining whether additional tokens are required and requesting additional tokens if it is determined that more are required. If enabled, pool synchronization is performed at 3835.

Figure 39:
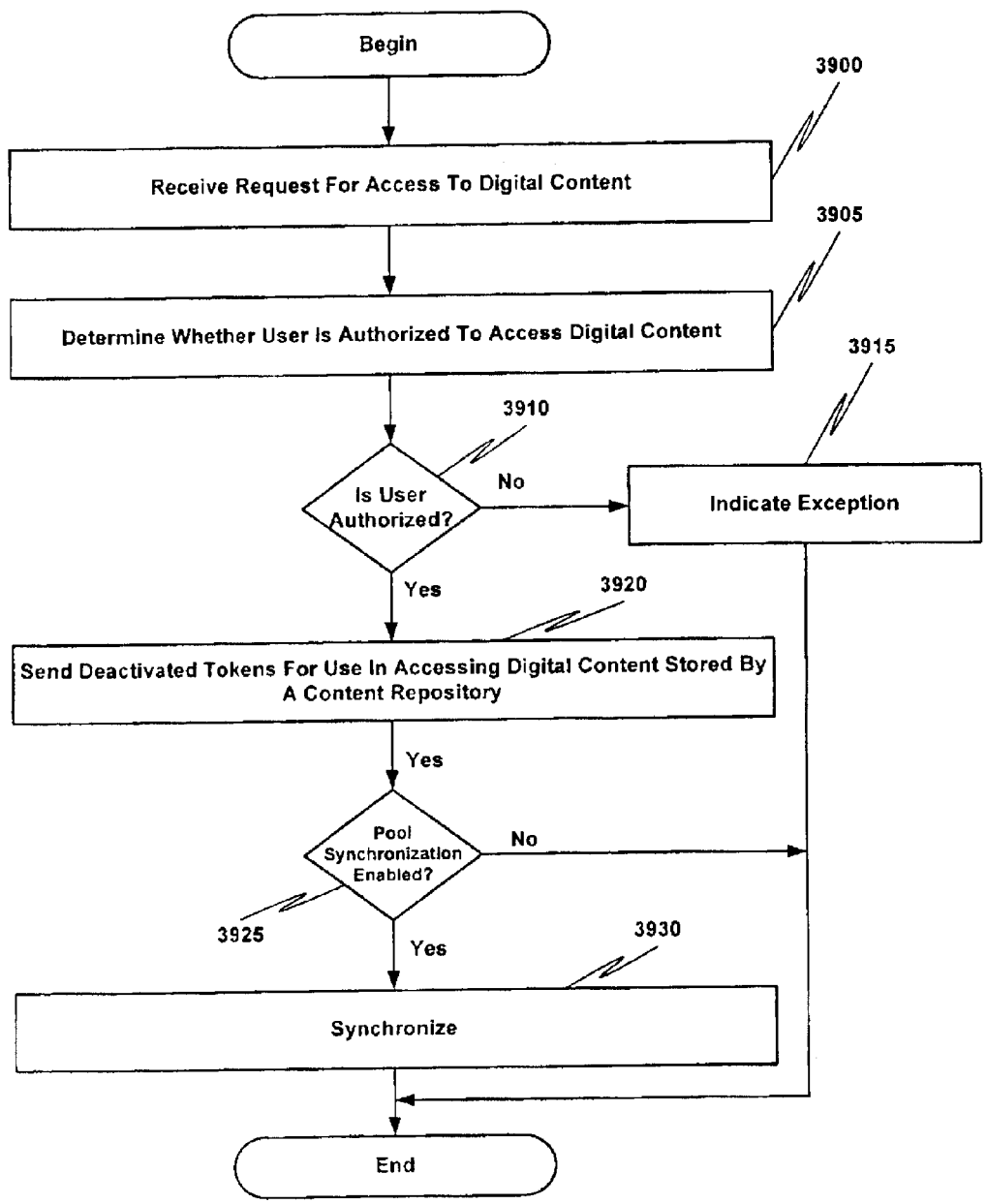
FIG. 39 is a flow diagram that illustrates a method for digital content access control from the perspective of a digital content provisioner in accordance with one embodiment of the present invention.

Turning now to FIG. 39, a flow diagram that illustrates a method for digital content access control from the perspective of a digital content provisioner in accordance with one embodiment of the present invention is presented. FIG. 39 corresponds with FIGS. 15 and 16. At 3900, a request for access to digital content is received. At 3905, a determination is made regarding whether the user that issued the request is authorized to access the digital content. The result of this determination is checked at 3910. If the requested access is unauthorized, an exception is indicated at 3915. If the requested access is authorized, at 3920 a deactivated token is sent for use in accessing digital content stored by a content repository. At 3925, a determination is made regarding whether pool synchronization is enabled. If enabled, pool synchronization is performed at 3930.

Figure 40:
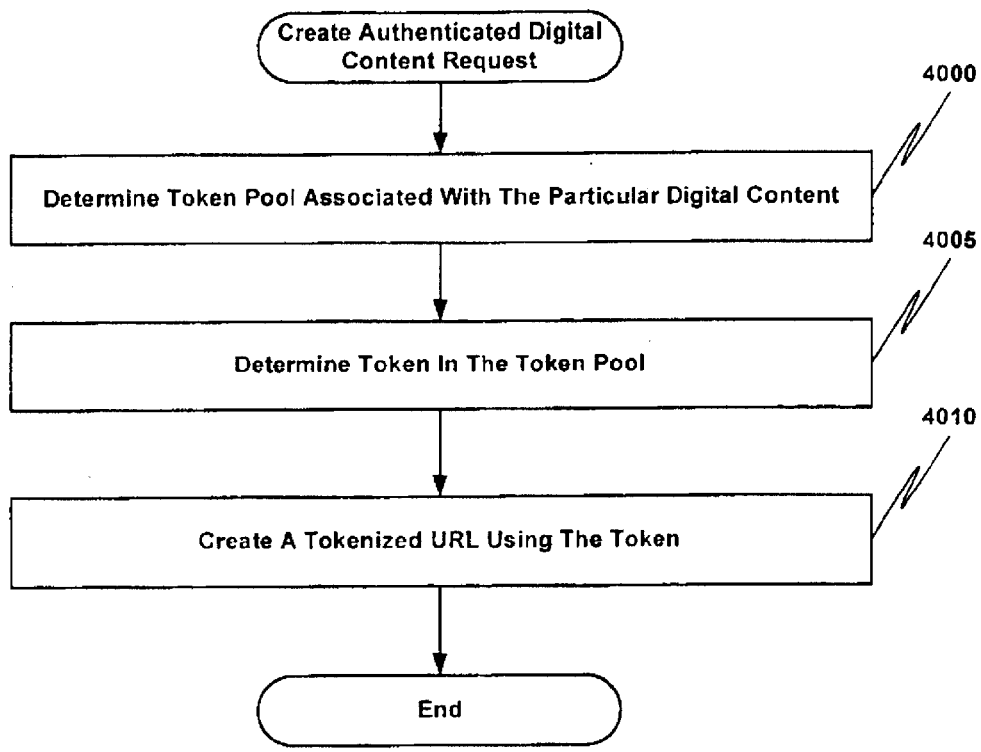
FIG. 40 is a flow diagram that illustrates a method for creating an authenticated digital content request in accordance with one embodiment of the present invention.

Turning now to FIG. 40, a flow diagram that illustrates a method for creating an authenticated digital content request in accordance with one embodiment of the present invention is presented. FIG. 40 provides more detail for reference numeral 3820 of FIG. 38. At 4000, the token pool associated with the particular digital content is determined. At 4005, an unallocated token in the token pool is determined. At 4010, a tokenized URL is created based at least in part on the token.

Figure 41:
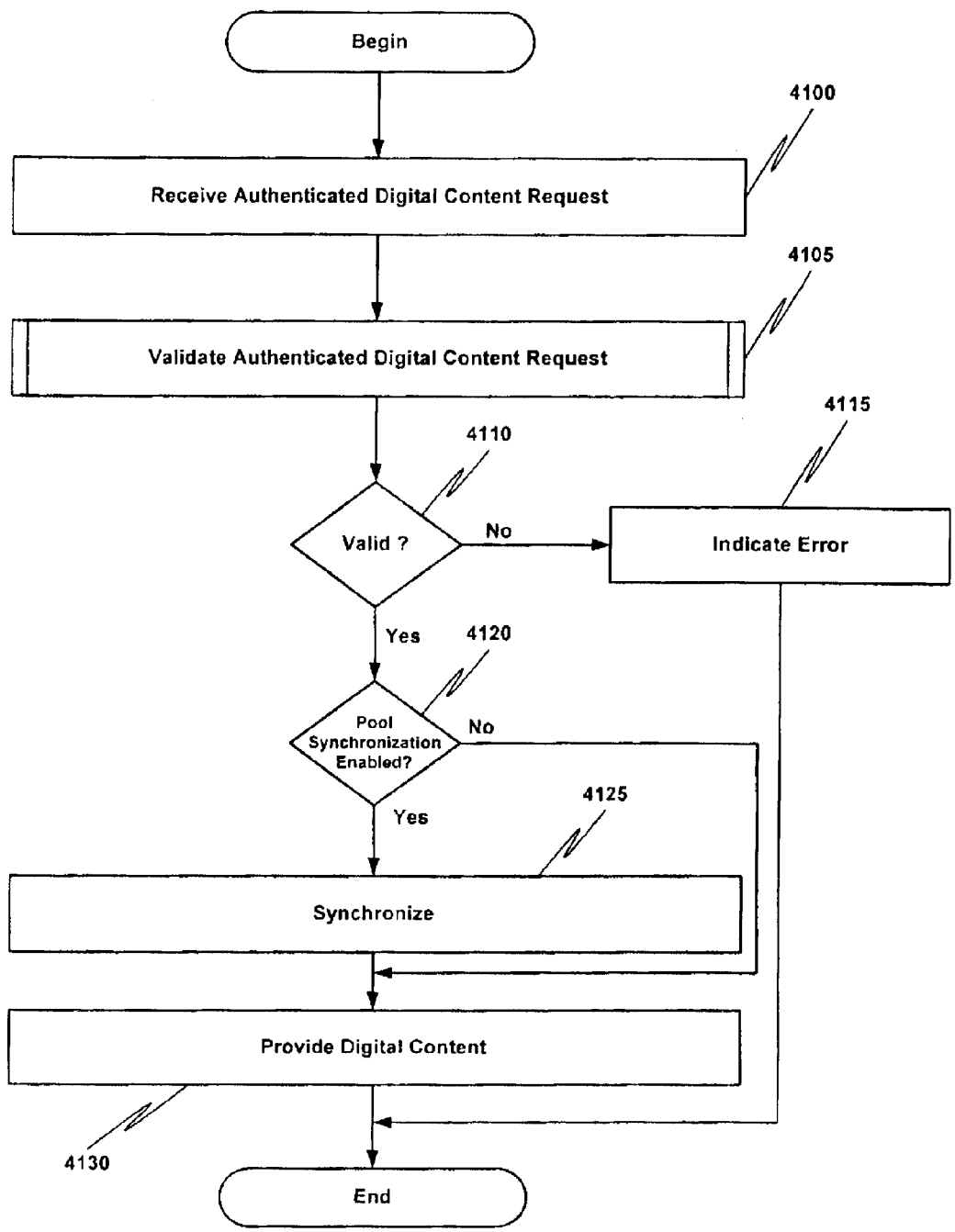
FIG. 41 is a flow diagram that illustrates a method for digital content access control from the perspective of a digital content repository in accordance with one embodiment of the present invention.

Turning now to FIG. 41, a flow diagram that illustrates a method for digital content access control from the perspective of a digital content repository in accordance with one embodiment of the present invention is presented. At 4100, an authenticated digital content request is received. At 4105, the authenticated digital content request is validated. At 4110, a determination is made regarding whether the authenticated digital content request is valid. If the authenticated digital content request is invalid, an exception is indicated at 4115. If the authenticated digital content request is valid, a determination is made regarding whether pool synchronization is enabled at 4120. If enabled, pool synchronization is performed at 4125. At 4130, the digital content associated with the digital content request is provided.

Figure 42:
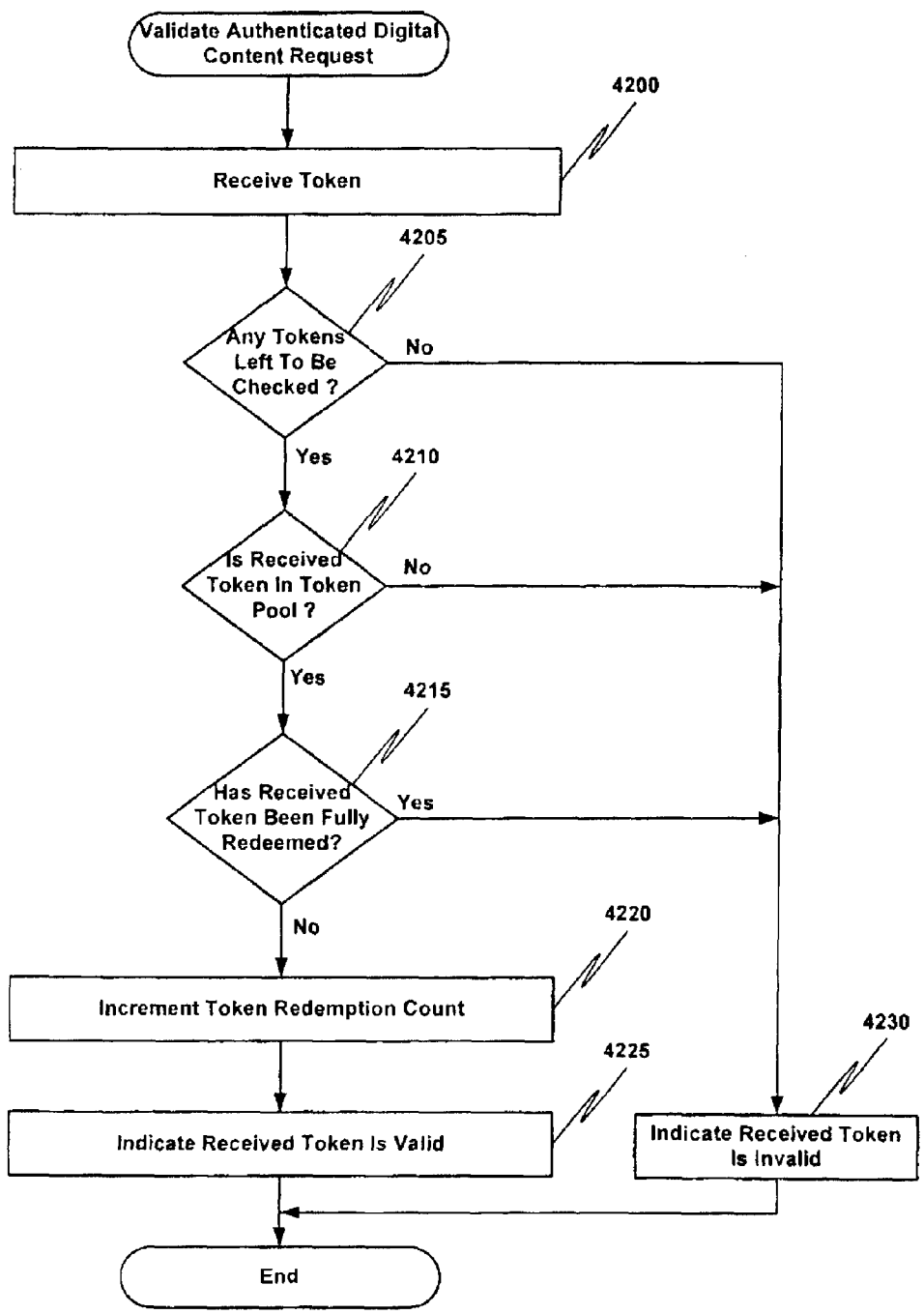
FIG. 42 is a flow diagram that illustrates a method for validating an authenticated digital content request using a pre-computed token pool comprising multi-use tokens in accordance with one embodiment of the present invention.
Figure 46:
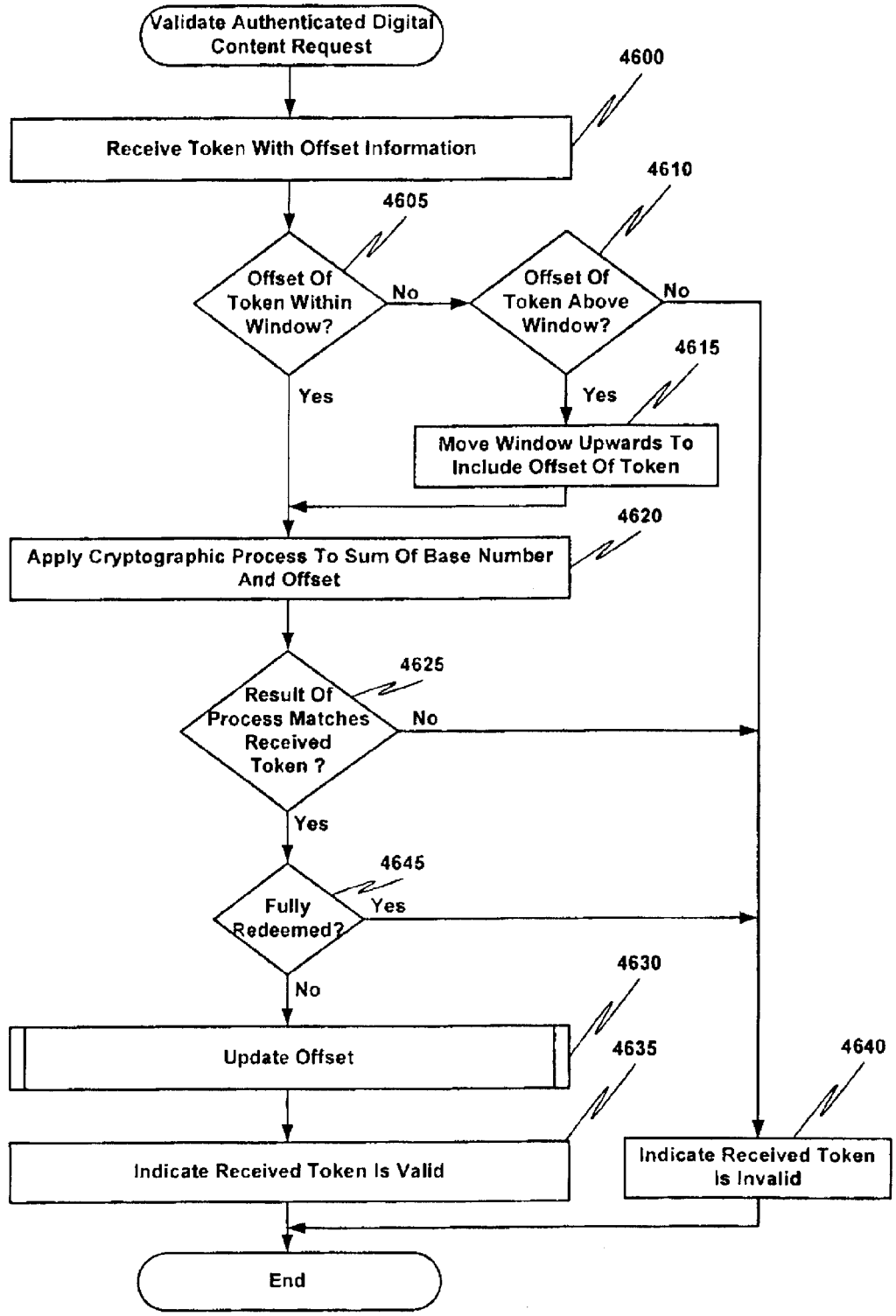
FIG. 46 is a flow diagram that illustrates a method for validating an authenticated digital content request by dynamically computing tokens using a sliding token offset window having a static size in accordance with one embodiment of the present invention.
Figure 47:
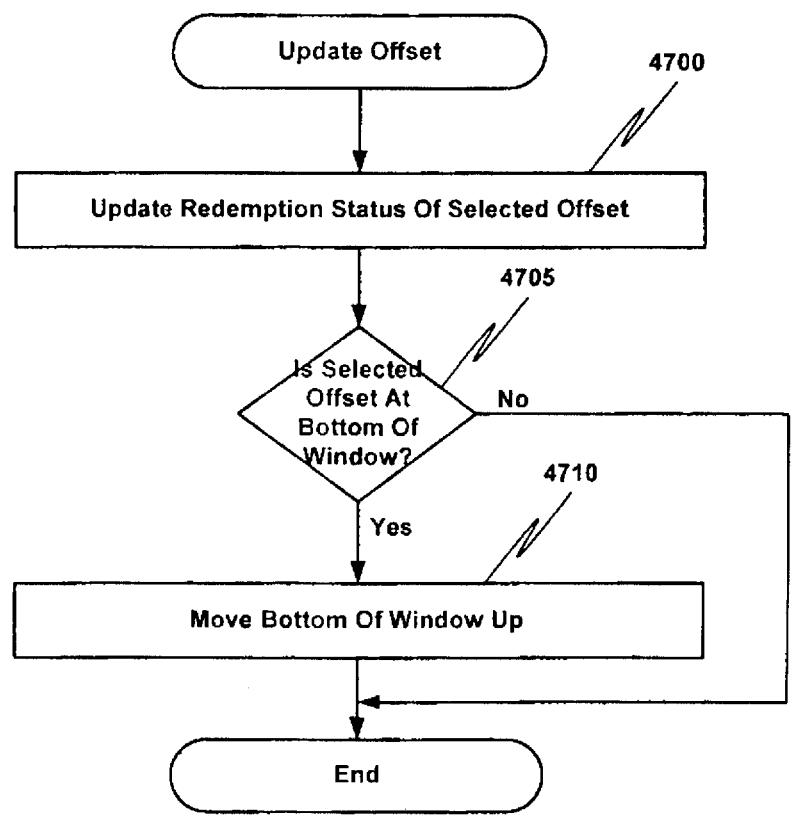
FIG. 47 is a flow diagram that illustrates a method for updating an offset in accordance with one embodiment of the present invention.
Figure 48:
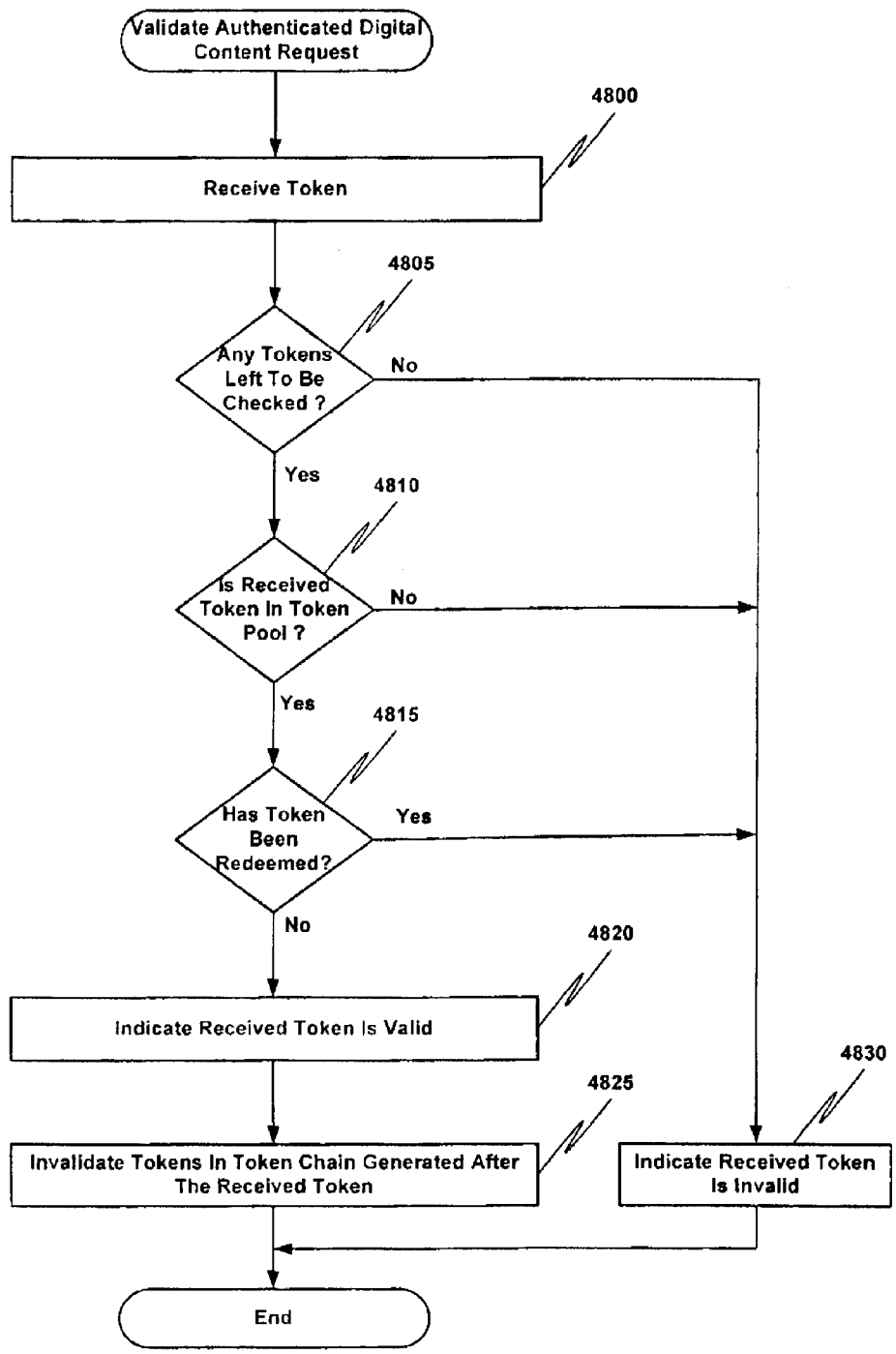
FIG. 48 is a flow diagram that illustrates a method for validating an authenticated digital content request using a pre-computed token pool comprising single-use tokens computed using a cryptographic one-way function in accordance with one embodiment of the present invention.
Figure 49:
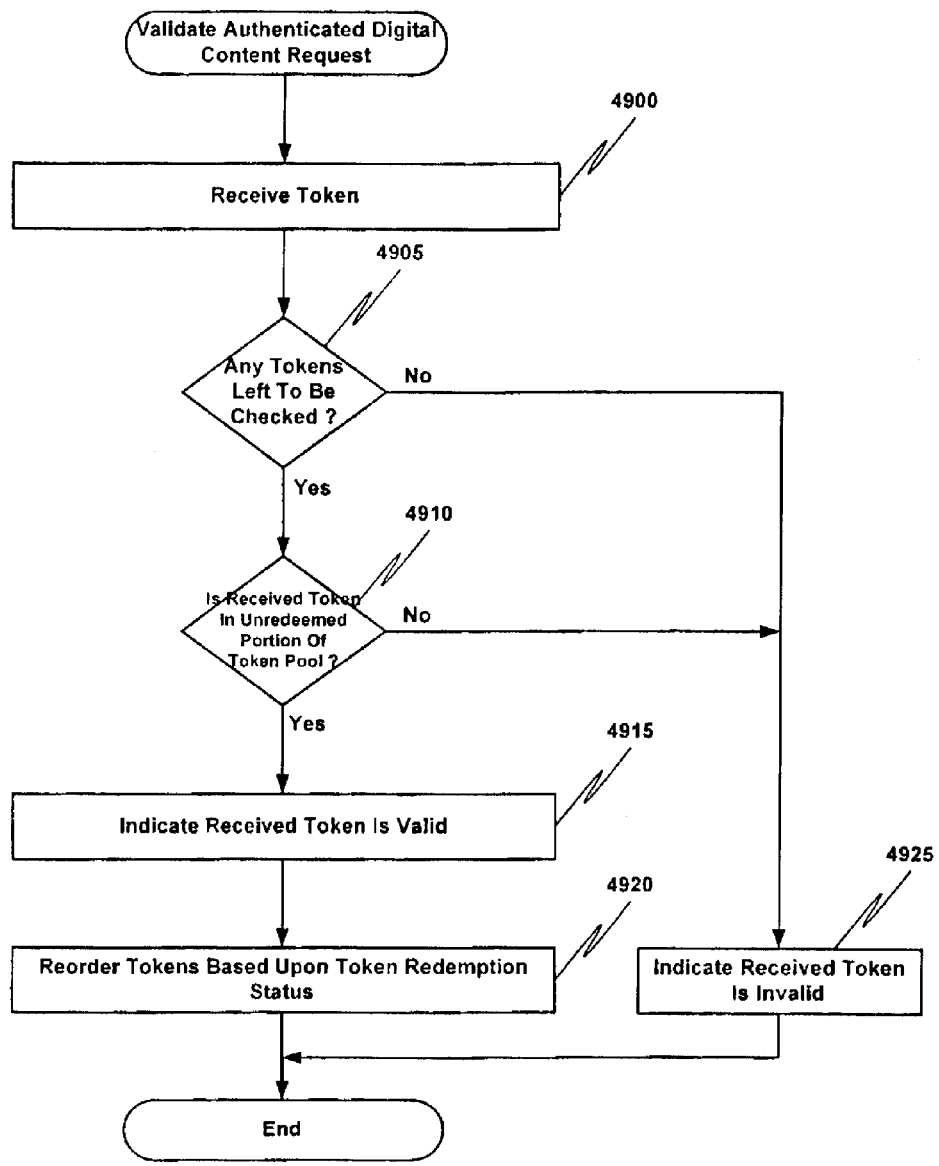
FIG. 49 is a flow diagram that illustrates a method for validating an authenticated digital content request using a pre-computed token pool comprising single-use tokens computed using a cryptographic one-way function and ordered according to token redemption status in accordance with one embodiment of the present invention.
Figure 50:
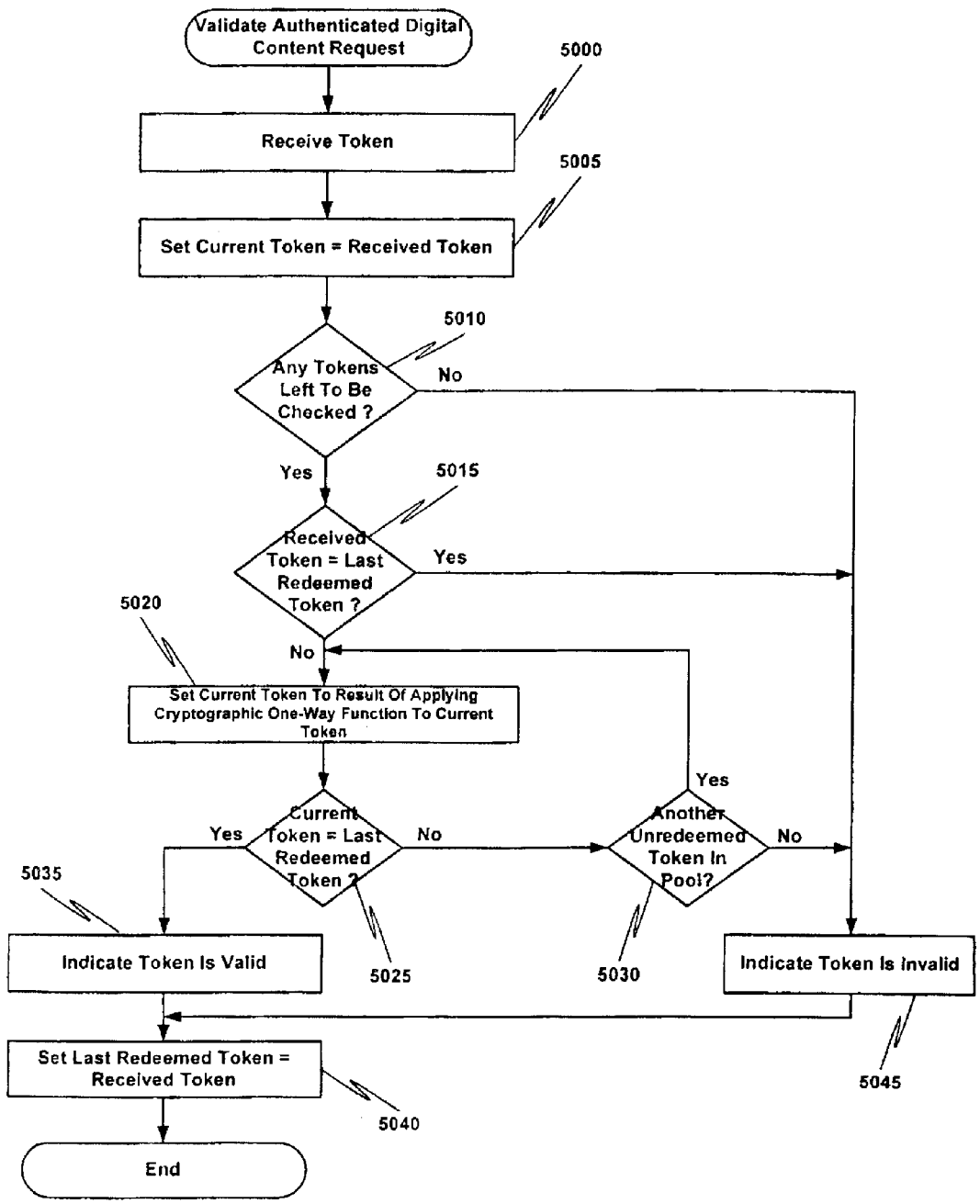
FIG. 50 is a flow diagram that illustrates a method for validating an authenticated digital content request by dynamically computing single-use tokens using a cryptographic one-way function in accordance with one embodiment of the present invention.

FIGS. 42-50 illustrate validating an authenticated digital content request in accordance with embodiments of the present invention. FIGS. 42-50 provide more detail for reference numeral 4105 of FIG. 41. FIG. 42 illustrates validating an authenticated digital content request using a pre-computed token pool comprising multi-use tokens. FIGS. 43-47 illustrate validating an authenticated digital content request by dynamically computing tokens using a sliding token offset window. FIG. 48 illustrates validating an authenticated digital content request using a pre-computed token pool comprising single-use tokens computed using a cryptographic one-way function. FIG. 49 illustrates validating an authenticated digital content request using a pre-computed token pool comprising single-use tokens computed using a cryptographic one-way function and ordered according to token redemption status. FIG. 50 illustrates validating an authenticated digital content request by dynamically computing single-use tokens using a cryptographic one-way function. These validation methods are explained in more detail below.

Turning now to FIG. 42, a flow diagram that illustrates a method for validating an authenticated digital content request using a pre-computed token pool comprising multi-use tokens in accordance with one embodiment of the present invention is presented. At 4200, a token is received. At 4205, a determination is made regarding whether there are any unredeemed or partially redeemed tokens left in the token pool. If there is at least one unredeemed or partially redeemed token remaining in the token pool, at 4210 a determination is made regarding whether the received token is in the token pool. If the received token is in the token pool, at 4215 a determination is made regarding whether the received token has been fully redeemed. If the received token is fully redeemed at 4215, or if the received token is not in the token pool at 4210, or if there are no unredeemed tokens left to check at 4205, at 4230 an indication that the received token is invalid is made. If at 4215 the received token has not been fully redeemed, a token redemption count associated with the received token is incremented at 4220, and an indication that the received token is valid is made at 4225.

Figure 43:
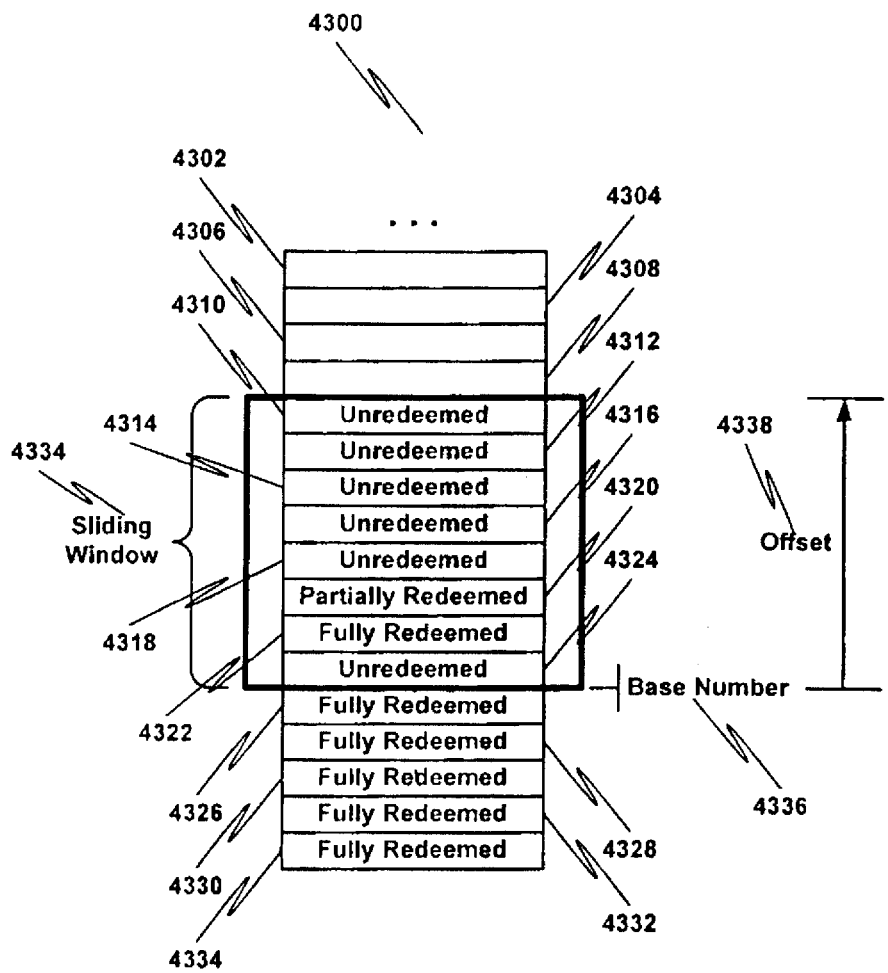
FIG. 43 is a block diagram that illustrates a sliding token offset window for use in dynamic token computation in accordance with one embodiment of the present invention.
Figure 44:
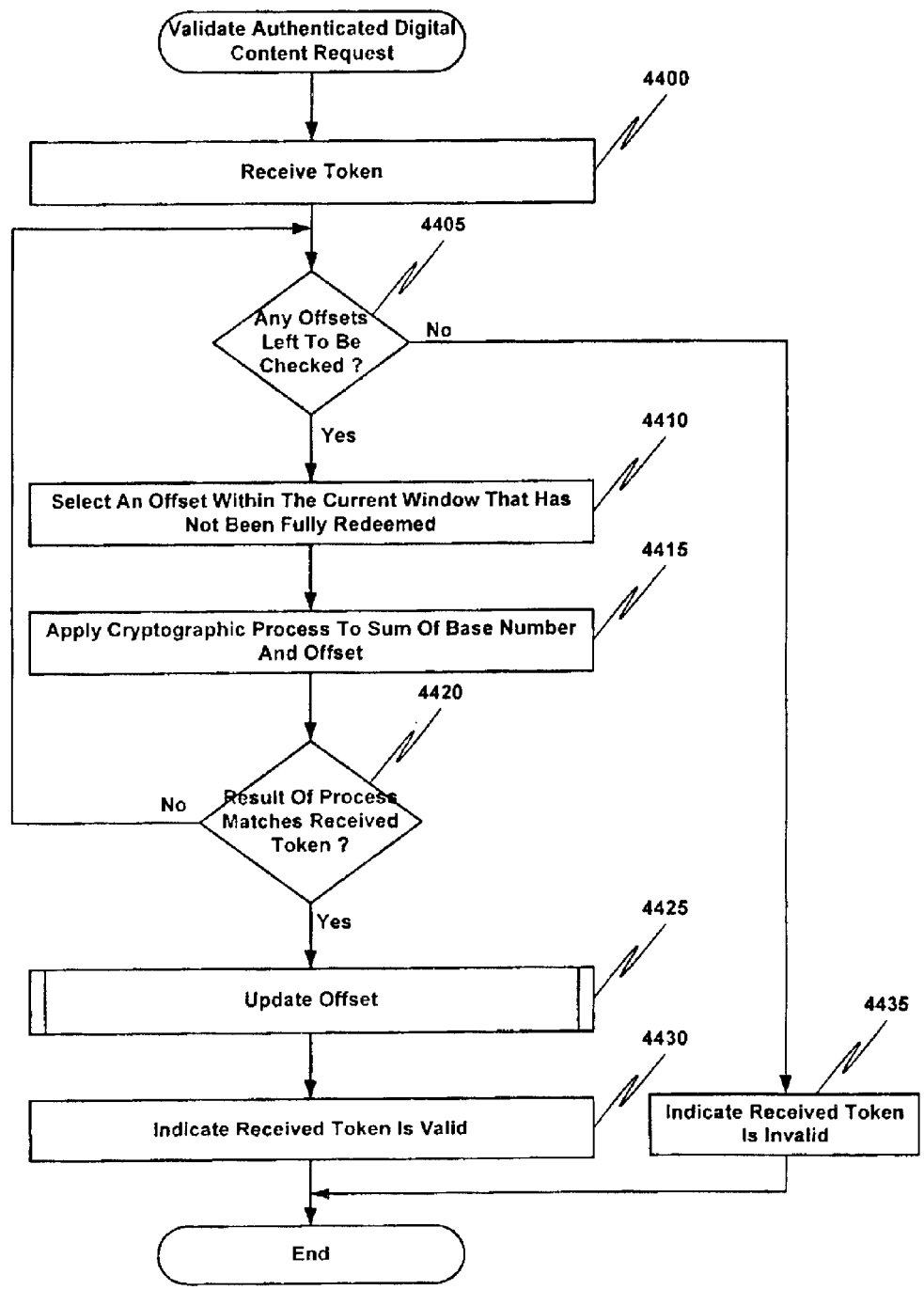
FIG. 44 is a flow diagram that illustrates a method for validating an authenticated digital content request by dynamically computing tokens using a sliding token offset window in accordance with one embodiment of the present invention.
Figure 45:
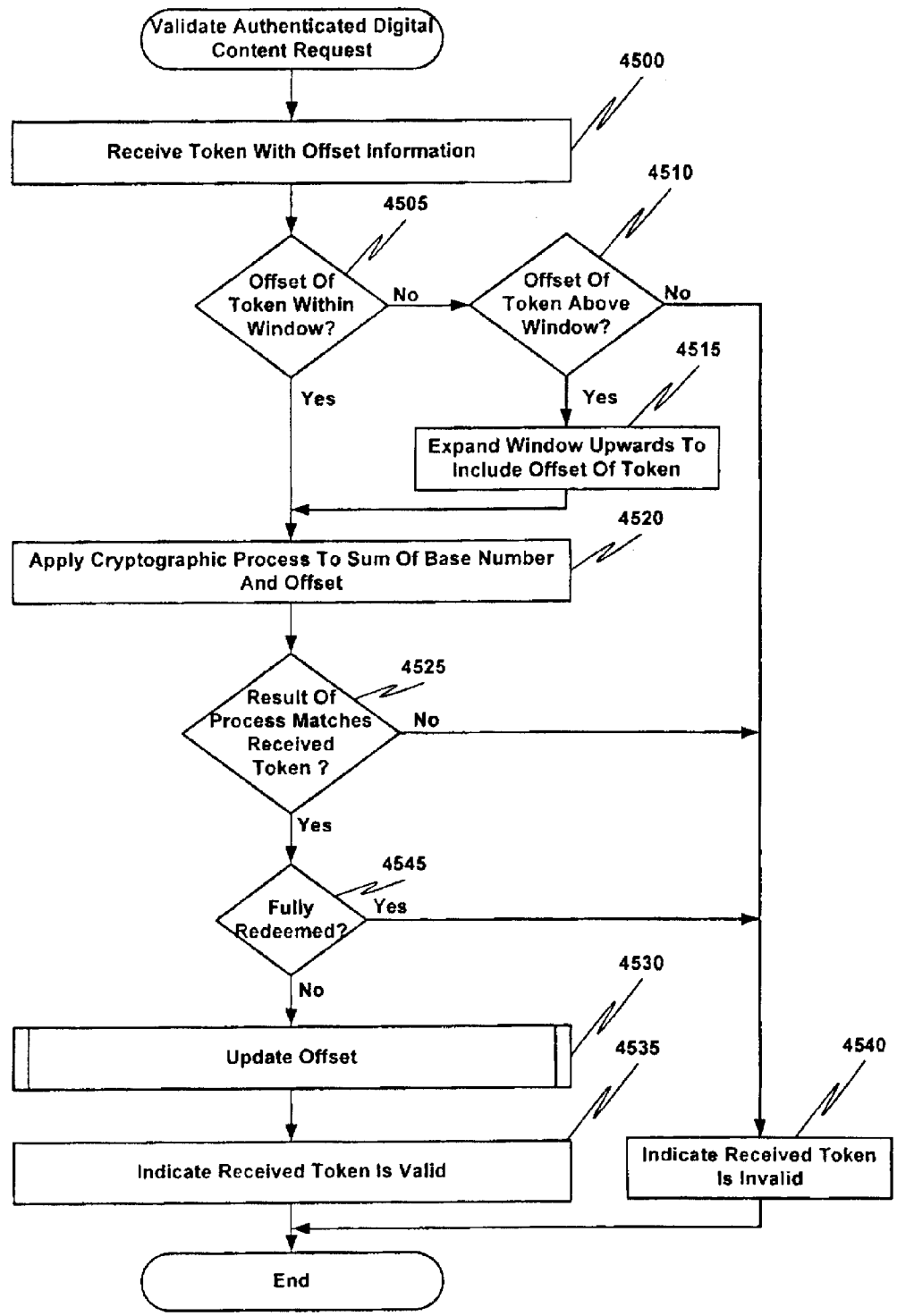
FIG. 45 is a flow diagram that illustrates a method for validating an authenticated digital content request by dynamically computing tokens using a sliding token offset window having a dynamic size in accordance with one embodiment of the present invention.

FIGS. 43-46 illustrate using a sliding token offset window for dynamic token computation in accordance with one embodiment of the present invention. FIG. 43 depicts a sliding token offset window, and FIG. 44 illustrates a method for using a sliding token offset window. FIG. 45 illustrates a method for validating an authenticated digital content request by dynamically computing tokens using a sliding token offset window having a dynamic size. FIG. 46 illustrates a method for validating an authenticated digital content request by dynamically computing tokens using a sliding token offset window having a static size.

According to embodiments of the present invention, a window management policy determines the criteria for moving the bottom of the window and the top of the window. The window may be moved as part of a token synchronization process. The window may also be moved as part of a token validation process.

According to embodiments of the present invention, the criteria for moving the bottom or top of a window may be based at least in part on the amount of time since the window was last moved.

Turning now to FIG. 43, a block diagram that illustrates a sliding token offset window for use in dynamic token computation in accordance with one embodiment of the present invention is presented. As shown in FIG. 43, data structure 4300 comprises a list of offset entries 4302-4334. Sliding window 4334 comprises a predetermined number of offset entries. Offset entries within window 4334 are identified by a base number 4336 and an offset 4338 from the base number. The offsets for entries 4324, 4322, 4320, 4318, 4316, 4314, 4312 and 4310 are 0-7, respectively. According to one embodiment of the present invention, the ordinal number of an identifier in a series comprises the sum of an offset 4338 and a base number 4336. Similarly, the offset 4338 comprises the ordinal number of the identifier in a series, minus the base number 4336.

Still referring to FIG. 43, an offset entry is associated with an offset redemption status. According to one embodiment of the present invention, a token may be redeemed a predetermined number of times. In this case, the possible offset redemption status values comprise an "unredeemed" status, a "partially redeemed" status and a "fully redeemed" status. According to another embodiment of the present invention, a token may be redeemed once. In this case, the possible token redemption status values comprise a "fully redeemed" status and a "not fully redeemed" status. An offset is fully redeemed if a token based at least in part on the offset has been redeemed a predetermined number of times. An offset is not fully redeemed if a token based at least in part on the offset has been redeemed less than the predetermined number of times. An offset is partially redeemed if a token based at least in part on the offset has been redeemed a number of times that is greater than zero but less than the predetermined number of times.

According to embodiments of the present invention, data structure 4300 is used to determine whether a received token has been fully redeemed. The determination comprises summing the base number 4336 and an offset within sliding window 4334, where the offset has an offset redemption status of "unredeemed" or "partially redeemed". The sum is used as an input to a cryptographic process that computes a token. If the result of the cryptographic process matches the received token, a valid token is indicated and the offset redemption status of the offset is updated to account for the redemption. This process is explained in more detail below with reference to FIG. 44.

Turning now to FIG. 44, a flow diagram that illustrates a method for validating an authenticated digital content request by dynamically computing tokens using a sliding token offset window in accordance with one embodiment of the present invention is presented. At 4400, a token is received. At 4405, a determination is made regarding whether there are any unredeemed or partially redeemed offsets within an offset window. If there is at least one unredeemed or partially redeemed offset within the offset window, at 4410 an offset within the window that has not been fully redeemed is selected. At 4415, a cryptographic process is applied to the sum of the base number and the selected offset. At 4420, a determination is made regarding whether the result of the cryptographic process matches the received token. If there is no match, another offset is selected beginning at 4405. If there is a match, the offset redemption status of the selected offset is updated at 4425 to account for the redemption and at 4430, an indication that the received token is valid is made. If none of the results of applying the cryptographic process to the sum of the base number and each unredeemed or partially redeemed offsets match the received token, an indication that the received token is invalid is made at 4435.

FIGS. 45 and 46 are similar to FIG. 44, except that the received token in FIGS. 45 and 46 comprises token offset information, as illustrated above with respect to FIGS. 18D and 18E. Additionally, the windows in FIGS. 45 and 46 are modified when the offset is above the token window. In FIG. 45, the window is expanded upwards to include the offset. In FIG. 46, the window is moved upwards to include the offset.

Turning now to FIG. 45, a flow diagram that illustrates a method for validating an authenticated digital content request by dynamically computing tokens using a sliding token offset window having a dynamic size in accordance with one embodiment of the present invention is presented. At 4500, a token comprising token offset information is received. At 4505, a determination is made regarding whether the offset is within a token offset window. If the offset is not within the token offset window, at 4510 a determination is made regarding whether the offset is above the window. If the token is not above the window, an indication that the token is invalid is made at 4540. If the offset is above the window, at 4515 the window is expanded upwards to include the offset. At 4520, a cryptographic process is applied to the sum of the base number and the offset. At 4525, a determination is made regarding whether the result of the cryptographic process matches the received token. If there is no match, an indication that the token is invalid is made at 4540. If there is a match, at 4545 a determination is made regarding whether the token is fully redeemed. If the token is fully redeemed, an indication that the token is invalid is made at 4540. If the token is not fully redeemed, the offset redemption status of the offset is updated at 4530 to account for the redemption and at 4535, an indication that the received token is valid is made.

Turning now to FIG. 46, a flow diagram that illustrates a method for validating an authenticated digital content request by dynamically computing tokens using a sliding token offset window having a static size in accordance with one embodiment of the present invention is presented. FIG. 46 is similar to FIG. 45, except that the window is moved upwards to include the offset (4615) when the offset is above the window in FIG. 46, whereas the window is expanded upwards to include the offset (4515) when the offset is above the window in FIG. 45.

Turning now to FIG. 47, a flow diagram that illustrates a method for updating an offset in accordance with one embodiment of the present invention is presented. FIG. 47 provides more detail for reference numerals 4425, 4530 and 4630 of FIGS. 44, 45 and 46, respectively. At 4700, the redemption status of the offset is updated. At 4705, a determination is made regarding whether the offset is at the bottom of the window. If the offset is at the bottom of the window, the window is moved upwards. According to one embodiment of the present invention, the window is moved up one position. According to another embodiment of the present invention, the window is moved up until the bottom of the window comprises an unredeemed or partially redeemed offset.

Turning now to FIG. 48, a flow diagram that illustrates a method for validating an authenticated digital content request using a pre-computed token pool comprising single-use tokens computed using a cryptographic one-way function in accordance with one embodiment of the present invention is presented. At 4800, a token is received. At 4805, a determination is made regarding whether there are any unredeemed tokens left in the token pool. If there is at least one unredeemed token remaining in the token pool, at 4810 a determination is made regarding whether the received token is in the token pool. If the received token is in the token pool, at 4815 a determination is made regarding whether the token has been redeemed. If the token has not been redeemed, at 4820 an indication is made that the token is valid. At 4825, tokens in the token chain that were generated after the received token are invalidated. If there are no tokens left to check at 4805, or if the received token is not in the token pool at 4810, or if the received token has been redeemed (4815), an indication that the token is invalid is made at 4830.

Turning now to FIG. 49, a flow diagram that illustrates a method for validating an authenticated digital content request using a pre-computed token pool comprising single-use tokens computed using a cryptographic one-way function and ordered according to token redemption status in accordance with one embodiment of the present invention is presented. At 4900, a token is received. At 4905, a determination is made regarding whether there are any unredeemed tokens left in the token pool. If there is at least one unredeemed token remaining in the token pool, at 4910 a determination is made regarding whether the received token is in a portion of the token pool comprising redeemed tokens. If the received token has not been redeemed, at 4915 an indication that the received token is valid is made. At 4920, the tokens of the token pool are reordered based upon their token redemption status. If there are no tokens left to check at 4905, or if the token has been redeemed (4910), an indication that the token is invalid is made at 4925.

Turning now to FIG. 50, a flow diagram that illustrates a method for validating an authenticated digital content request by dynamically computing single-use tokens using a cryptographic one-way function in accordance with one embodiment of the present invention is presented. At 5000, a token is received. At 5005, the current token is set to the received token. At 5010, a determination is made regarding whether there are any unredeemed tokens left in a token pool. If there is at least one unredeemed token remaining, at 5015 a determination is made regarding whether the received token matches the last redeemed token. If the received token does not match the last received token, at 5020 the current token is set to the result of applying a cryptographic one-way function to the current token. At 5025, a determination is made regarding whether the current token matches the last redeemed token. If the current token matches the last redeemed token, an indication that the token is valid is made at 5035 and the last redeemed token is set to the received token at 5040. If the current token does not match the last redeemed token at 5025, at 5030 a determination is made regarding whether there is another unredeemed token in the token pool. If there is another token in the token pool, the next token is checked beginning at 5020. If there are no more tokens in the token pool at 5030, or if the received token matches the last redeemed token at 5015, or if there are no tokens left to check at 5010, an indication that the token is invalid is made at 5045.

FIGS. 42, 44, 48, 49 and 50 include an initial determination regarding whether there are any tokens or offsets left to be checked (reference numerals 4205, 4405, 4805, 4905 and 5010, respectively). This determination may comprise checking a variable comprising this token information. Alternatively, the determination may comprise searching for one or more tokens or offsets that have not been fully redeemed.

Figure 51:
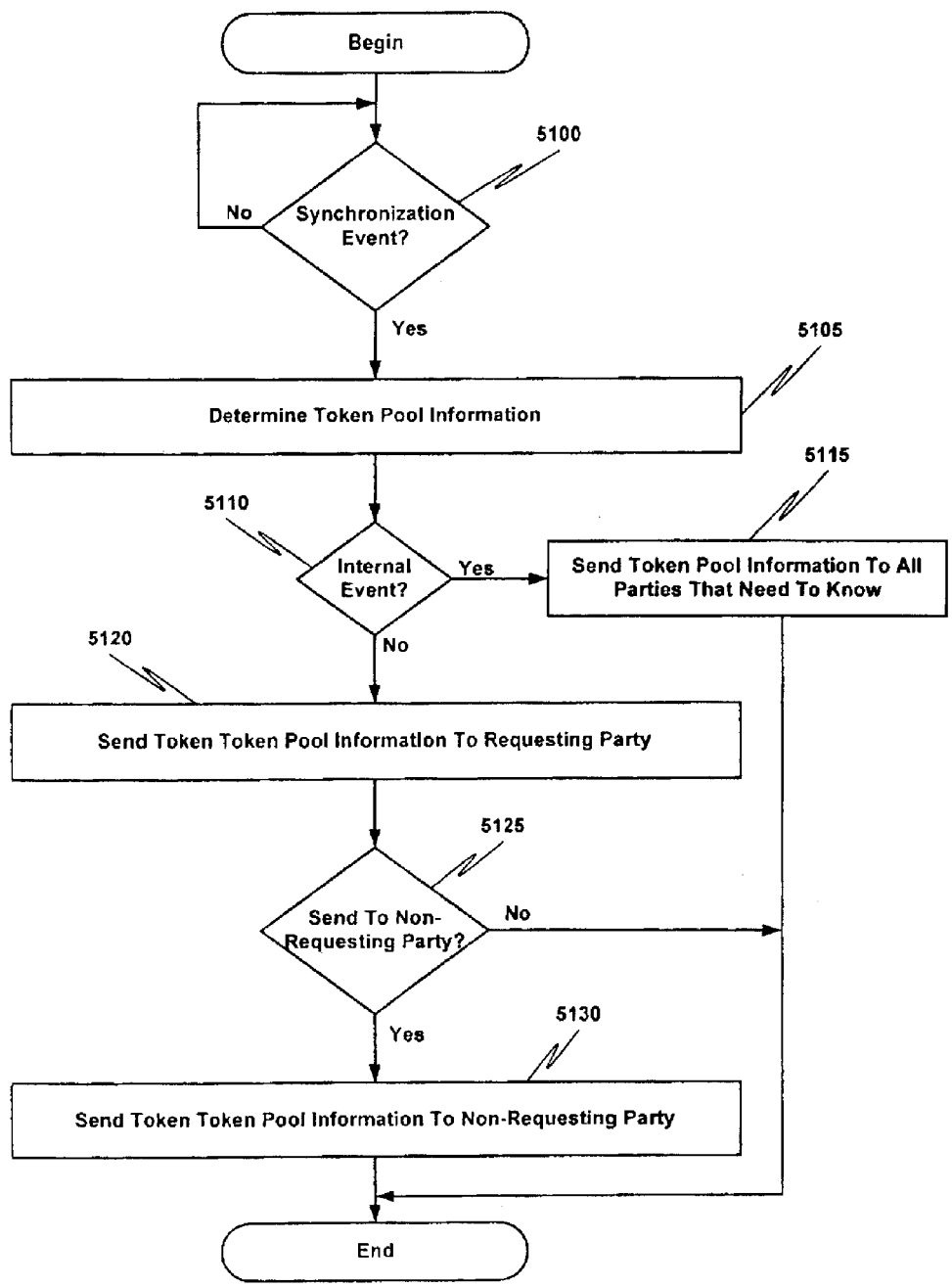
FIG. 51 is a flow diagram that illustrates a method for digital content access control from the perspective of a synchronizer in accordance with one embodiment of the present invention.

Turning now to FIG. 51, a flow diagram that illustrates a method for digital content access control from the perspective of a synchronizer in accordance with one embodiment of the present invention is presented. At 5100, a determination is made regarding whether a synchronization event has been received. According to one embodiment of the present invention, a synchronization event comprises the receipt of a synchronization request. According to another embodiment of the present invention, a synchronization event is generated at predetermined intervals. If a synchronization event has been received, at 5105 token pool information is determined. At 5110, a determination is made regarding whether the synchronization event is an internal event. A synchronization event is an internal event if it is triggered by the synchronizer. An exemplary internal event is a synchronization event triggered by the synchronizer at a predetermined interval. A synchronization event is an external event if it is triggered by an entity other than the synchronizer. If the synchronization event is an internal event, at 5115 token pool information is sent to all entities that need to know the information. If the synchronization event is not an internal event, at 5120 the token pool information is sent to a possible requesting party. The requesting party may be, by way of example, a content provisioner or a content repository. At 5125, a determination is made regarding whether the token pool information should be sent to a non-requesting party. If the token pool information should be sent to the non-requesting party, it is done at 5130.

According to one another embodiment of the present invention, token pool information determined in response to a synchronization request is sent to the requesting party. By way of example, upon receiving a synchronization request from a content provisioner, the synchronizer sends token pool information to the content provisioner.

According to another embodiment of the present invention, token pool information determined in response to a synchronization request is sent to both the requesting party and one or more non-requesting parties regardless of the identity of the requesting party. By way of example, upon receiving a synchronization request from a content provisioner, the synchronizer sends token pool information to both the content provisioner and a content repository.

FIGS. 52-63 illustrate use of a rights locker for digital content access control in accordance with embodiments of the present invention. The embodiments use a first content provisioner—content repository pair to control access to a rights locker that describes a user's access rights for digital content associated with the rights locker. A second content provisioner—content repository pair is used to control access to digital content associated with a rights locker. In a process referred to as "rights enrollment", a user enrolls with a rights locker provider to obtain an authenticated rights locker access request comprising a rights token for future use in accessing a rights locker that describes access rights for digital content associated with the rights locker. A rights locker provisioner authenticates a rights locker enrollment request comprising enrollment authentication data and a request for initializing a rights locker with rights to specified digital content to produce an authenticated rights locker access request including the rights token.

According to embodiments of the present invention, enrollment authentication data comprises rights locker access authentication data and rights content access authentication data. Rights locker access authentication data is used to determine what rights, if any, a user has to access a rights locker. Rights locker access authentication data may comprise, by way of example, a payment for use of the rights locker service. Rights content access authentication data is used to determine what rights, if any, a user has to digital content associated with a rights locker. Rights content access authentication data may comprise, by way of example, a payment for rights deposited in a rights locker. Both rights locker access authentication data and rights content access authentication data may comprise user identification information to validate a payment.

According to another embodiment of the present invention, a rights locker enrollment request also comprises a reenrollment key such as a password, user name or user handle, or the like, for use in identifying a user in future enrollment ("reenrollment") requests for the same rights locker, or to determine rights assigned to the user by a content repository. In other words, a first rights locker enrollment request for a particular rights locker may itself include data to supplement or replace the enrollment authentication data of the first rights locker enrollment request for subsequent rights locker enrollment requests for the same rights locker. Alternatively, reenrollment authentication data may be established while processing a rights locker enrollment request.

According to embodiments of the present invention, the type of authentication data and the authentication data content may be selected by a user, a rights locker provider, or both.

After rights enrollment, when a rights content repository receives an authenticated rights locker access request including the rights token, the content repository validates the authenticated rights locker access request and obtains an access token from a digital content provisioner. The access token is presented to a digital content repository which validates the access token and provides digital content associated with the access token.

Figure 52:
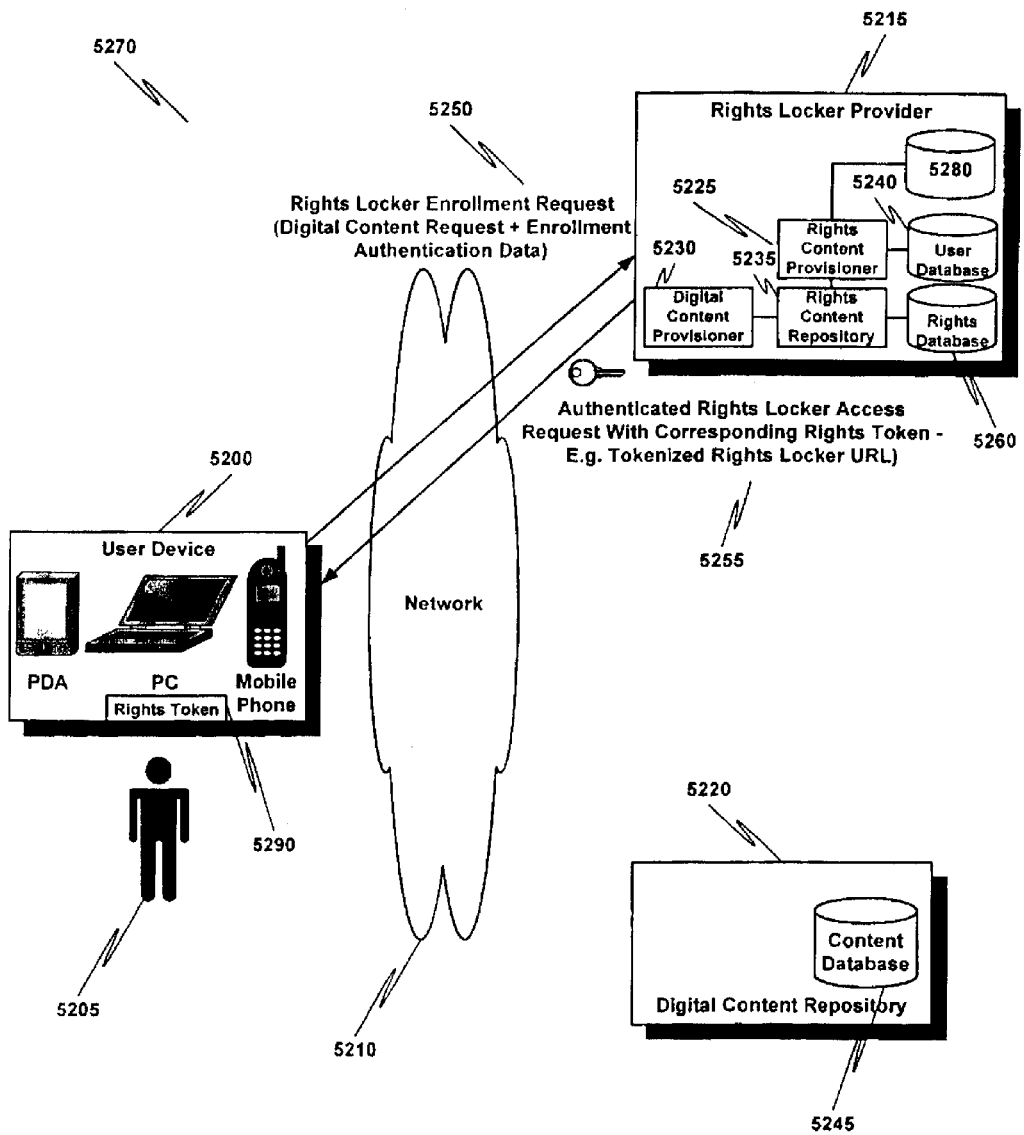
FIG. 52 is a block diagram that illustrates enrollment with a rights locker provider for digital content access control in accordance with one embodiment of the present invention.
Figure 53A:
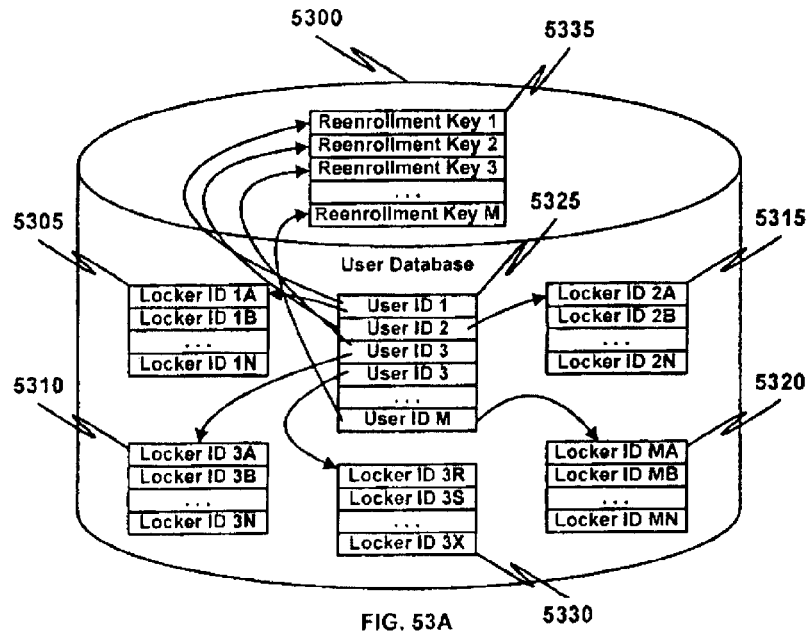
FIG. 53A is a block diagram that illustrates a user database in accordance with one embodiment of the present invention.
Figure 53B:
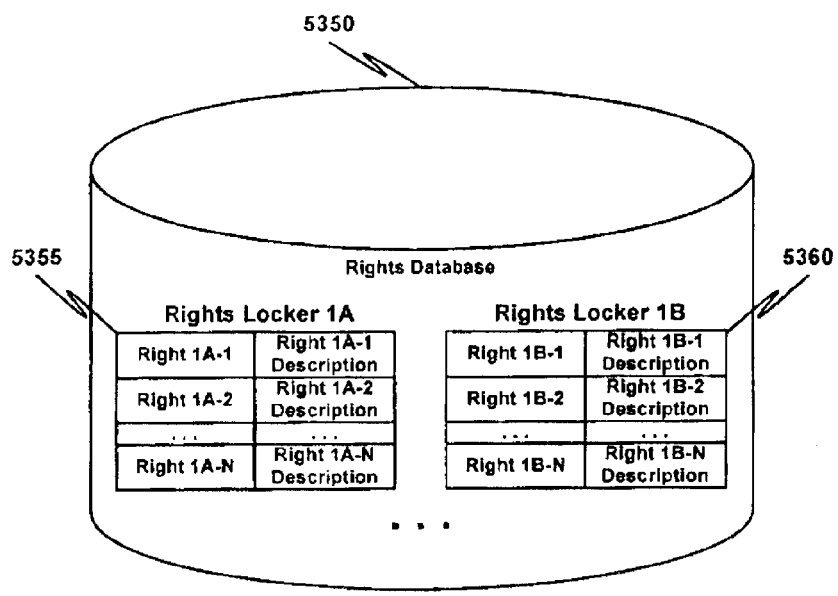
FIG. 53B is a block diagram that illustrates a rights database in accordance with one embodiment of the present invention.
Figure 54:
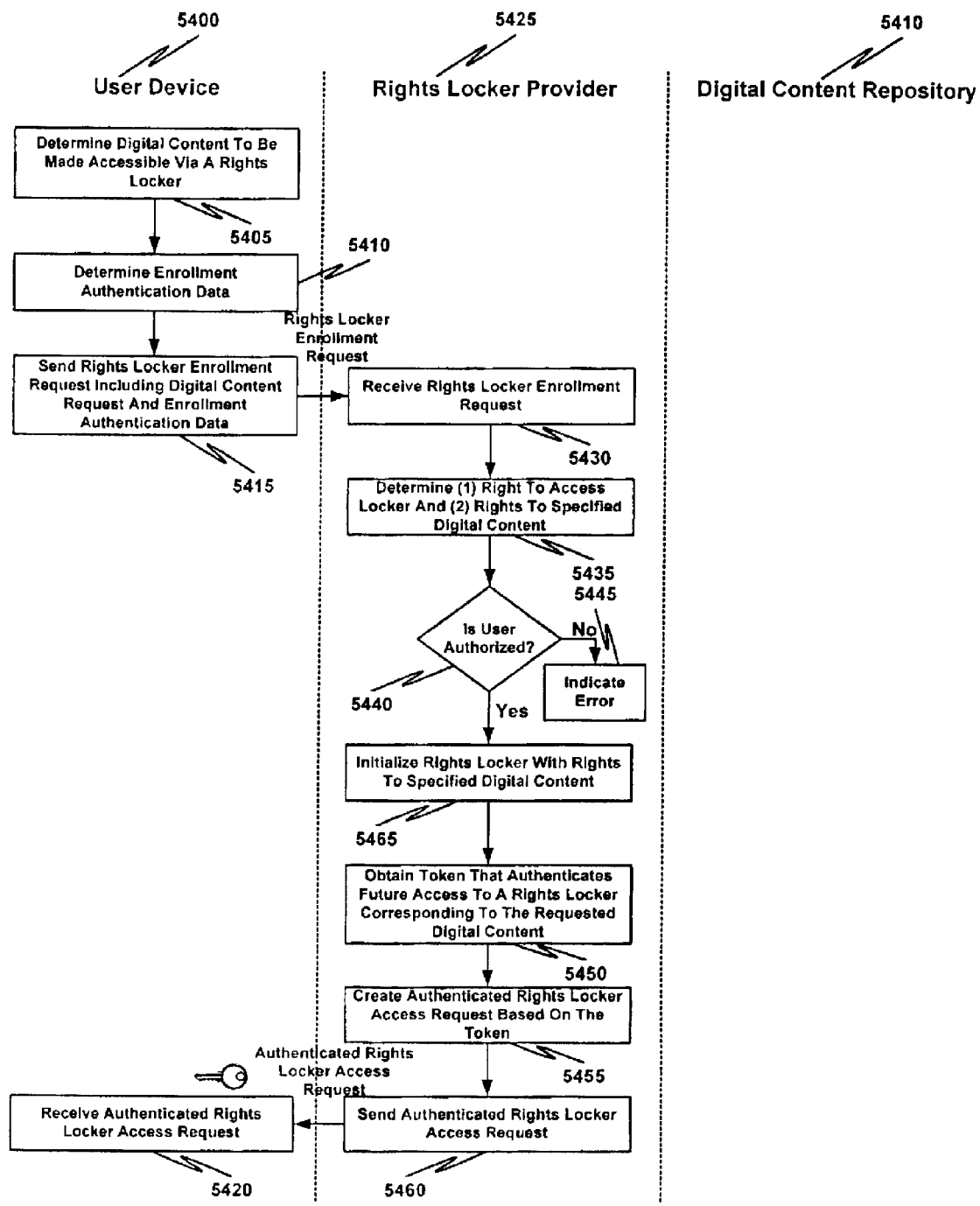
FIG. 54 is a flow diagram that illustrates a method for enrolling with a rights locker provider for digital content access control in accordance with one embodiment of the present invention.
Figure 55:
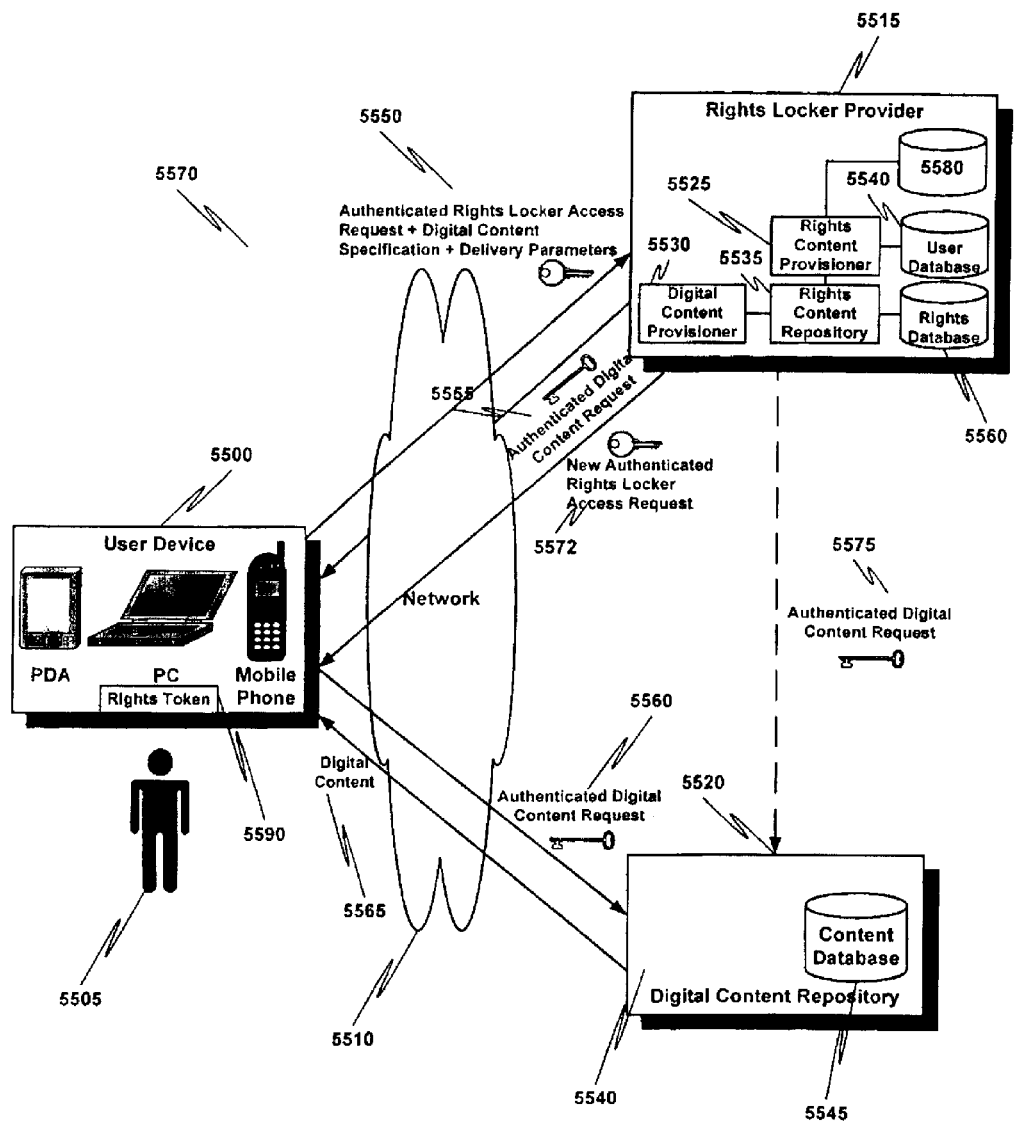
FIG. 55 is a block diagram that illustrates use of a rights locker for digital content access control in accordance with one embodiment of the present invention.
Figure 56:
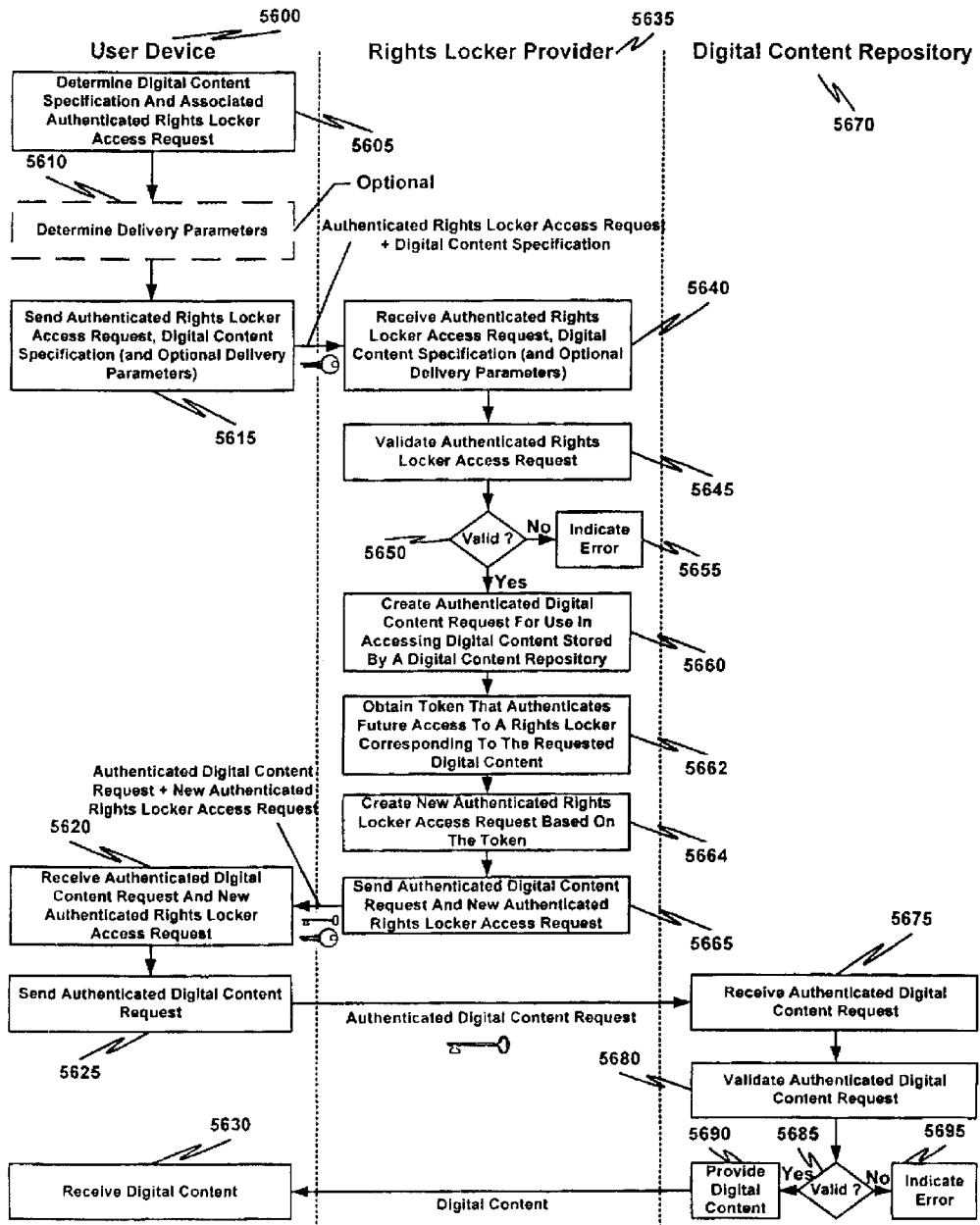
FIG. 56 is a flow diagram that illustrates a method for using a rights locker for digital content access control in accordance with one embodiment of the present invention.
Figure 57:
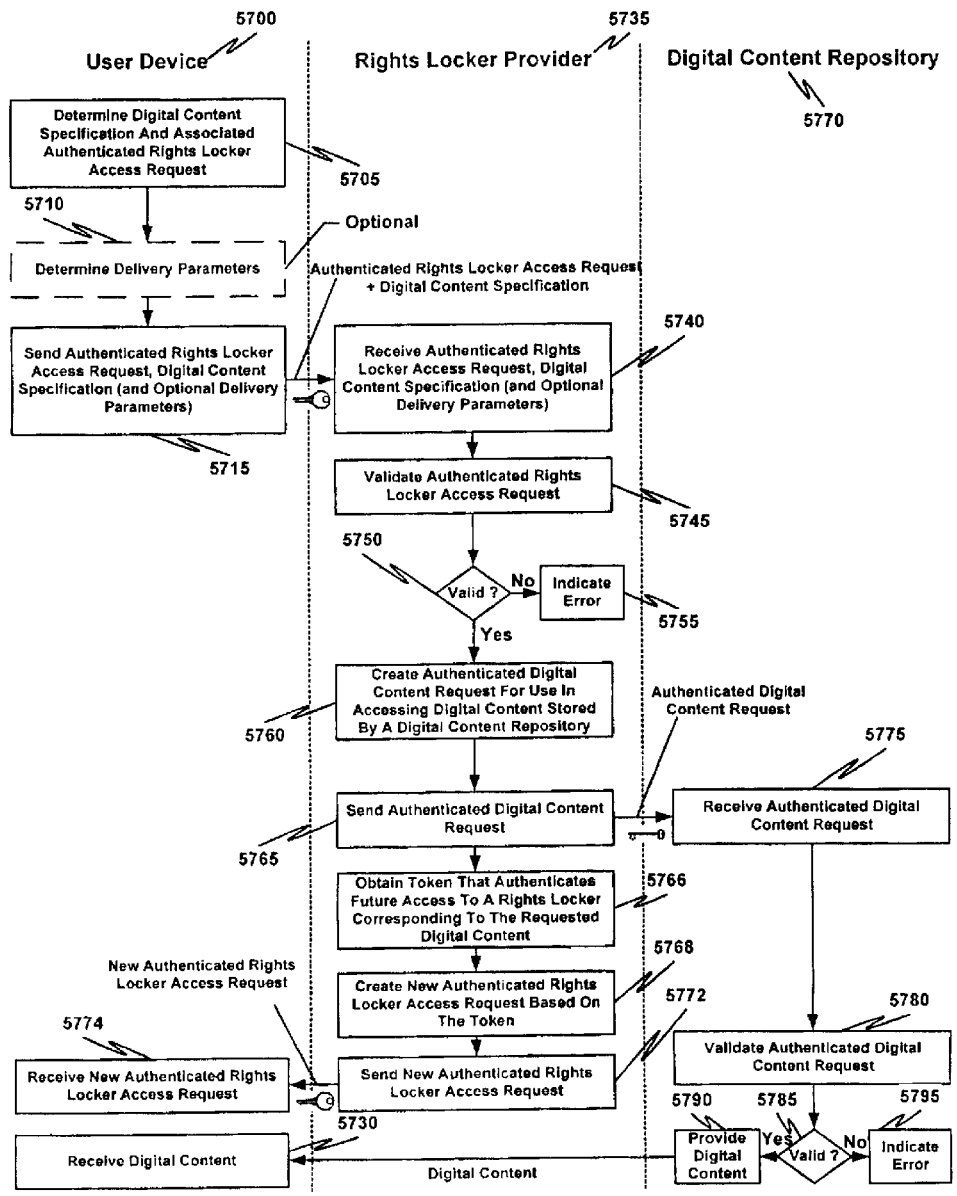
FIG. 57 is a flow diagram that illustrates a method for using a rights locker for digital content access control in accordance with one embodiment of the present invention.
Figure 58:
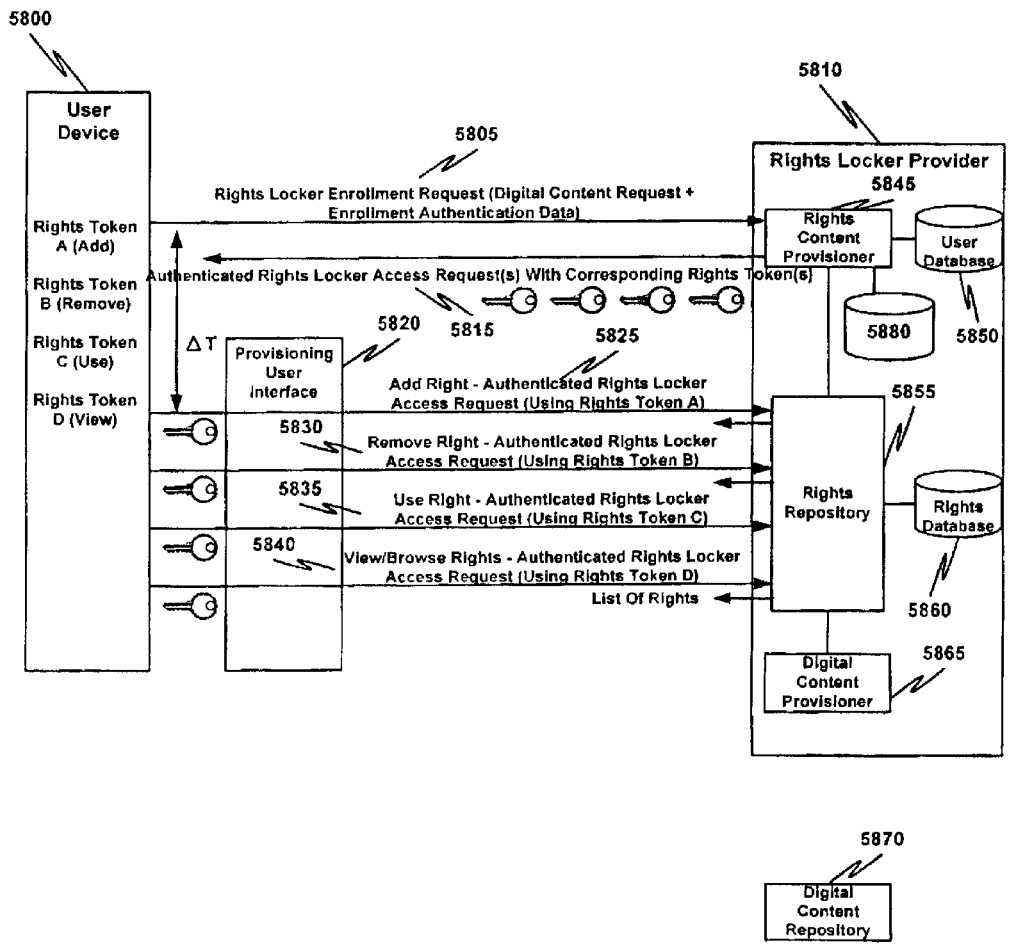
FIG. 58 is a block diagram that illustrates maintenance and use of rights in a rights locker for digital content access control in accordance with one embodiment of the present invention.
Figure 59:
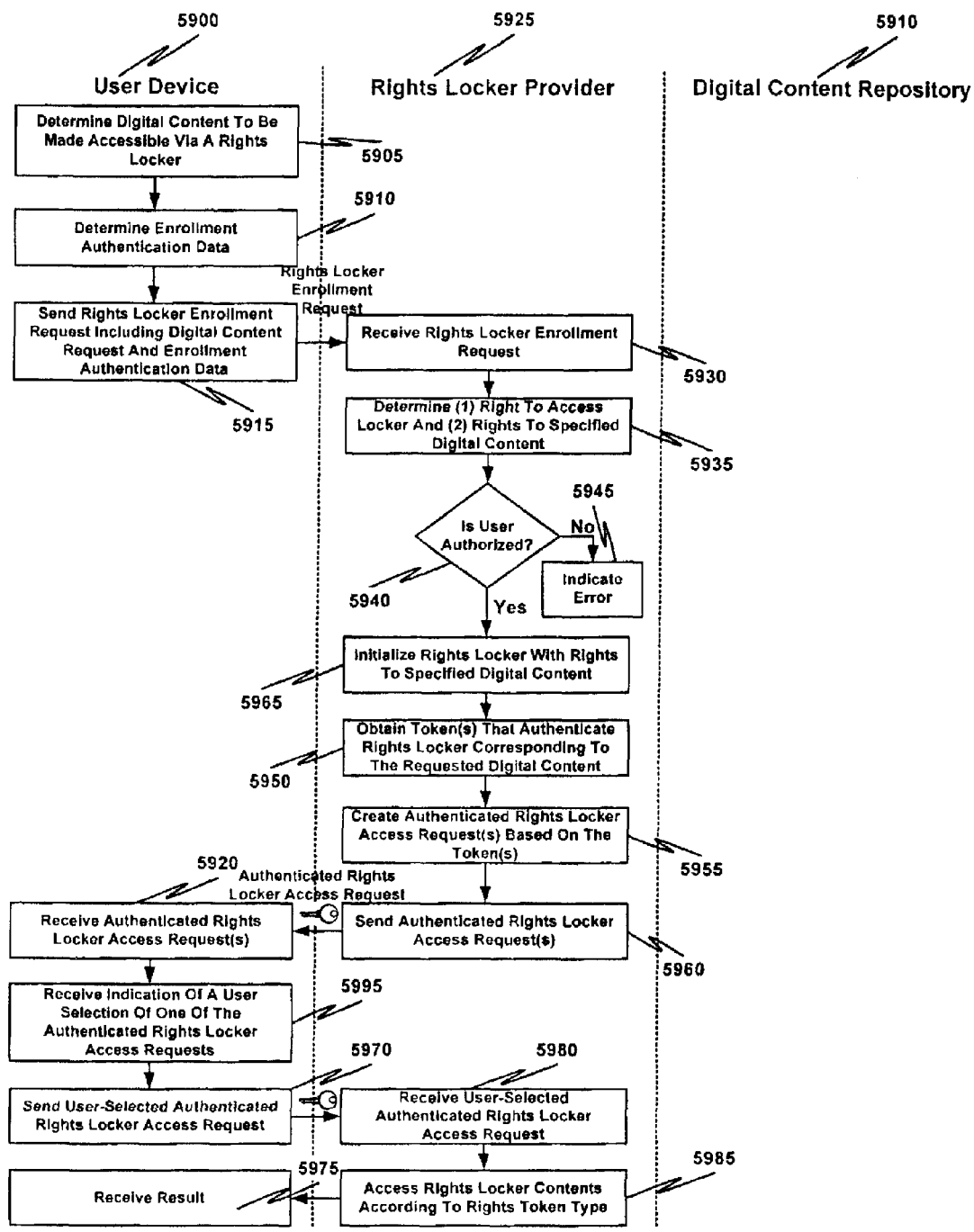
FIG. 59 is a flow diagram that illustrates a method for maintenance and use of rights in a rights locker for digital content access control in accordance with one embodiment of the present invention.
Figure 60:
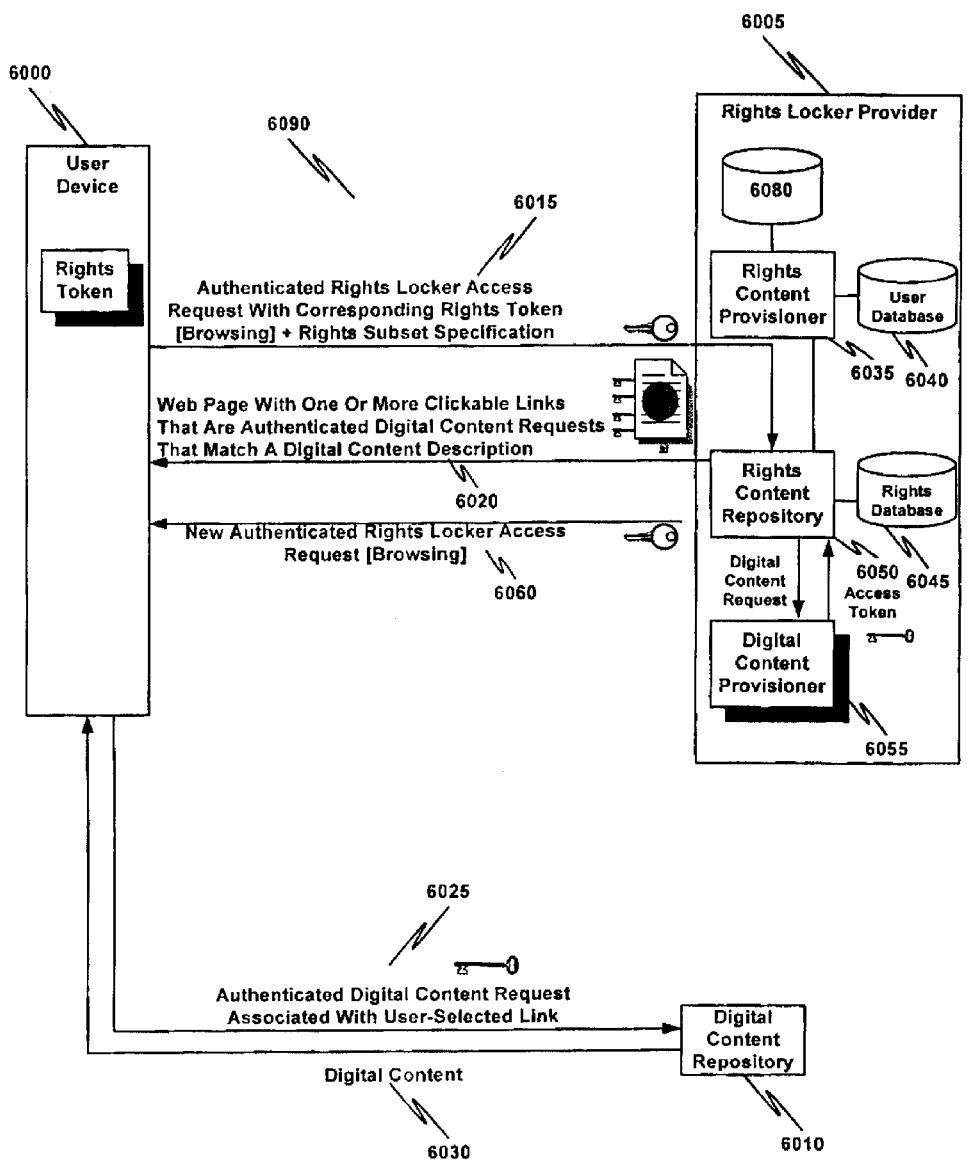
FIG. 60 is a block diagram that illustrates using authenticated digital content requests embedded in a Web page having clickable links for direct digital content access control in accordance with one embodiment of the present invention.
Figure 61:
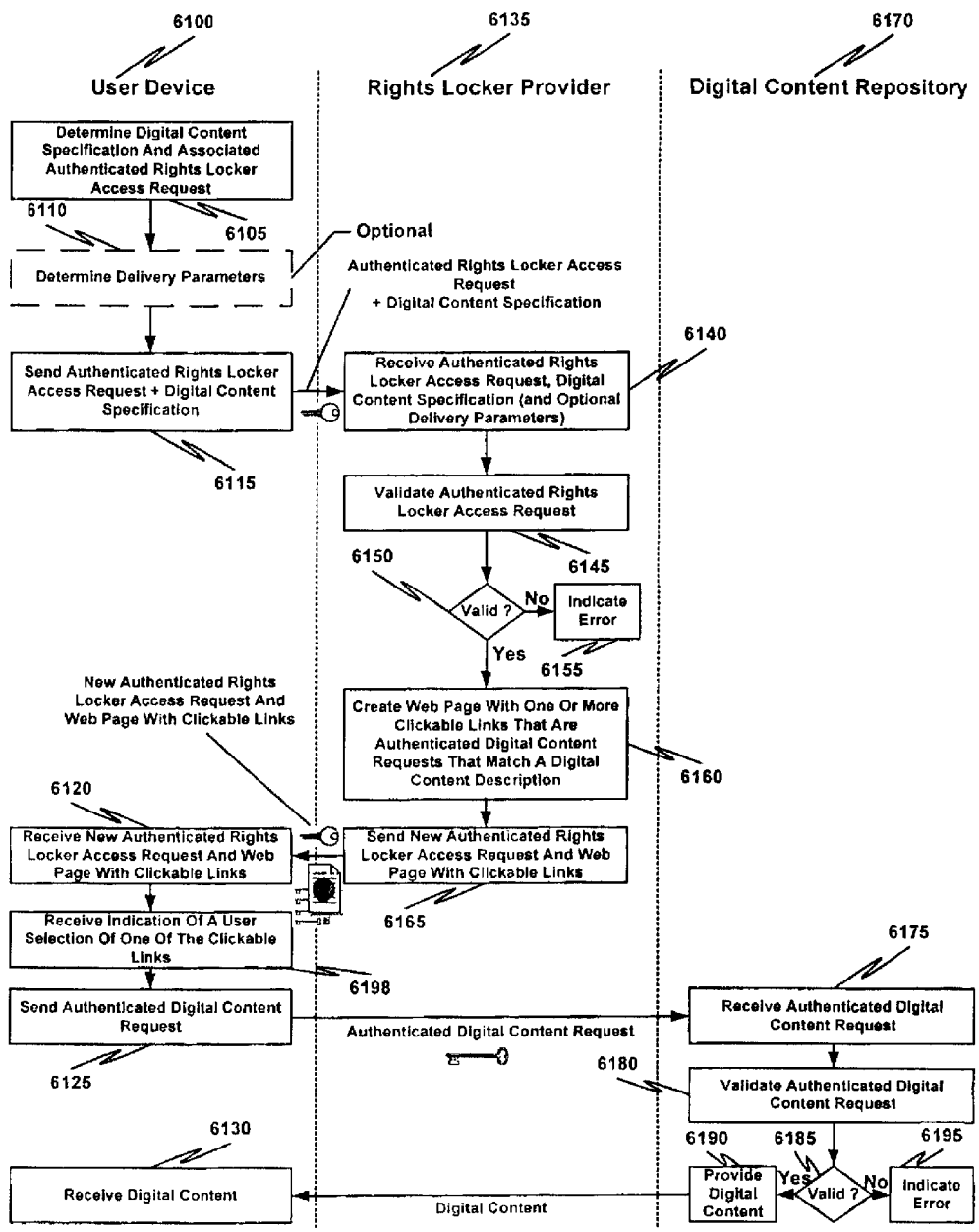
FIG. 61 is a flow diagram that illustrates a method for using authenticated digital content requests embedded in a Web page having clickable links for direct digital content access control in accordance with one embodiment of the present invention.
Figure 62:
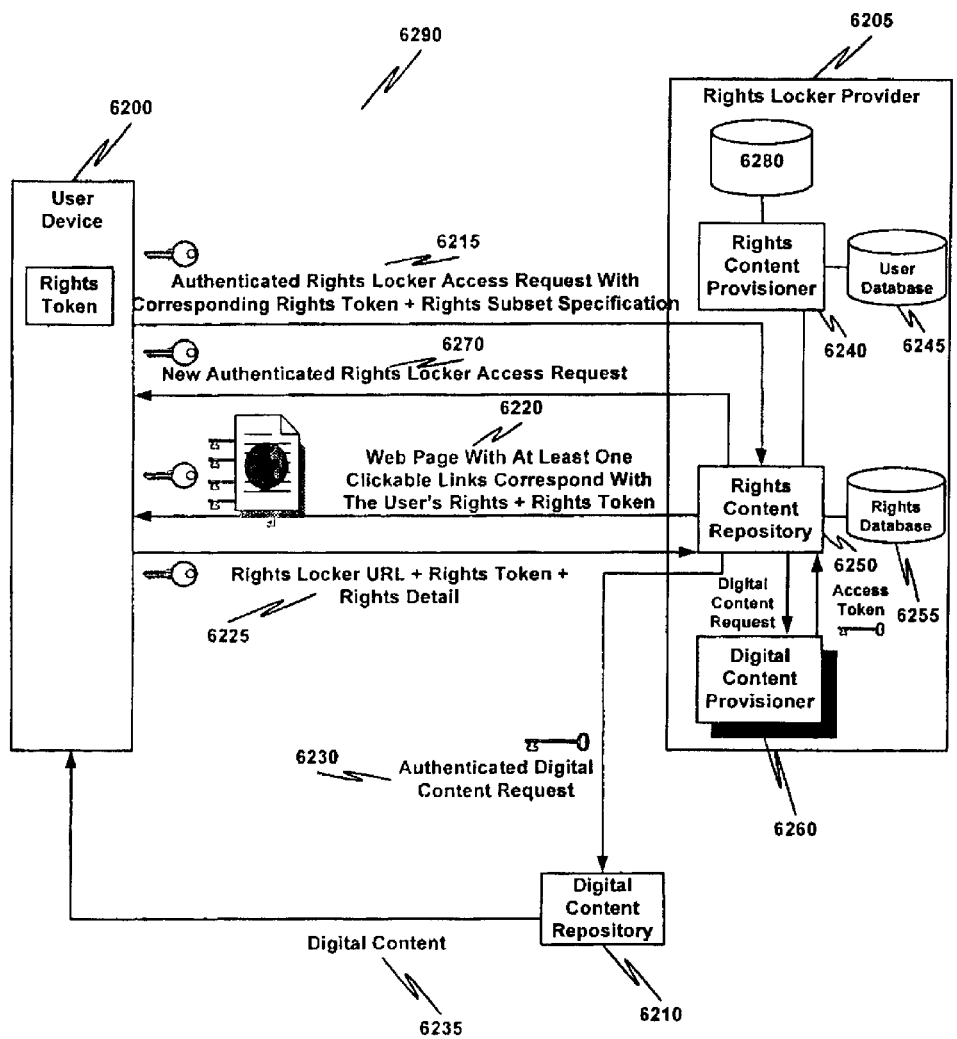
FIG. 62 is a block diagram that illustrates using authenticated digital content requests embedded in a Web page having clickable links for indirect digital content access control in accordance with one embodiment of the present invention.
Figure 63:
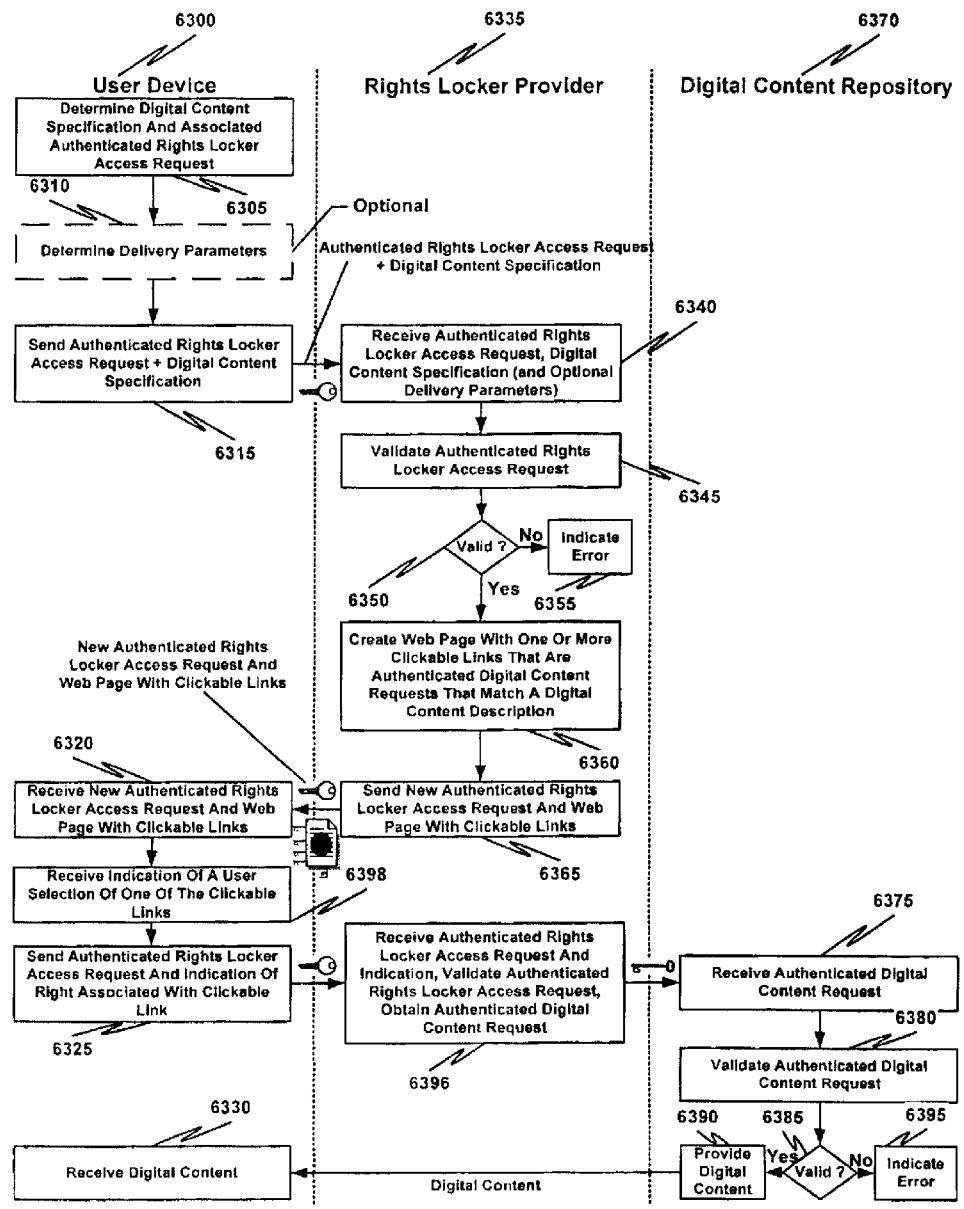
FIG. 63 is a flow diagram that illustrates a method for using authenticated digital content requests embedded in a Web page having clickable links for indirect digital content access control in accordance with one embodiment of the present invention.

FIGS. 52-54 illustrate enrollment with a rights locker provider for digital content access control. FIGS. 55-57 illustrate use of a rights locker for digital content access control. FIGS. 58-59 illustrate maintenance and use of rights in a rights locker for digital content access control. FIGS. 60-63 illustrate using authenticated digital content requests embedded in a Web page having clickable links for digital content access control. The embodiments illustrated in FIGS. 60-61 provide direct digital content access control, while the embodiments illustrated in FIGS. 62-63 provide indirect digital content access control.

Neither synchronizers nor content producers are shown in FIGS. 52, 55, 58, 60, and 62 to avoid obfuscation of the present invention. According to embodiments of the present invention, a first synchronizer is configured to synchronize a digital content provisioner (reference numerals 5230, 5530, 5865, 6055, and 6260 of FIGS. 52, 55, 58, 60, and 62, respectively) with a digital content repository (reference numerals 5220, 5540, 5870, 6010, and 6210 of FIGS. 52, 55, 58, 60, and 62, respectively). Additionally, a second synchronizer is configured to synchronize a rights content provisioner (reference numerals 5225, 5525, 5845, 6005, and 6240 of FIGS. 52, 55, 58, 60, and 62, respectively) with a rights content repository (reference numerals 5235, 5535, 5855, 6050, and 6250 of FIGS. 52, 55, 58, 60, and 62, respectively).

FIGS. 52 and 54 illustrate enrollment with a rights locker provider for digital content access control in accordance with one embodiment of the present invention. FIGS. 55-57 illustrate use of the rights locker after rights enrollment.

Turning now to FIG. 52, a block diagram that illustrates enrollment with a rights locker provider for digital content access control in accordance with one embodiment of the present invention is presented. System 5270 may comprise at least one user device 5200, at least one rights locker provider 5215, and at least one digital content repository 5220 that communicate via a network 5210. System 5270 may also comprise a synchronizer (not shown in FIG. 52) in communication with the rights locker provider 5215 and the at least one digital content repository 5220. User device 5200 is configured to send a rights locker enrollment request 5250 and receive an authenticated rights locker access request 5255 in response to the rights locker enrollment request 5250.

User device 5200 may be any device configured to render digital content to a user 5205. By way of example, user device 5200 may comprise a personal digital assistant (PDA), a personal computer (PC), a mobile phone, a digital audio player (such as an MP3 player), a game console, a server computer in communication with a user display, or the like. According to another embodiment of the present invention, user device 5200 comprises a secure portable device such as a Java Card™ technology-enabled device, or the like.

According to embodiments of the present invention, user devices illustrated in FIGS. 52, 55, 58, 60, and 62 (reference numerals 5200, 5400, 5700, 5900, and 6200 of FIGS. 52, 55, 58, 60, and 62, respectively) comprise a CDMA technology-enabled smart card, a SIM card, a WIM, a USIM, a UIM, a R-UIM or the like.

Referring again to FIG. 52, rights locker provider 5215 is configured to receive a rights locker enrollment request comprising a digital content request and enrollment authentication data. Rights locker provider 5215 is further configured to return an authenticated rights locker access request 5255 in response to the rights locker enrollment request 5250.

As shown in FIG. 52, rights locker provider 5215 comprises a rights content provisioner 5225 in communication with a user database 5240 and an issued authenticated rights locker access request database 5280. User database 5240 stores an association between one or more users and one or more descriptions of rights lockers that describe digital content access rights. Issued authenticated rights locker access request database 5280 stores authenticated rights locker access requests that have been issued but not yet fully redeemed. Rights locker provider 5215 also comprises a rights content repository 5235 in communication with a rights database 5260 and a digital content provisioner 5230. Rights database 5260 stores right lockers comprising one or more digital content access rights descriptions.

Rights content provisioner 5225 is configured to receive a rights locker enrollment request comprising a digital content request and enrollment authentication data (5250) and communicate with user database 5240 to determine whether the user 5205 that made the rights locker enrollment request 5250 is an enrolled user with a rights locker. If the user 5205 is not an enrolled user, the rights locker access authentication data is used to determine whether the user may create a rights locker. If the user 5205 may create a rights locker, user database 5240 is populated with information regarding the user 5205, and the rights content access authentication data is used to determine what rights, if any, the user 5205 has to the digital content specified in the rights locker enrollment request 5250. Rights database 5260 is populated with zero or more rights lockers associated with the user 5205 based upon this determination. If the user 5205 is an enrolled user, the rights content access authentication data is used to determine what rights, if any, the user 5205 has to the digital content specified in the rights locker enrollment request 5250. Rights database 5260 is populated with zero or more rights lockers associated with the user 5205 based upon this determination.

Rights content provisioner 5225 may comprise a rights content provisioner manager (not shown in FIG. 52) in communication with the rights database 5260. The rights content provisioner manager is configured to receive a rights locker enrollment request comprising a digital content request and enrollment authentication data (5250) and communicate with user database 5240 to determine whether the user 5205 that made the rights locker enrollment request 5250 is an enrolled user with a rights locker. If the user 5205 is not an enrolled user, the rights locker access authentication data is used to determine whether the user may create a rights locker. If the user 5205 may create a rights locker, user database 5240 is populated with information regarding the user 5205, and the rights content access authentication data is used to determine what rights, if any, the user 5205 has to the digital content specified in the rights locker enrollment request 5250. Rights database 5260 is populated with zero or more rights lockers associated with the user 5205 based upon this determination. If the user 5205 is an enrolled user, the rights content access authentication data is used to determine what rights, if any, the user 5205 has to the digital content specified in the rights locker enrollment request 5250. Rights database 5260 is populated with zero or more rights lockers associated with the user 5205 based upon this determination.

Still referring to FIG. 52, rights content provisioner 5225 may comprise an issuer (not shown in FIG. 52) to issue a rights token for use in creating an authenticated rights locker access request 5255. Alternatively, rights locker provider 5215 may comprise an issuer external to and in communication with a rights content provisioner 5225. Rights content provisioner 5225 is also configured to communicate with user device 5200 to obtain user authentication data such as a password, PIN, biometric data or the like. If the user device 300 comprises a mobile phone, the user authentication data may also comprise a mobile phone subscriber ID, or the like. According to one embodiment of the present invention, the authenticated rights locker access request 5255 comprises a cryptogram based at least in part on a rights locker identifier that describes the rights locker describing access rights of the user 5205 to digital content specified in the request 5250. The rights locker identifier may describe the physical location of the rights locker. By way of example, the rights locker identifier may describe the physical location of a file or directory that contains the rights locker. Alternatively, the rights locker identifier may describe the logical location of the rights locker. According to another embodiment of the present invention, the cryptogram comprises at least one token from a token pool associated with a rights locker identifier describing access rights of the user 5205 to digital content specified in the rights locker enrollment request 5250.

In operation, user device 5200 sends a rights locker enrollment request 5250 to rights locker provider 5215. The rights locker enrollment request 5250 comprises enrollment authentication data and a request for initializing a rights locker with rights to specified digital content. According to one embodiment of the present invention, the rights locker enrollment request 5250 may be based at least in part on information received from rights locker provider 5215. This information may comprise, by way of example, an indication of one or more services available to user 5205.

The provisioner manager in rights locker provider 5215 receives the rights locker enrollment request 5250 and communicates with user database 5240 to determine whether the user 5205 that made the rights locker enrollment request 5250 is an enrolled user with a rights locker, and whether the user 5205 has rights to the digital content associated with the rights locker. The provisioner manager may also communicate with user device 5200 to obtain user authentication data such as a password, PIN, biometric data or the like. If the user device 5200 comprises a mobile phone, the user authentication data may also comprise a mobile phone subscriber ID, or the like. Provisioner manager may also communicate with user device 5200 to obtain other information from the user to supplement enrollment authentication data supplied in the rights locker enrollment request, or to verify the enrollment authentication data. The other information may include, by way of example, payment information for rights in the rights locker. The payment information may comprise, by way of example, authorization information for charging a credit card or debiting a bank account. If the enrollment authentication data plus any information obtained by querying the user 5205 entitles the user to enroll in a rights locker service, the issuer issues a rights token 5290 and the provisioner manager sends an authenticated rights locker access request 5255 based at least in part on the rights token to user device 5200. User device 5200 receives the authenticated rights locker access request 5255. User device 5200 may store the authenticated rights locker access request 5255 for subsequent use in accessing digital content associated with the rights locker.

According to one embodiment of the present invention, the rights enrollment process comprises establishing a cryptographic key relationship between a user device 5200 and a rights locker provider 5215. According to one embodiment of the present invention, the cryptographic key relationship comprises using shared keys to protect rights tokens. According to another embodiment of the present invention, a key sharing protocol such as the Diffie-Hellman protocol or the like is used to protect rights tokens. According to another embodiment of the present invention, a public key system is used to protect rights tokens. According to another embodiment of the present invention, a deactivated token system as described above is used to protect rights tokens, where the user device comprises a secure user device having a key for activating deactivated tokens.

Turning now to FIG. 53A, a block diagram that illustrates a user database in accordance with one embodiment of the present invention is presented. FIG. 53A provides more detail for reference numerals 5240, 5540, 5850, 6040, and 6245 of FIGS. 52, 55, 58, 60, and 62, respectively. As shown in FIG. 53A, a user database 5300 comprises a user ID table 5325. Elements of the user ID table 5325 comprise a user ID and a reference to one or more rights lockers associated with the user ID. The locker IDs associated with a user ID may form part of a locker ID list (5305, 5310, 5315, 5320). As shown in FIG. 53A, user IDs 1, 2, and M are associated with locker ID lists 5305, 5315, and 5320, respectively. User ID 3 is associated with both locker ID list 5310 and locker ID list 5330. A user ID may be associated with any number of locker IDs, and any number of ID lists. A user ID uniquely identifies a user. Elements of the user ID table 5325 may also comprise a reference to a reenrollment key in a reenrollment authentication list 5335, or other authentication means for use in reenrolling to receive an authenticated rights locker access request. The reenrollment key value or other authentication means may be supplied during initial enrollment. The embodiment illustrated in FIG. 53A shows separate lists for user IDs 5325, reenrollment keys 5335 and locker IDs (5305, 5310, 5315, and 5320). Alternatively, the same information could be combined into a different number of tables.

Turning now to FIG. 53B, a block diagram that illustrates a rights database in accordance with one embodiment of the present invention is presented. FIG. 53B provides more detail for reference numerals 5260, 5560, 5860, 6045, and 6255 of FIGS. 52, 55, 58, 60, and 62, respectively. As shown in FIG. 53B, a rights database 5350 comprises one or more rights lockers (5355, 5360). A rights locker comprises one or more entries defining a digital content access rights description. A rights locker entry comprises one or more access token or tokenized URL. A rights locker entry may also comprise a right description that describes the right indicated by the access token or tokenized URL. Rights database 5350 shows rights locker 1A 5355 corresponding to locker ID 1A of locker ID list 5305 in FIG. 53A, and rights locker 1B 5360 corresponding to locker ID 1B of locker ID list 5305 in FIG. 53A. Rights lockers corresponding to other rights locker IDs in FIG. 53A are not shown in FIG. 53B to prevent obfuscation of the present invention.

According to one embodiment of the present invention, the maximum number of rights lockers per user is based at least in part on a commercial relationship between a user and a rights locker provider. By way of example, a rights locker provider may base the cost of rights locker service at least in part on the maximum number of rights lockers afforded a particular user. A more preferred service plan may allow a relatively high number of rights lockers per user, while a less preferred service plan may allow a relatively small number of rights lockers per user.

According to one embodiment of the present invention, a user uses a first one or more rights lockers for work-related use, and a second one or more rights lockers for personal use. Those of ordinary skill in the art will recognize that other methods for allocating digital content access rights among multiple rights lockers are possible.

Turning now to FIG. 54, a flow diagram that illustrates a method for enrolling with a rights locker provider for digital content access control in accordance with one embodiment of the present invention is presented. FIG. 54 corresponds with FIG. 52. At 5405, a user device 5400 determines digital content accessible via a rights locker. In other words, a set of digital content access rights to put in a rights locker is determined. At 5410, enrollment authentication data is determined. At 5415, a rights locker enrollment request including the digital content request and enrollment authentication data is sent to a rights locker provider 5425.

At 5430, the rights locker provider 5425 receives the rights locker enrollment request. At 5435, a determination is made regarding (1) whether the user that made the request is an enrolled user, and if the user is an enrolled user or if the rights locker authentication data entitles the user to become an enrolled user, (2) what rights the user has to the digital content specified in the rights locker request. A new user is not entitled to become an enrolled user if, for example, payment for use of the rights locker service fails. An enrolled user is not entitled to populate a rights locker with rights to the digital content specified in the rights locker enrollment request if, for example, payment for rights deposited in the rights locker fails.

Still referring to FIG. 54, if the user is not an enrolled user, the rights locker access authentication data is used to determine whether the user may create a rights locker. If the user may create a rights locker, a user database is populated with information regarding the user, and the rights content access authentication data is used to determine what rights, if any, the user has to the digital content specified in the rights locker enrollment request. At 5465, a rights database is populated with zero or more rights lockers associated with the user based upon this determination. If the user is an enrolled user, the rights content access authentication data is used to determine what rights, if any, the user has to the digital content specified in the rights locker enrollment request. At 5465, the rights database is populated with zero or more rights lockers associated with the user based upon this determination.

Still referring to FIG. 54, if the user that made the rights locker enrollment request has no right to access a rights locker, or if the user has no access rights for the digital content associated with the rights locker enrollment request, an error is indicated at 5445. Additionally, if the user has access for some but not all access rights requested (such as if the rights locker is large enough to hold some but not all access rights requested), an error is indicated. If the user has access for some but not all access rights requested, the user may be given the option to continue with a subset of the rights requested, or to terminate the enrollment process.

At 5450, a token that authenticates future access to a rights locker corresponding to the requested digital content is obtained. At 5455, an authenticated rights locker access request is created based on the token. At 5460, the authenticated rights locker access request is sent to the user device 5400. At 5420, the user device 5400 receives the authenticated rights locker access request. The user device 5400 may store the authenticated rights locker access request for subsequent use in accessing digital content associated with the rights locker.

FIGS. 55-57 illustrate use of a rights locker for digital content access control in accordance with one embodiment of the present invention. FIGS. 55-57 assume a user has previously enrolled with a rights locker provider as described above with reference to FIGS. 52 and 54.

Turning now to FIG. 55, rights content repository 5535 is configured to receive an authenticated rights locker access request 5550 and return a digital content access rights description corresponding to the authenticated rights locker access request 5550. The digital content access rights description may comprise a digital content request. Rights content repository 5535 is in communication with a rights database 5560 that stores at least one rights locker comprising at least one digital content access rights description. Rights content repository 5535 also may comprise a rights content repository manager (not shown in FIG. 55) in communication with the rights database 5560. The rights content repository manager is configured to receive an authenticated rights locker access request 5550, communicate with the rights database 5560 to determine whether the authenticated rights locker access request 5550 is valid, and send the digital content access rights description associated with the authenticated rights locker access request to digital content provisioner 5530 when the authenticated rights locker access request 5550 is valid. The rights content repository manager may also comprise an acceptor (not shown in FIG. 55) to accept a rights token and determine whether the access to the rights content associated with the authenticated rights locker access request is authorized based at least in part on the rights token. Alternatively, rights content repository 5535 may comprise an acceptor external to and in communication with a rights content repository manager.

A rights synchronizer (not shown in FIG. 55) is configured to synchronize the information used by the rights content provisioner 5525 to create authenticated rights locker access requests with the information used by rights content repository 5535 to validate authenticated rights locker access requests. The authenticated rights locker access request information may comprise, by way of example, a token pool, information for use in generating a token pool, and the number of tokens released by the rights content provisioner 5525. According to one embodiment of the present invention, the rights content provisioner 5525 triggers the synchronization. According to another embodiment of the present invention, the rights content repository 5535 triggers the synchronization. According to another embodiment of the present invention, the synchronization is triggered by the synchronizer, based at least in part on a predetermined schedule.

According to one embodiment of the present invention, a rights content provisioner 5525 comprises a rights synchronizer (not shown in FIG. 55). According to another embodiment of the present invention, a rights content repository 5535 comprises a rights synchronizer (not shown in FIG. 55).

Digital content provisioner 5530 is configured to receive a digital content request from rights content repository 5535 and return an authenticated digital content request in response to the received digital content request. A digital content provisioner 5530 may comprise an issuer (not shown in FIG. 55) to issue a token for use in creating an authenticated digital content request. Alternatively, rights locker provider 5515 may comprise an issuer external to and in communication with a digital content provisioner 5530. According to one embodiment of the present invention, the authenticated rights locker access request comprises a cryptogram based at least in part on a rights locker identifier that describes the rights locker describing access rights of the user 5505 to digital content specified in the request 5550. The rights locker identifier may describe the physical location of the rights locker. By way of example, the rights locker identifier may describe the physical location of a file or directory that contains the rights locker. Alternatively, the rights locker identifier may describe the logical location of the rights locker. According to another embodiment of the present invention, the cryptogram comprises at least one token from a token pool associated with the location of the digital content for which access is authorized.

Digital content repository 5540 is configured to receive an authenticated digital content request (5560, 5575) and return digital content 5565 corresponding to the authenticated digital content request (5560, 5575). Digital content repository 5540 may comprise a content database 5545 to store digital content corresponding to at least one digital content description stored by at least one digital content provisioner 5530. Digital content repository 5540 also may comprise a repository manager (not shown in FIG. 55) in communication with the content database 5545. A digital content repository manager is configured to receive an authenticated digital content request (5560, 5575), communicate with the content database 5545 to determine whether the authenticated digital content request (5560, 5575) is valid and return the digital content 5565 associated with the authenticated digital content request (5560, 5575) when the authenticated digital content request (5560, 5575) is valid. The digital content repository manager may also comprise an acceptor to accept a token and determine whether the access to the digital content associated with the authenticated digital content request (5560, 5575) is authorized based at least in part on the token. Alternatively, digital content repository 5220 may comprise an acceptor external to and in communication with a repository manager.

In operation, user device 5500 sends an authenticated rights locker access request 5550 to rights locker provider 5515. Rights content repository manager in rights content repository 5535 receives the authenticated rights locker access request 5550 and communicates with the acceptor and the rights database 5560 to determine whether the authenticated rights locker access request 5550 is valid. If the authenticated digital content request 5555 is valid, rights content repository manager sends to digital content provisioner 5530 a digital content request comprising the digital content access rights description associated with the authenticated rights locker access request 5550. Digital content provisioner 5530 receives the digital content request and returns an authenticated digital content request in response to the received digital content request.

According to one embodiment of the present invention, an authenticated rights locker access request 5550 comprises one or more delivery parameters such as a target ID indicating where digital content should be sent, a delivery mechanism, or both.

Rights locker provider 5515 may send the authenticated digital content request 5555 to user device 5500, which may forward the authenticated digital content request 5560 to digital content repository 5540. Alternatively, rights locker provider 5515 may send the authenticated digital content request directly to digital content repository 5545. Rights locker provider 5515 also sends a new authenticated rights locker access request 5572 to user device 5500 if the rights token 5590 associated with the current authenticated rights locker access request has been fully redeemed. The new authenticated rights locker access request 5572 replaces the authenticated rights locker access request sent at 5550 and is for use in obtaining a next authenticated digital content request.

Upon receiving the authenticated digital content request (5560, 5575), digital content repository 5540 communicates with content database 5245 to determine whether the authenticated digital content request is valid. If the digital content request is valid, at least one digital content repository 5220 returns the digital content associated with the authenticated digital content request. User device 5500 receives the digital content 5565 for use by user 5505.

Turning now to FIG. 56, a flow diagram that illustrates a method for using a rights locker for digital content access control in accordance with one embodiment of the present invention is presented. FIG. 56 corresponds with FIG. 55. At 5605, a digital content specification and associated authenticated rights locker access request are determined. At 5610, one or more delivery parameters are determined. At 5615, the authenticated rights locker access request and digital content specification are sent to a rights locker provider 5635. According to one embodiment of the present invention, one or more delivery parameters are also sent to rights locker provider 5635.

At 5640, the rights locker provider 5635 receives the authenticated rights locker access request, digital content specification, and optional delivery parameters. At 5645, the authenticated rights locker access request is validated. At 5650, a determination is made regarding whether the validation (5645) result indicates the authenticated rights locker access request is valid. If the answer is "No", an error indication is made at 5655. If the answer at 5650 is "Yes", at 5660, an authenticated digital content request for use in accessing digital content stored by a digital content repository 5670 is created. At 5662, a token that authenticates future access to a rights locker corresponding to the requested digital content is obtained. At 5664, a new authenticated rights locker access request based on the token is created if the rights token associated with the current authenticated rights locker access request has been fully redeemed. The new authenticated rights locker access request replaces the authenticated rights locker access request sent at 5615 and is for use in obtaining a next authenticated digital content request. At 5665, the authenticated digital content request and the new authenticated rights locker access request are sent to the user device 5600.

The user device 5600 receives the authenticated digital content request and the new authenticated rights locker access request at 5620. The new authenticated rights locker access request may be stored for use in obtaining the next authenticated digital content request. At 5625, the user device 5600 sends the authenticated digital content request to a digital content repository 5670.

At 5675, the digital content repository 5670 receives the authenticated digital content request. At 5680, the authenticated digital content request is validated. At 5685, a determination is made regarding whether the validation (5680) result indicates the authenticated digital content request is valid. If the answer is "No", an error indication is made at 5695. If the answer at 5685 is "Yes", at 5690, an authenticated digital content request for use in accessing digital content stored by a digital content repository is sent to the user device 5600. At 5630, the user device 5600 receives the digital content.

Turning now to FIG. 57, a flow diagram that illustrates a method for using a rights locker for digital content access control in accordance with one embodiment of the present invention is presented. FIG. 57 corresponds with FIG. 55. FIG. 57 is similar to FIG. 56, except that FIG. 57 illustrates sending an authenticated digital content request directly to a rights locker provider, whereas FIG. 56 illustrates sending an authenticated digital content request to a rights locker provider indirectly via a user device. At 5705, a digital content specification and associated authenticated rights locker access request are determined. At 5710, delivery parameters are determined. At 5715, the authenticated rights locker access request and digital content specification are sent to a rights locker provider 5735. According to one embodiment of the present invention, one or more delivery parameters are also sent to rights locker provider 5735.

At 5740, the rights locker provider 5735 receives the authenticated rights locker access request, digital content specification, and optional delivery parameters. At 5745, the authenticated rights locker access request is validated. At 5750, a determination is made regarding whether the validation (5745) result indicates the authenticated rights locker access request is valid. If the answer is "No", an error indication is made at 5755. If the answer at 5750 is "Yes", at 5760, an authenticated digital content request for use in accessing digital content stored by a digital content repository 5770 is created. At 5765, the authenticated digital content request is sent to the digital content repository 5770. At 5766, a token that authenticates future access to a rights locker corresponding to the requested digital content is obtained. At 5768, a new authenticated rights locker access request based on the token is created if the rights token associated with the current authenticated rights locker access request has been fully redeemed. The new authenticated rights locker access request replaces the authenticated rights locker access request sent at 5715 and is for use in obtaining a next authenticated digital content request. At 5772, the new authenticated rights locker access request is sent to the user device 5700.

The user device 5700 receives the authenticated digital content request and the new authenticated rights locker access request at 5774. The new authenticated rights locker access request may be stored for use in obtaining the next authenticated digital content request.

The digital content repository 5770 receives the authenticated digital content request at 5775. At 5780, the authenticated digital content request is validated. At 5785, a determination is made regarding whether the validation (5780) result indicates the authenticated digital content request is valid. If the answer is "No", an error indication is made at 5795. If the answer at 5785 is "Yes", at 5790, an authenticated digital content request for use in accessing digital content stored by a digital content repository is sent to the user device 5700. At 5730, the user device 5700 receives the digital content.

FIGS. 58-59 illustrate maintenance and use of rights in a rights locker for digital content access control. Turning now to FIG. 58, a block diagram that illustrates maintenance and use of rights in a rights locker for digital content access control in accordance with one embodiment of the present invention is presented. As shown in FIG. 58, rights content provisioner 5845 receives a rights locker enrollment request 5805 and returns one or more authenticated rights locker access requests with corresponding one or more rights tokens (5815). According to one embodiment of the present invention, the number of rights token types corresponds with the number of rights content types provided by a rights locker. According to another embodiment of the present invention, there are at least four rights content types: rights access, rights overview, rights add, and rights remove. The rights access type allows access to the digital content protected by the rights locker. The rights overview type allows viewing the rights in the rights locker. The rights add type allows adding one or more rights to a rights locker. Adding a right may include a monetary transaction. The rights remove type allows removing one or more rights from a rights locker. Removing a right may include a monetary transaction. The rights tokens may be used in constructing an authenticated rights locker access request such as a tokenized URL to access digital content.

According to another embodiment of the present invention, a single token type is used for multiple rights content types. By way of example, a first token type may be used for the rights access type and the rights overview type, and a second token type may be used for the rights add type and the rights remove type. A parameter may be used to indicate a particular rights content type. Those of ordinary skill in the art will recognize other combinations are possible.

According to another embodiment of the present invention, a single rights token type is used for all rights content types. The combination of the rights token and one or more parameter indicate the rights provided by the rights locker.

According to another embodiment of the present invention, rights type that a token authenticates is encoded into the token itself.

Turning now to FIG. 59, a flow diagram that illustrates a method for maintenance and use of rights in a rights locker for digital content access control in accordance with one embodiment of the present invention is presented. FIG. 59 corresponds with FIG. 58. At 5905, a user device 5900 determines digital content accessible via a rights locker. In other words, a set of digital content access rights to put in a rights locker is determined. At 5910, enrollment authentication data is determined. At 5915, a rights locker enrollment request including the digital content request and enrollment authentication data is sent to a rights locker provider 5925.

At 5930, the rights locker provider 5925 receives the rights locker enrollment request. At 5935, a determination is made regarding (1) whether the user that made the request is an enrolled user, and if the user is an enrolled user or if the rights locker authentication data entitles the user to become an enrolled user, (2) what rights the user has to the digital content specified in the rights locker request. A new user is not entitled to become an enrolled user if, for example, payment for use of the rights locker service fails. An enrolled user is not entitled to populate a rights locker with rights to the digital content specified in the rights locker enrollment request if, for example, payment for rights deposited in the rights locker fails.

Still referring to FIG. 59, if the user is not an enrolled user, the rights locker access authentication data is used to determine whether the user may create a rights locker. If the user may create a rights locker, a user database is populated with information regarding the user, and the rights content access authentication data is used to determine what rights, if any, the user has to the digital content specified in the rights locker enrollment request. At 5965, a rights database is populated with zero or more rights lockers associated with the user based upon this determination. If the user is an enrolled user, the rights content access authentication data is used to determine what rights, if any, the user has to the digital content specified in the rights locker enrollment request. At 5965, the rights database is populated with zero or more rights lockers associated with the user based upon this determination.

Still referring to FIG. 59, if the user that made the rights locker enrollment request has no right to access a rights locker, or if the user has no access rights for the digital content associated with the rights locker enrollment request, an error is indicated at 5945. Additionally, if the user has access for some but not all access rights requested (such as if the rights locker is large enough to hold some but not all access rights requested), an error is indicated. If the user has access for some but not all access rights requested, the user may be given the option to continue with a subset of the rights requested, or to terminate the enrollment process.

At 5950, one or more tokens that authenticate future access to a rights locker corresponding to the requested digital content are obtained. At 5955, one or more authenticated rights locker access requests are created based on the one or more tokens. At 5960, the one or more authenticated rights locker access requests are sent to the user device 5900. At 5920, the user device 5900 receives the one or more authenticated rights locker access requests. At 5995, the user device 5900 receives an indication of a selection of one of the authenticated rights locker access requests. At 5970, the user-selected authenticated rights locker access request is sent to the rights locker provider 5925. At 5980, the rights locker provider 5925 receives the user-selected authenticated rights locker access request. At 5985, the rights locker contents are accessed based on the rights token type of the authenticated rights locker access request. At 5975, the user device 5900 is presented with the result of process 5985.

FIGS. 60-63 illustrate using authenticated digital content requests embedded in a Web page having clickable links for digital content access control. FIGS. 60-63 assume a user has previously enrolled with a rights locker provider as described above with reference to FIGS. 52 and 54. The embodiments illustrated in FIGS. 60-61 provide direct digital content access control, while the embodiments illustrated in FIGS. 62-63 provide indirect digital content access control.

Turning now to FIG. 60, a block diagram that illustrates using authenticated digital content requests embedded in a Web page having clickable links for direct digital content access control in accordance with one embodiment of the present invention is presented. System 6090 may comprise at least one user device 6000, at least one rights locker provider 6005, and at least one digital content repository 6010 that communicate via a network. System 6090 may also comprise a synchronizer (not shown in FIG. 60) in communication with the rights locker provider 6005 and the at least one digital content repository 6010. User device 6000 is configured to send an authenticated rights locker access request and a rights subset specification (6015) to rights locker provider 6005 and receive a Web page 6020 in response to the authenticated rights locker access request 6015, where at least one clickable link of the Web page 6020 comprises an authenticated content request that matches a digital content access rights description.

Rights locker provider 6005 is configured to receive an authenticated rights locker access request and a rights subset specification (6015). Rights locker provider 6005 is further configured to return a Web page 6020 in response to the authenticated rights locker access request 6015, where at least one clickable link of the Web page 6020 comprises an authenticated content request that matches a digital content access rights description.

As shown in FIG. 60, rights locker provider 6005 comprises a rights content provisioner 6035 in communication with a user database 6040 and an issued authenticated rights locker access request database 6080. User database 6040 stores an association between one or more users and one or more descriptions of rights lockers that describe digital content access rights. Issued authenticated rights locker access request database 6080 stores authenticated rights locker access requests that have been issued but not yet fully redeemed. Rights locker provider 6005 also comprises a rights content repository 6050 in communication with a rights database 6045 and a digital content provisioner 6055. Rights database 6045 stores right lockers comprising one or more digital content access rights descriptions.

In operation, user device 6000 sends an authenticated rights locker access request and a rights subset specification (6015) to rights locker provider 6005. Rights locker provider 6005 receives the authenticated rights locker access request and rights subset specification (6015) and returns a Web page 6020, where at least one clickable link of the Web page 6020 comprises an authenticated content request that matches a digital content access rights description. Rights locker provider 6005 also returns a new authenticated rights locker access request 6060 to user device 6000 if the rights token associated with the current authenticated rights locker access request has been fully redeemed. The new authenticated rights locker access request 6060 replaces the authenticated rights locker access request sent at 6015 and may be stored for use in obtaining a next authenticated digital content request. User device 6000 receives an indication of which clickable link was selected by a user and sends the authenticated digital content request associated with the link 6025 to digital content repository 6010. Digital content repository 6010 returns the digital content 6030 associated with the authenticated digital content request 6025 upon receiving the authenticated digital content request 6025 associated with the user-selected link.

According to one embodiment of the present invention, digital content provisioner 5955 is external to and in communication with rights locker provider 5905.

Turning now to FIG. 61, a flow diagram that illustrates a method for using authenticated digital content requests embedded in a Web page having clickable links for direct digital content access control in accordance with one embodiment of the present invention is presented. FIG. 61 corresponds with FIG. 60. At 6105, a digital content specification and associated authenticated rights locker access request are determined. At 6110, delivery parameters are optionally determined. At 6115, the authenticated rights locker access request and digital content specification are sent to a rights locker provider 6135. According to one embodiment of the present invention, one or more delivery parameters are also sent to rights locker provider 6135.

At 6140, the rights locker provider 6135 receives the authenticated rights locker access request. At 6145, the authenticated rights locker access request is validated. At 6150, a determination is made regarding whether the validation (6145) result indicates the authenticated rights locker access request is valid. If the answer is "No", an error indication is made at 6155. If the answer at 6150 is "Yes", at 6160, a Web page where at least one clickable link of the Web page comprises an authenticated content request that matches a digital content access rights description is created. At 6165, the Web page is sent to the user device 6100. Rights locker provider 6135 also sends a new authenticated rights locker access request to user device 6100 if the rights token associated with the current authenticated rights locker access request has been fully redeemed. The new authenticated rights locker access request replaces the authenticated rights locker access request sent at 6115 and may be stored for use in obtaining a next authenticated digital content request.

The user device 6100 receives the Web page with clickable links and the new authenticated rights locker access request at 6120. At 6198, an indication of a user selection of one of the clickable links is received. At 6125, the user device 6100 sends the authenticated digital content request associated with the user-selected clickable link to a digital content repository 6170.

At 6175, the digital content repository 6170 receives the authenticated digital content request. At 6180, the authenticated digital content request is validated. At 6185, a determination is made regarding whether the validation (6180) result indicates the authenticated digital content request is valid. If the answer is "No", an error indication is made at 6195. If the answer at 6185 is "Yes", at 6190, an authenticated digital content request for use in accessing digital content stored by a digital content repository is sent to the user device 6100. At 6130, the user device 6100 receives the digital content.

Turning now to FIG. 62, a block diagram that illustrates using authenticated digital content requests embedded in a Web page having clickable links for indirect digital content access control in accordance with one embodiment of the present invention is presented. System 6290 may comprise at least one user device 6200, at least one rights locker provider 6205, and at least one digital content repository 6210 that communicate via a network. System 6290 may also comprise a synchronizer (not shown in FIG. 62) in communication with the rights locker provider 6205 and the at least one digital content repository 6210. User device 6200 is configured to send an authenticated rights locker access request and a rights subset specification (6215) to rights locker provider 6205 and receive a Web page 6220 in response to the authenticated rights locker access request 6215, where at least one clickable link of the Web page 6220 comprises an authenticated content request that matches a digital content access rights description.

Rights locker provider 6205 is configured to receive an authenticated rights locker access request and a rights subset specification (6215). Rights locker provider 6205 is further configured to return a Web page 6220 in response to the authenticated rights locker access request 6215, where at least one clickable link of the Web page 6220 comprises an authenticated content request that matches a digital content access rights description.

As shown in FIG. 62, rights locker provider 6205 comprises a rights content provisioner 6235 in communication with a user database 6240 and an issued authenticated rights locker access request database 6280. User database 6240 stores an association between one or more users and one or more descriptions of rights lockers that describe digital content access rights. Issued authenticated rights locker access request database 6280 stores authenticated rights locker access requests that have been issued but not yet fully redeemed. Rights locker provider 6205 also comprises a rights content repository 6250 in communication with a rights database 6245 and a digital content provisioner 6255. Rights database 6245 stores right lockers comprising one or more digital content access rights descriptions.

In operation, user device 6200 sends an authenticated rights locker access request and a rights subset specification (6215) to rights locker provider 6205. Rights locker provider 6205 receives the authenticated rights locker access request and rights subset specification (6215) and returns a Web page 6220, where at least one clickable link of the Web page 6220 comprises an authenticated content request that matches a digital content access rights description. Rights locker provider 6205 also returns a new authenticated rights locker access request 6270 to user device 6200 if the rights token associated with the current authenticated rights locker access request has been fully redeemed. The new authenticated rights locker access request 6270 replaces the authenticated rights locker access request sent at 6215 and may be stored for use in obtaining a next authenticated digital content request. User device 6200 receives an indication of which clickable link was selected by a user and sends to rights locker provider 6205 the authenticated rights locker access request and an indication of the right associated with the user-selected clickable link. Rights locker provider 6205 receives the authenticated rights locker access request and the indication of the right associated with the user-selected clickable link, interfaces with rights database 6255 to validate the authenticated rights locker access request, interfaces with digital content provisioner 6260 to obtain an authenticated digital content request 6230, and sends the authenticated digital content request 6230 to digital content repository 6210. Digital content repository 6210 sends to the user device the digital content associated with the authenticated digital content request upon receiving and validating the authenticated digital content request.

According to one embodiment of the present invention, digital content provisioner 5955 is external to and in communication with rights locker provider 5905.

Turning now to FIG. 63, a flow diagram that illustrates a method for using authenticated digital content requests embedded in a Web page having clickable links for indirect digital content access control in accordance with one embodiment of the present invention is presented. FIG. 63 corresponds with FIG. 62. At 6305, a digital content specification and associated authenticated rights locker access request are determined. At 6310, delivery parameters are optionally determined. At 6315, the authenticated rights locker access request and digital content specification are sent to a rights locker provider 6335. According to one embodiment of the present invention, one or more delivery parameters are also sent to rights locker provider 6335.

At 6340, the rights locker provider 6335 receives the authenticated rights locker access request. At 6345, the authenticated rights locker access request is validated. At 6350, a determination is made regarding whether the validation (6345) result indicates the authenticated rights locker access request is valid. If the answer is "No", an error indication is made at 6355. If the answer at 6350 is "Yes", at 6360, a Web page where at least one clickable link of the Web page comprises an authenticated content request that matches a digital content access rights description is created. At 6365, the Web page is sent to the user device 6300. Rights locker provider 6335 also sends a new authenticated rights locker access request to user device 6300 if the rights token associated with the current authenticated rights locker access request has been fully redeemed. The new authenticated rights locker access request replaces the authenticated rights locker access request sent at 6315 and may be stored for use in obtaining a next authenticated digital content request.

The user device 6300 receives the new authenticated rights locker access request and the Web page with clickable links at 6320. At 6398, an indication of a link selected by a user is received. At 6325, the user device 6300 sends to rights locker provider 6335 the authenticated rights locker access request and an indication of the right associated with the user-selected clickable link.

At 6396, the rights locker provider 6335 receives the authenticated rights locker access request, and the indication of the right associated with the user-selected clickable interfaces with a rights database to validate the authenticated rights locker access request, interfaces with a digital content provisioner to obtain an authenticated digital content request, and sends the authenticated digital content request to digital content repository 6370.

At 6375, the digital content repository 6370 receives the authenticated digital content request. At 6380, the authenticated digital content request is validated. At 6385, a determination is made regarding whether the validation (6380) result indicates the authenticated digital content request is valid. If the answer is "No", an error indication is made at 6395. If the answer at 6385 is "Yes", at 6390, an authenticated digital content request for use in accessing digital content stored by a digital content repository is sent to the user device 6300. At 6330, the user device 6300 receives the digital content.

While embodiments of the present invention have illustrated communicating updated information such as a new authenticated rights locker access request between a rights locker provider and a user device in the form of a tokenized URL (reference numerals 5255, 5572, 5815, 6060, and 6270 of FIGS. 52, 55, 58, 60, and 62, respectively), other mechanisms are possible. Three such mechanisms are described in more detail below.

According to one embodiment of the present invention, the rights token used by a user device is stored in a bookmark and the bookmark is updated with a new authenticated rights locker access request in response to sending an authenticated rights locker access request to a rights locker provider. Using FIGS. 52, 55, 58, 60, and 62 as examples, authenticated rights locker access requests 5255, 5572, 5815, 6060, and 6270 comprise a rights token for storage in a bookmark on a user device (reference numerals 5200, 5500, 5800, 6000, and 6200). The rights token stored in the bookmark is for use in the future issuance of an authenticated rights locker access request. Issuance of the future authenticated rights locker access request may be initiated, by way of example, when a user uses a Web browser to select or otherwise activate the bookmark.

According to another embodiment of the present invention, a tokenized digital content request embedded in a Web cookie is used in lieu of a tokenized URL. A Web cookie is updated with a new authenticated rights locker access request in response to sending an authenticated rights locker access request to a rights locker provider. Using FIGS. 52, 55, 58, 60, and 62 as examples, requests 5250, 5550, 5805, 6015, and 6215 comprise digital content requests that are embedded in a Web cookie sent from a user device (5200, 5500, 5800, 6000, 6200) to a rights locker provider (5215, 5515, 5810, 6005, 6205). Authenticated rights locker access requests 5255, 5572, 5815, 6060, and 6270 are embedded in a Web cookie send from the rights locker provider (5215, 5515, 5810, 6005, 6205) for storage on the user device (reference numerals 5200, 5500, 5800, 6000, and 6200). The stored authenticated rights locker access request are for use in the future issuance of an authenticated rights locker access request. The future issuance of the authenticated rights locker access request may comprise embedding the authenticated rights locker access request in a Web cookie sent from the user device (5200, 5500, 5800, 6000, 6200) to the rights locker provider (5215, 5515, 5810, 6005, 6205).

According to another embodiment of the present invention, tokenized digital content requests are encapsulated in the header portion of HTTP Request messages from a user device to a rights locker provider, and a rights token to use in subsequent requests is encapsulated in the header portion of the corresponding HTTP Response messages. Using FIGS. 52, 55, 58, 60, and 62 as examples, requests 5250, 5550, 5805, 6015, and 6215 comprise digital content requests that are encapsulated in the header portion of HTTP Request messages from a user device (5200, 5500, 5800, 6000, 6200) to a rights locker provider (5215, 5515, 5810, 6005, 6205). Authenticated rights locker access requests 5255, 5572, 5815, 6060, and 6270 comprise a rights token encapsulated in the header portion of the corresponding HTTP Response messages from the rights locker provider (5215, 5515, 5810, 6005, 6205) to the user device (5200, 5500, 5800, 6000, 6200). The rights token stored in the HTTP Response message is for use in the future issuance of an authenticated rights locker access request. The future issuance of the authenticated rights locker access request may comprise encapsulating the authenticated rights locker access request in the header portion of an HTTP Request message from the user device (5200, 5500, 5800, 6000, 6200) to the rights locker provider (5215, 5515, 5810, 6005, 6205).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus for accessing digital content in a digital content repository, the apparatus comprising:

a user device associated with a token for use in creating authenticated rights locker access requests, wherein said token is stored remotely from said user device; and a processor of the user device configured to determine, at the user device, a digital content specification associated with the digital content stored at the digital content repository, and send, from the user device to a rights locker provider for a rights locker, a first authenticated rights locker access request and the digital content specification, wherein said first authenticated rights locker access request is based on said token and stored on said user device for providing access by said user device to said rights locker provider for said rights locker, and wherein the first authenticated rights locker access request is in the form of a tokenized URL;

receive, at the user device, from the rights locker provider, in response to said first authenticated rights locker access request and said digital content specification, and based on a status of the token, a second authenticated rights locker access request based on said token and an authenticated digital content request, wherein the second authenticated rights locker access request is in the form of a tokenized URL;

store on the user device at least part of the second authenticated rights locker access request;

receive, at the user device, an indication of a user selection associated with the authenticated digital content request;

send, from the user device, in response to said indication of a user selection, the authenticated digital content request to the digital content repository; and receive the digital content, at the user device from the digital content repository, in response to said authenticated digital content request.

2. The apparatus of claim 1, wherein the processor is further configured to determine, at the user device, one or more delivery parameters, the one or more delivery parameters indicating where the digital content should be sent, a delivery mechanism, or both; and wherein the processor is further configured to send the one or more delivery parameters from the user device to the rights locker with said first authenticated rights locker access request and said digital content specification.

3. The apparatus of claim 1, wherein the processor is further configured to store at least part of the second authenticated rights locker access request in a bookmark on the user device.

4. The apparatus of claim 1, wherein the second authenticated rights locker access request is encapsulated in a Hypertext Transfer Protocol (HTTP) Response message.

5. The apparatus of claim 1, wherein the second authenticated rights locker access request is embedded in a Web cookie.

6. The apparatus of claim 1, wherein the user device comprises a smart card.

7. The apparatus of claim 6, wherein the smart card comprises a Java Card™ technology-enabled smart card.

8. The apparatus of claim 6, wherein the smart card comprises a CDMA (Code Division Multiple Access) technology-enabled smart card.

9. The apparatus of claim 6, wherein the smart card comprises a SIM (Subscriber Identity Module) card.

10. A method for providing digital content access control for access from a user device to a digital content stored at a digital content repository, the method comprising the steps of:

storing on the user device an authenticated rights locker access request received from a rights locker provider and based on a token stored remotely from said user device, said authenticated rights locker access request providing access by said user device to said rights locker provider for a rights locker, and wherein the authenticated rights locker access request is in the form of a tokenized URL;

determining, at the user device, a digital content specification associated with the digital content stored at the digital content repository;

sending, from the user device to the rights locker provider for the rights locker, the authenticated rights locker access request and the digital content specification;

receiving, at the user device, from the rights locker provider, in response to the authenticated rights locker access request and the digital content specification, and based on a status of the token, a new authenticated rights locker access request based on said token, and an authenticated digital content request, wherein the new authenticated rights locker access request is in the form of a tokenized URL;

storing on said user device at least part of the new authenticated rights locker access request;

receiving, at the user device, an indication of a user selection associated with the authenticated digital content request;

sending, from the user device, in response to said indication of a user selection, the authenticated digital content request to the digital content repository; and receiving, at the user device from the digital content repository, in response to sending the authenticated digital content request, the digital content.

11. The method of claim 10, wherein the method further comprises determining, at the user device, one or more delivery parameters, the one or more delivery parameters indicating where the digital content should be sent, a delivery mechanism, or both; and wherein the sending the authenticated rights locker access request and the digital content specification further comprises sending the one or more delivery parameters.

12. The method of claim 10, wherein the method further comprises storing at least part of the new authenticated rights locker access request in a bookmark on the user device.

13. The method of claim 10, wherein the new authenticated rights locker access request is encapsulated in a Hypertext Transfer Protocol (HTTP) Response message.

14. The method of claim 10, wherein the new authenticated rights locker access request is embedded in a Web cookie.

15. The method of claim 10, wherein the user device comprises a smart card.

16. The method of claim 15, wherein the smart card comprises a Java Card™ technology-enabled smart card.

17. The method of claim 15, wherein the smart card comprises a CDMA (Code Division Multiple Access) technology-enabled smart card.

18. The method of claim 15, wherein the smart card comprises a SIM (Subscriber Identity Module) card.

19. A non-transitory computer readable storage media, including instructions stored thereon for accessing digital content stored at a digital content repository, which instructions, when read and executed by one or more processors, cause the one or more processors to perform steps comprising:

storing on a user device an authenticated rights locker access request received from a rights locker provider and based on a token stored remotely from said user device, said authenticated rights locker access request providing access by said user device to said rights locker provider for a rights locker, and wherein the authenticated rights locker access request is in the form of a tokenized URL;

determining, at the user device, a digital content specification associated with the digital content stored at the digital content repository;

sending, from the user device to the rights locker provider for the rights locker, the authenticated rights locker access request and the digital content specification;

receiving, at the user device, from the rights locker provider, in response to the authenticated rights locker access request and the digital content specification, and based on a status of the token, a new authenticated rights locker access request based on said token, and an authenticated digital content request, wherein the new authenticated rights locker access request is in the form of a tokenized URL;

storing on said user device at least part of the new authenticated rights locker access request;

receiving, at the user device, an indication of a user selection associated with the authenticated digital content request;

sending the authenticated digital content request to the digital content repository from the user device, in response to said indication of a user selection; and receiving the digital content at the user device from the digital content repository, in response to sending the authenticated digital content request.

20. The non-transitory computer readable storage media of claim 19, including instructions stored thereon for accessing a digital content repository storing digital content which when read and executed by one or more processors cause the one or more processors to perform further steps comprising:

determining, at the user device, one or more delivery parameters, the one or more delivery parameters indicating where the digital content should be sent, a delivery mechanism, or both, wherein sending the authenticated rights locker access request and the digital content specification further comprises sending the one or more delivery parameters.

* * * * *

UNITED STATES PATENT AND TRADEMARK OFFICE
CERTIFICATE OF CORRECTION

PATENT NO. : 8,893,303 B2
APPLICATION NO. : 13/549193
DATED : November 18, 2014
INVENTOR(S) : de Jong It is certified that error appears in the above-identified patent and that said Letters Patent is hereby corrected as shown below:

On the Title Page

Column 1, item 75, under Inventor, line 1, delete "Redland Britol" and insert -- Redland, Bristol --, therefor.

On page 3, column 2, item 56, under Other Publications, line 39, delete "Gidelberg," and insert -- Heidelberg, --, therefor.

On page 3, column 2, item 56, under Other Publications, line 41, delete "Gidelberg," and insert -- Heidelberg, --, therefor.

In the Specification

In column 1, line 12, delete "2002," and insert -- 2003, --, therefor.

In column 8, line 32, delete "form" and insert -- from --, therefor.

In column 48, line 41, delete "clickable" and insert -- clickable link, --, therefor.

In the Claims

In column 51, line 2, in Claim 10, delete "to a" and insert -- to --, therefor.

Signed and Sealed this
Thirtieth Day of June, 2015

Michelle K. Lee
*Director of the United States Patent and Trademark Office*